US009240072B2

(12) United States Patent
Yamashita et al.

(10) Patent No.: US 9,240,072 B2
(45) Date of Patent: Jan. 19, 2016

(54) THREE-DIMENSIONAL IMAGE PROCESSING APPARATUS, THREE-DIMENSIONAL IMAGE-PICKUP APPARATUS, THREE-DIMENSIONAL IMAGE-PICKUP METHOD, AND PROGRAM

(71) Applicant: Panasonic Intellectual Property Management Co., Ltd., Osaka-shi, Osaka (JP)

(72) Inventors: Haruo Yamashita, Osaka (JP); Takeshi Ito, Osaka (JP); Hiromichi Ono, Hyogo (JP); Yasuhiro Kuwahara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 322 days.

(21) Appl. No.: 13/787,656

(22) Filed: Mar. 6, 2013

(65) Prior Publication Data

US 2013/0195349 A1    Aug. 1, 2013

Related U.S. Application Data

(63) Continuation-in-part of application No. PCT/JP2011/005035, filed on Sep. 7, 2011.

(30) Foreign Application Priority Data

Sep. 8, 2010   (JP) .................................. 2010-201246

(51) Int. Cl.
*G06K 9/00* (2006.01)
*G06T 15/80* (2011.01)
*H04N 13/00* (2006.01)

(52) U.S. Cl.
CPC ............ *G06T 15/80* (2013.01); *H04N 13/0022* (2013.01); *H04N 13/0025* (2013.01)

(58) Field of Classification Search
None
See application file for complete search history.

(56) References Cited

U.S. PATENT DOCUMENTS 6,373,518 B1 * 4/2002 Sogawa .................. G06K 9/03
                                              348/218.1
7,692,662 B2 * 4/2010 Ohba ........................... 345/584

(Continued)

FOREIGN PATENT DOCUMENTS

JP          3157384 B2    4/2001
JP       2002-329198 A   11/2002

(Continued)

OTHER PUBLICATIONS

International Search Report for corresponding International Application No. PCT/JP2011/005035 mailed Nov. 29, 2011.

*Primary Examiner* — Aaron W Carter
(74) *Attorney, Agent, or Firm* — Shinjyu Global IP

(57) ABSTRACT

A sense of three-dimensionality and thickness is restored to a subject and a high-quality three-dimensional image with a low sense of a cardboard cutout effect is obtained, regardless of the cause of the cardboard cutout effect. In a three-dimensional image capturing apparatus (three-dimensional image processing apparatus) (1000), a depth generation unit (103) obtains L depth information and R depth information from a three-dimensional image, and an image correction unit (104) executes a shadow enhancement process that is stronger on the inside of an object than on the outside of the object, based on the L depth information and the R depth information. Through this, the occurrence of the cardboard cutout effect can be suppressed, and a high-quality three-dimensional image with a reduced cardboard cutout effect can be obtained.

6 Claims, 26 Drawing Sheets

(56) References Cited

U.S. PATENT DOCUMENTS

| | | |
|---|---|---|
| 7,860,339 B2 | 12/2010 | Yamashita et al. |
| 7,881,549 B2 | 2/2011 | Yamashita et al. |
| 8,120,606 B2 | 2/2012 | Nakamura et al. |
| 8,165,417 B2 | 4/2012 | Yamashita et al. |
| 8,311,357 B2 | 11/2012 | Yamashita et al. |
| 2001/0024231 A1 | 9/2001 | Nakamura et al. |
| 2003/0095178 A1 | 5/2003 | Shibayama |
| 2007/0188623 A1 | 8/2007 | Yamashita et al. |
| 2007/0211930 A1* | 9/2007 | Dolwick et al. ............... 382/132 |
| 2007/0273686 A1* | 11/2007 | Watanabe et al. ............. 345/419 |
| 2008/0107360 A1 | 5/2008 | Yamashita et al. |
| 2009/0079818 A1 | 3/2009 | Saishu et al. |
| 2009/0232401 A1 | 9/2009 | Yamashita et al. |
| 2011/0007132 A1 | 1/2011 | Redmann et al. |
| 2011/0085085 A1 | 4/2011 | Yamashita et al. |
| 2011/0279653 A1* | 11/2011 | Hoshino ................ G03B 35/02 348/47 |
| 2011/0292045 A1 | 12/2011 | Nakamura et al. |
| 2013/0076873 A1* | 3/2013 | Oshikiri ................. H04N 13/00 348/51 |
| 2013/0162780 A1* | 6/2013 | Kurahashi ............ H04N 5/3572 348/46 |
| 2013/0195349 A1* | 8/2013 | Yamashita ........... H04N 13/022 382/154 |
| 2013/0278730 A1* | 10/2013 | Hasegawa ............. G03B 35/08 348/49 |
| 2013/0294682 A1* | 11/2013 | Yamashita ........... H04N 13/022 382/154 |
| 2014/0184600 A1* | 7/2014 | Steen ....................... G06T 15/08 345/424 |
| 2014/0204178 A1* | 7/2014 | Kawai .................... G03B 35/08 348/46 |

FOREIGN PATENT DOCUMENTS

| | | |
|---|---|---|
| JP | 2009-053748 A | 3/2009 |
| JP | 2010-154422 A | 7/2010 |
| WO | WO-2005/027043 A1 | 3/2005 |
| WO | WO-2007/043460 A1 | 4/2007 |
| WO | WO-2010/090150 A1 | 8/2010 |

* cited by examiner

THREE-DIMENSIONAL IMAGE PROCESSING APPARATUS, THREE-DIMENSIONAL IMAGE-PICKUP APPARATUS, THREE-DIMENSIONAL IMAGE-PICKUP METHOD, AND PROGRAM

PRIORITY

This is a continuation-in-part under 35 U.S.C. §120 and 35 U.S.C. §365 of International Application PCT/JP2011/005035, with an international filing date of Sep. 7, 2011 which claims priority to Japanese Patent Application No. 2010-201246 filed on Sep. 8, 2010. The entire disclosures of International Application PCT/JP2011/005035 and Japanese Patent Application No. 2010-201246 are hereby incorporated herein by reference.

TECHNICAL FIELD

The present invention relates to techniques for increasing the quality of a three-dimensional image (a three-dimensional stereoscopic image), and relates to techniques that can be applied in a wide range of devices that handle three-dimensional images (three-dimensional video), such as cameras (image capturing apparatuses) that capture three-dimensional images, display apparatuses that display three-dimensional images (three-dimensional video), image processing apparatuses that process three-dimensional images (three-dimensional video), and so on.

BACKGROUND ART

Three-dimensional image capturing apparatuses that capture three-dimensional images in a state where binocular disparity is present (that is, capture a left eye image and a right eye image) are known; such apparatuses make it possible to reproduce a three-dimensional image in a display apparatus (called a "three-dimensional display apparatus" hereinafter) capable of projecting the three-dimensional image (the left eye image and the right eye image) independently for the left and right eyes, respectively.

In three-dimensional image capturing, a three-dimensional image (a left eye image and a right eye image) obtained in a state in which a high level of disparity is present between a far scene or long range (a subject in a background) and a near scene or short range (a subject in a foreground) will result in an image that exceeds the fusion limit for three-dimensional viewing by a person and is thus difficult to appear as three-dimensional, or an image that produces a feeling of fatigue in people who are viewing the three-dimensional image (a tiring image). In order to avoid generating such a poor three-dimensional image, there are techniques that obtain favorable three-dimensional images by performing disparity adjustment, stereo base adjustment (called "SB adjustment" hereinafter), and so on, and such techniques are widely used in professional three-dimensional image capturing for movies and the like.

Disparity adjustment is a technique used primarily in the case where a far scene or long range (a subject in a background) exceeds the fusion limit, and adjusting the disparity so that the distance to the background is compressed in a nonlinear manner brings the far scene or long range (the subject in the background) that was difficult to see three-dimensionally closer, making it possible to obtain a three-dimensional image that is easy to perceive in three dimensions (a three-dimensional image that can easily be seen in three dimensions).

On the other hand, stereo base adjustment reduces the space between two cameras (a camera for capturing a left eye image and a camera for capturing a right eye image) (that is, reduces the stereo base (interaxial distance)), making it possible to reduce the dynamic range of the disparity. For this reason, capturing a three-dimensional image after performing the stereo base adjustment described above makes it possible to obtain a three-dimensional image in which the entirety, from the far scene or long range (a subject in the background) to the near scene or short range (a subject in the foreground), is within a fusional area.

In addition, even in the case where the three-dimensional image is displayed in a display apparatus at a small size, the disparity of the three-dimensional image (that is, between the left eye image and the right eye image) is reduced, and thus the background is compressed. Accordingly, in this case, the three-dimensional image displayed in the small-size display apparatus is a three-dimensional image that is easy to view.

Employing the stated image capturing techniques (disparity adjustment, stereo base adjustment) in three-dimensional image capturing makes it possible to capture a three-dimensional image that is sufficiently easy to view (that is, a three-dimensional image that is easily perceptible in three dimensions) when displaying the image in three dimensions in a predetermined display environment (for example, see Japanese Patent No. 3157384).

SUMMARY

Technical Problem

However, in the aforementioned conventional technique, a three-dimensional image that is easy to view (that is, a three-dimensional image that is easily perceptible in three dimensions) is obtained by taking the fusion limit for three-dimensional viewing into consideration and reducing the desired disparity (that is, by reducing the disparity from its original value so that the subject that is the target of the three-dimensional image capturing falls within the fusional area for three-dimensional viewing), and is therefore not desirable from the standpoint of obtaining a natural sense of three-dimensionality and distance in the three-dimensional image. Accordingly, three-dimensional images obtained through the aforementioned conventional techniques (techniques employing disparity adjustment and stereo base adjustment) have a problem in terms of the quality of the captured three-dimensional images.

Techniques employing disparity adjustment can obtain three-dimensional images that are easy to view (that is, that are easily perceptible in three dimensions), but because the distance to the background is compressed in a nonlinear manner, a phenomenon in which the background appears as a flat plane (that is, a phenomenon in which a sense of thickness in subjects in the background is reduced and the subjects appear as flattened three-dimensional images) occurs in three-dimensional images on which disparity adjustment has been performed.

Meanwhile, techniques employing SB adjustment have an overall reduced sense of depth in the three-dimensional images that are obtained (that is, the distance from the closest point to the farthest point is reduced), and thus a phenomenon in which the sense of three-dimensionality of individual subjects is reduced occurs.

Accordingly, the three-dimensional images obtained using any of the aforementioned conventional techniques tend to be images having a poor sense of three-dimensionality and distance, and thus have poor quality.

In addition, there are cases where what is known as a "cardboard cutout effect" occurs due to the compression/reduction in the sense of three-dimensionality arising in the case where the aforementioned conventional techniques are used.

The "cardboard cutout effect" is a phenomenon in which, in a three-dimensional image, the thickness of, for example, a primary subject such as a person in the foreground is reduced, and the subject resembles a flat picture drawn on a board.

If this cardboard cutout effect occurs in a primary subject, which is of high importance, there will be an extreme drop in the quality of the three-dimensional image.

However, the cardboard cutout effect does not occur only due to the compression/reduction in the sense of three-dimensionality arising in three-dimensional images due to the disparity adjustment as in the aforementioned conventional techniques. Depending on the image capturing conditions (image capturing state), the cardboard cutout effect can occur even in ideal, undistorted three-dimensional image capturing (image capturing that captures three-dimensional images with no compression/reduction in the sense of three-dimensionality).

Accordingly, the cardboard cutout effect is a visual phenomenon, and all of the causes of the cardboard cutout effect have not necessarily been clarified. However, regardless of the cause of the cardboard cutout effect occurring, the effect always reduces the quality of three-dimensional images.

Having been achieved in light of the aforementioned problems, it is an object of the present invention to realize a three-dimensional image processing apparatus, a three-dimensional image processing method, and a program that restore a sense of three-dimensionality and thickness to a subject and obtain a high-quality three-dimensional image with a low sense of a cardboard cutout effect, regardless of the causes of the cardboard cutout effect.

Solution to Problem

A first aspect of the invention is a three-dimensional image processing apparatus that performs an image correction process on a left eye image and a right eye image contained in a three-dimensional image obtained through a dual-lens technique or a multiple-viewpoint technique, and includes an image correction unit.

The image correction unit obtains a subject object from the left eye image and the right eye image, respectively, performs a shadow enhancement process at a first strength on a region on the outside of the obtained subject object, and performs a shadow enhancement process at a second strength that is greater than the first strength on a region on the inside of the obtained subject object.

According to this three-dimensional image processing apparatus, a stronger shadow enhancement process is carried out on the region inside the obtained object than on the region outside the object, and thus an improper shadow enhancement process (that is, an shadow enhancement process in which a ringing effect or the like is produced) is not executed near contour areas of the object. Accordingly, a three-dimensional image obtained by the three-dimensional image capturing apparatus is a three-dimensional image in which the occurrence of the cardboard cutout effect is suppressed and a natural sense of three-dimensionality is achieved.

Note that the "region on the inside of the object" refers to the inside region of the object in the image, and does not refer to a region contained within the object (that is, the inner side (internal side) that is surrounded by the surface of the object and cannot be seen from the exterior).

In addition, the "first strength" may be any shadow enhancement process strength that is weaker than the second strength, and may be a strength that means not executing the shadow enhancement process.

A second aspect of the invention is a three-dimensional image processing apparatus that performs an image correction process on a three-dimensional image formed by a left eye image and a right eye image, including a depth generation unit and an image correction unit.

The depth generation unit generates a left eye image distance image and a right eye image distance image by calculating, based on the left eye image and the right eye image, distance information of a subject contained in the left eye image and the right eye image.

The image correction unit obtains a subject object from the left eye image and the right eye image based on the left eye image distance image and the right eye image distance image, respectively, and (1) performs a shadow enhancement process at a first strength on a region inside the obtained subject object, and (2) performs a shadow enhancement process at a second strength that is lower than the first strength on a region outside the obtained subject object.

According to this three-dimensional image processing apparatus, depth information (distance information) is found based on the left eye image and the right eye image, and the subject object is obtained based on the found depth information (distance information); therefore, the subject object can be obtained in a more proper manner. In addition, according to this three-dimensional image processing apparatus, a stronger shadow enhancement process is carried out on the region inside the obtained object than on the region outside the object, and thus an improper shadow enhancement process (that is, an shadow enhancement process in which a ringing effect or the like is produced) is not executed near contour areas of the object. Accordingly, a three-dimensional image obtained by the three-dimensional image capturing apparatus is a three-dimensional image in which the occurrence of the cardboard cutout effect is suppressed and a natural sense of three-dimensionality is achieved.

Note that "lower" may include (a strength that is) the same.

A third aspect of the invention is a three-dimensional image processing apparatus that performs an image correction process on a three-dimensional image formed by a left eye image and a right eye image, including a depth generation unit and an image correction unit.

The depth generation unit generates a left eye image distance image and a right eye image distance image by calculating, based on the left eye image and the right eye image, distance information of a subject contained in the left eye image and the right eye image.

The image correction unit obtains a subject object from the left eye image and the right eye image based on the left eye image distance image and right eye image distance image, respectively, and (1) performs a shadow enhancement process at a first strength on an internal central region that is a region inside the obtained subject object and that corresponds to an internal region that excludes a region in the vicinity of a contour of the obtained subject object, (2) performs a shadow enhancement process at a second strength that is lower than the first strength on an internal contour vicinity region that is a region inside the obtained subject object and that corresponds to the region in the vicinity of the contour of the obtained subject object, and (3) performs a shadow enhancement process at a third strength that is lower than the second strength on a region outside the obtained subject object.

According to this three-dimensional image processing apparatus, depth information (distance information) is found based on the left eye image and the right eye image, and the subject object is obtained based on the found depth information (distance information); therefore, the subject object can be obtained in a more proper manner. In addition, according to this three-dimensional image processing apparatus, a shadow enhancement process having a strength that is between the strength of the shadow enhancement process performed on the inside region of the object and the strength of the shadow enhancement process performed on the outside region of the object can be executed on a region near the contours of the inside region of the obtained object.

Through this, according to this three-dimensional image processing apparatus, an improper shadow enhancement process (that is, a shadow enhancement process in which a ringing effect or the like is produced) is not executed near contour areas of the object. Accordingly, a three-dimensional image obtained by the three-dimensional image capturing apparatus is a three-dimensional image in which the occurrence of the cardboard cutout effect is suppressed and a natural sense of three-dimensionality is achieved.

A fourth aspect of the invention is, in addition to the third aspect of the invention, a three-dimensional image processing apparatus in which when the strength of the shadow enhancement process at a border point between the region outside of the subject object and the internal contour vicinity region is taken as a first border point strength and the strength of the shadow enhancement process at a border point between the internal contour vicinity region and the internal central region is taken as a second border point strength, the second strength that is the strength of the shadow enhancement process performed on the internal contour vicinity region is a value that continually changes at the first border point strength and the second border point strength.

According to this three-dimensional image processing apparatus, the strength of the shadow enhancement process continually changes as the location progresses from the outside region of the subject object, to the region near the contour areas, and further toward the inside region, and thus an improper shadow enhancement process (that is, an shadow enhancement process in which a ringing effect or the like is produced) is not executed near contour areas of the object. Furthermore, according to this three-dimensional image processing apparatus, a high-strength shadow enhancement process can be properly executed on the internal central region of the subject object while executing a proper shadow enhancement process in the region near the contour areas of the subject object.

A fifth aspect of the invention is, in addition to any of the first through fourth aspects of the invention, a three-dimensional image processing apparatus in which the shadow enhancement process is a contrast enhancement process.

As a result, according to this three-dimensional image processing apparatus, a shadow enhancement process that is based on a contrast enhancement process can be executed.

A sixth aspect of the invention is, in addition to any of the first through fourth aspects of the invention, a three-dimensional image processing apparatus in which the shadow enhancement process is a local contrast enhancement process based on a visual process.

As a result, according to this three-dimensional image processing apparatus, a shadow enhancement process that is based a local contrast enhancement process, which in turn is based on a visual process, can be executed.

Note that the "visual process" is processing for giving characteristics that are close to human vision, and is for determining the value of an output signal based on the contrast between the value of a target pixel of an image signal that has been input and the values (brightness) of pixels around that target pixel.

In addition, the "local contrast enhancement process based on the visual process" refers to a process that enhances the local contrast by performing a tone conversion process on a pixel of interest based on properties such as those shown in, for example, FIG. 4, assuming that, for example, the pixel value of a pixel to be processed (the pixel of interest) is IS, the output pixel value of the pixel to be processed is OS, and a representative brightness of a region in the periphery of the pixel of interest (for example, an average brightness value (average luminance value) of that peripheral pixel) is US.

A seventh aspect of the invention is, in addition to any of the first through fourth aspects of the invention, is a three-dimensional image processing apparatus, in which the shadow enhancement process is a process that darkens shadows or shade.

According to this three-dimensional image processing apparatus, a process that darkens shadows or shade is carried out, and thus it is possible to selectively enhance areas of shadow or shade (that is, carry out a three-dimensional image process that darkens shadows or shade); as a result, the three-dimensional image processing apparatus can obtain a three-dimensional image that realizes a more natural sense of three-dimensionality and sense of depth.

An eighth aspect of the invention is, in addition to the seventh aspect of the invention, in which the image correction unit includes an R image correction unit and an L image correction unit.

The R image correction unit has an R image local tone conversion unit, an R image strength generation unit, and an R image synthesizing unit.

The L image correction unit has an L image local tone conversion unit, an L image strength generation unit, and an L image synthesizing unit.

The R image local tone conversion unit performs a shadow enhancement process on a right eye image signal IS_R and outputs the right eye image signal on which the shadow enhancement process has been performed as a corrected right eye image signal OS_R.

The R image strength generation unit determines a strength of an image correction process based on the right eye image distance image.

The R image synthesizing unit synthesizes the right eye image signal IS_R and the corrected right eye image signal OS_R based on the strength determined by the R image strength generation unit.

The L image local tone conversion unit performs a shadow enhancement process on a left eye image signal IS_L and outputs the left eye image signal on which the shadow enhancement process has been performed as a corrected left eye image signal OS_L.

The L image strength generation unit determines a strength of an image correction process based on the left eye image distance image.

The L image synthesizing unit synthesizes the left eye image signal IS_L and the corrected left eye image signal OS_L based on the strength determined by the L image strength generation unit.

According to this three-dimensional image processing apparatus, the R image local tone conversion unit executes a shadow enhancement process on the right eye image signal IS_R, and the synthesizing unit executes a synthesizing process using the shadow-enhanced corrected right eye image signal OS_R (the same applies to the L image local tone conversion unit).

As a result, according to the three-dimensional image processing apparatus, areas of shadow or shade can be selectively enhanced (that is, a three-dimensional image process that darkens shadows or shade can be carried out). As a result, according to this three-dimensional image processing apparatus, a three-dimensional image that realizes a more natural sense of three-dimensionality and sense of depth can be obtained.

A ninth aspect of the invention is, in addition to the eighth aspect of the invention, a three-dimensional image processing apparatus in which the R image local tone conversion unit has an R image surrounding brightness detection unit and an R image second dynamic tone correction unit, and the L image local tone conversion unit has an L image surrounding brightness detection unit and an L image second dynamic tone correction unit.

The R image surrounding brightness detection unit detects a representative brightness value (for example an average brightness value) of a pixel of interest that is a pixel corresponding to the right eye image signal IS_R and a pixel in the periphery of the pixel of interest, and outputs an R image surrounding brightness signal US_R that takes the detected representative brightness value as a signal value.

The R image second dynamic tone correction unit obtains the corrected right eye image signal OS_R by performing a dynamic tone correction process based on the right eye image signal IS_R and the R image surrounding brightness signal US_R.

The dynamic tone correction process:

(1) obtains the corrected right eye image signal OS_R by performing a tone conversion process based on a tone conversion property in which, when the value of the right eye image signal IS_R is fixed at a predetermined value within a predetermined input range of the right eye image signal IS_R and when (value of the right eye image signal IS_R)≤(value of the R image surrounding brightness signal US_R), the value of the corrected right eye image signal OS_R decreases as the value of the R image surrounding brightness signal US_R increases, and (2) obtains the corrected right eye image signal OS_R by taking the right eye image signal IS_R as the corrected right eye image signal OS_R when (value of the right eye image signal IS_R)>(value of the R image surrounding brightness signal US_R).

The L image surrounding brightness detection unit detects a brightness value of a pixel of interest that is a pixel corresponding to the left eye image signal IS_L and a pixel in the periphery of the pixel of interest, and outputs an L image surrounding brightness signal US_L that takes the detected brightness value as a signal value.

The L image second dynamic tone correction unit obtains the corrected left eye image signal OS_L by performing a dynamic tone correction process based on the left eye image signal IS_L and the L image surrounding brightness signal US_L.

The dynamic tone correction process:

(1) obtains the corrected left eye image signal OS_L by performing a tone conversion process based on a tone conversion property in which, when the value of the left eye image signal IS_L is fixed at a predetermined value within a predetermined input range of the left eye image signal IS_L and when (value of the left eye image signal IS_L)≤(value of the L image surrounding brightness signal US_L), the value of the corrected left eye image signal OS_L decreases as the value of the L image surrounding brightness signal US_L increases, and (2) obtains the corrected left eye image signal OS_L by taking the left eye image signal IS_L as the corrected left eye image signal OS_L when (value of the left eye image signal IS_L)>(value of the L image surrounding brightness signal US_L).

According to this three-dimensional image processing apparatus, the L image second dynamic tone correction unit executes a process for enhancing the local contrast only in the case where (value of the left eye image signal IS_L)≤(value of the L image surrounding brightness signal US_L) (the same processing as the L image applies to the R image). In other words, according to this three-dimensional image processing apparatus, a process that enhances the local contrast is executed on pixels in areas that are darker than their peripheries, and thus shadow or shade components in the image are selectively enhanced. As a result, according to this three-dimensional image processing apparatus, a three-dimensional image that realizes a more natural sense of three-dimensionality and sense of depth can be obtained.

A tenth aspect of the invention is, in addition to the eighth aspect of the invention, a three-dimensional image processing apparatus in which the R image local tone conversion unit has an R image second surrounding brightness detection unit and an R image dynamic tone correction unit, and the L image local tone conversion unit has an L image second surrounding brightness detection unit and an L image dynamic tone correction unit.

The R image second surrounding brightness detection unit detects a representative brightness value (for example an average brightness value) of a pixel of interest that is a pixel corresponding to the right eye image signal IS_R and a pixel in the periphery of the pixel of interest, obtains an R image surrounding brightness signal US_R that takes the detected brightness value as a signal value, obtains a right eye offset value ΔUS_R that takes on a higher value the greater an amount of change in the right eye image signal IS_R is in a predetermined image region, and obtains an R image corrected surrounding brightness signal US_R' by adding the right eye offset value ΔUS_R to the R image surrounding brightness signal US_R.

The R image dynamic tone correction unit obtains the corrected right eye image signal OS_R by performing a dynamic tone correction process based on the right eye image signal IS_R and the R image corrected surrounding brightness signal US_R'. The dynamic tone correction process obtains the corrected right eye image signal OS_R by performing a tone conversion process based on a tone conversion property in which, when the value of the right eye image signal IS_R is fixed at a predetermined value in a predetermined input range of the right eye image signal IS_R, the value of the corrected right eye image signal OS_R decreases as the value of the R image corrected surrounding brightness signal US_R' increases.

The L image second surrounding brightness detection unit detects a brightness value of a pixel of interest that is a pixel corresponding to the left eye image signal IS_L and a pixel in the periphery of the pixel of interest, obtains an L image surrounding brightness signal US_L that takes the detected brightness value as a signal value, obtains a left eye offset value ΔUS_L that takes on a higher value the greater an amount of change in the left eye image signal IS_L is in a predetermined image region, and obtains an L image corrected surrounding brightness signal US_L' by adding the left eye offset value ΔUS_L to the L image surrounding brightness signal US_L.

The L image dynamic tone correction unit obtains the corrected left eye image signal OS_L by performing a dynamic tone correction process based on the left eye image signal IS_L and the L image corrected surrounding brightness signal US_L'. The dynamic tone correction process obtains the corrected left eye image signal OS_L by performing a tone conversion process based on a tone conversion property in which, when the value of the left eye image signal IS_L is fixed at a predetermined value in a predetermined input range of the left eye image signal IS_L, the value of the corrected left eye image signal OS_L decreases as the value of the L image corrected surrounding brightness signal US_L' increases.

According to this three-dimensional image processing apparatus, the L image second surrounding brightness detection unit calculates the right eye offset value ΔUS_R that has a higher value the greater the amount of change is in the right eye image signal IS_R, the right eye offset value ΔUS_R is added, and the L image corrected surrounding brightness signal US_L' is obtained. In addition, according to this three-dimensional image processing apparatus, the tone conversion process is executed based on, for example, the tone conversion properties illustrated in FIG. 4, using the L image corrected surrounding brightness signal US_L' instead of the surrounding brightness signal US_L. As a result, according to this three-dimensional image processing apparatus, a stronger local contrast enhancement process is executed on pixels that are darker than their peripheries. In other words, according to this three-dimensional image processing apparatus, a process that enhances the local contrast is executed on pixels in areas that are darker than their peripheries, and thus shadow or shade components in the image are selectively enhanced. As a result, according to this three-dimensional image processing apparatus, a three-dimensional image that realizes a more natural sense of three-dimensionality and sense of depth can be obtained.

Note that "a higher value the greater the amount of change is in the right eye image signal IS_R" is, for example, determined based on to what degree a change in the signal value of the right eye image signal IS_R within a predetermined range varies relative to the average value of that predetermined range, and "a greater the amount of change is in the right eye image signal IS_R" occurs when, for example, there is a high a variance, a standard deviate, or the like for the signal value of the right eye image signal IS_R within the predetermined range.

An eleventh aspect of the invention is, in addition to the eighth aspect of the invention, a three-dimensional image processing apparatus in which the R image local tone conversion unit has an R image second surrounding brightness detection unit and an R image coefficient computation processing unit, and the L image local tone conversion unit has an L image second surrounding brightness detection unit and an L image coefficient computation processing unit.

The R image second surrounding brightness detection unit detects a representative brightness value (for example, an average brightness value) of a pixel of interest that is a pixel corresponding to the right eye image signal IS_R and a pixel in the periphery of the pixel of interest, obtains an R image surrounding brightness signal US_R that takes the detected representative brightness value as a signal value, obtains a right eye offset value ΔUS_R that takes on a higher value the greater an amount of change in the right eye image signal IS_R is in a predetermined image region, and obtains an R image corrected surrounding brightness signal US_R' by adding the right eye offset value ΔUS_R to the R image surrounding brightness signal US_R.

The R image coefficient computation processing unit determines a coefficient k that takes on a lower value the higher the value of a difference ((IS_R)−(US_R')) between the right eye image signal IS_R and the R image corrected surrounding brightness signal US_R', and obtains the corrected right eye image signal OS_R through OS_R=IS_R+k× ((IS_R)−(US_R')) using the determined coefficient k.

The L image second surrounding brightness detection unit detects a brightness value of a pixel of interest that is a pixel corresponding to the left eye image signal IS_L and a pixel in the periphery of the pixel of interest, obtains an L image surrounding brightness signal US_L that takes the detected brightness value as a signal value, obtains a left eye offset value ΔUS_L that takes on a higher value the greater an amount of change in the left eye image signal IS_L is in a predetermined image region, and obtains an L image corrected surrounding brightness signal US_L' by adding the left eye offset value ΔUS_L to the L image surrounding brightness signal US_L.

The L image coefficient computation processing unit determines a coefficient k that takes on a lower value the higher the value of a difference ((IS_L)−(US_L')) between the left eye image signal IS_L and the L image corrected surrounding brightness signal US_L', and obtains the corrected left eye image signal OS_L through OS_L=IS_L+k×((IS_L)− (US_L')) using the determined coefficient k.

According to this three-dimensional image processing apparatus, the R image coefficient computation processing unit determines the coefficient k that takes on a lower value the higher the value of the difference ((IS_R)−(US_R')) between the right eye image signal IS_R and the R image corrected surrounding brightness signal US_R', and obtains the corrected right eye image signal OS_R through OS_R=IS_R+k×((IS_R)−(US_R')) using the determined coefficient k. As a result, according to this three-dimensional image processing apparatus, a stronger local contrast enhancement process is executed on pixels that are darker than their peripheries (the same applies to the L image process). In other words, according to this three-dimensional image processing apparatus, a process that increases the degree of enhancement of unsharp masking is executed on pixels in areas that are darker than their peripheries, and thus shadow or shade components in the image are selectively enhanced. As a result, according to this three-dimensional image processing apparatus, a three-dimensional image that realizes a more natural sense of three-dimensionality and sense of depth can be obtained.

Note that "determines the coefficient k that takes on a lower value the higher the value of the difference ((IS_L)−(US_L')) is" (the same applies to the difference ((IS_R)−(US_R))) includes, for example, not only a case in which the coefficient k is determined based on the solid line in FIG. 17, but also a case in which the coefficient k is determined based on the dotted line in FIG. 17. In other words, this includes not only cases where the relationship between the coefficient k and the difference value ((IS_L)−(US_L')) is monotonic, but also cases where the relationship changes in steps (for example, includes the dotted line in FIG. 17).

An twelfth aspect of the invention is, in addition to the eighth aspect of the invention, a three-dimensional image processing apparatus in which the R image local tone conversion unit has an R image second surrounding brightness detection unit and an R image coefficient computation processing unit, and the L image local tone conversion unit has an L image second surrounding brightness detection unit and an L image coefficient computation processing unit.

The R image second surrounding brightness detection unit detects a representative brightness value (for example, an average brightness value) of a pixel of interest that is a pixel corresponding to the right eye image signal IS_R and a pixel in the periphery of the pixel of interest, obtains an R image surrounding brightness signal US_R that takes the detected representative brightness value as a signal value, obtains a right eye offset value $\Delta US\_R$ that takes on a higher value the greater an amount of change in the right eye image signal IS_R is in a predetermined image region, and obtains an R image corrected surrounding brightness signal US_R' by adding the right eye offset value $\Delta US\_R$ to the R image surrounding brightness signal US_R.

The R image coefficient computation processing unit determines a coefficient k that takes on a lower value the higher the value of a difference ((IS_R)−(US_R')) between the right eye image signal IS_R and the R image corrected surrounding brightness signal US_R', obtains a signal LPF $((k+p) \times (IS\_R - US\_R'))$ by setting a coefficient p (p: $0 \leq p \leq 1$) and performing a bandwidth limiting process on a signal obtained through $(k+p) \times (IS\_R - US\_R')$, and obtains the corrected right eye image signal OS_R through OS_R=IS_R−p× (IS_R−US_R')+LPF((k+p)×(IS_R−US_R')) using the obtained signal LPF((k+p)×(IS_R−US_R')).

The L image second surrounding brightness detection unit detects a brightness value of a pixel of interest that is a pixel corresponding to the left eye image signal IS_L and a pixel in the periphery of the pixel of interest, obtains an L image surrounding brightness signal US_L that takes the detected brightness value as a signal value, obtains a left eye offset value $\Delta US\_L$ that takes on a higher value the greater an amount of change in the left eye image signal IS_L is in a predetermined image region, and obtains an L image corrected surrounding brightness signal US_L' by adding the left eye offset value $\Delta US\_L$ to the L image surrounding brightness signal US_L.

The L image coefficient computation processing unit determines a coefficient k that takes on a lower value the higher the value of a difference ((IS_L)−(US_L')) between the left eye image signal IS_L and the L image corrected surrounding brightness signal US_L', obtains a signal LPF ((k+p)×(IS_L−US_L')) by setting a coefficient p (p: $0 \leq p \leq 1$) and performing a bandwidth limiting process on a signal obtained through (k+p)×(IS_L−US_L'), and obtains the corrected left eye image signal OS_L through OS_L=IS_L−p×(IS_L−US_L')+ LPF((k+p)×(IS_L−US_L')) using the obtained signal LPF ((k+p)×(IS_L−US_L')).

According to this three-dimensional image processing apparatus, the R image coefficient computation processing unit obtains the corrected right eye image signal OS_R through a process that corresponds to OS_R=IS_R−p× (IS_R−US_R')+LPF((k+p)×(IS_R−US_R')). Therefore, according to this three-dimensional image processing apparatus, the method for blurring shadow or shade components contained in the original image and shadow or shade components that have been added (that is, the extent of the bandwidth limiting process) can be adjusted using the coefficient p. Therefore, according to this three-dimensional image processing apparatus, areas of shadow or shade can be selectively enhanced while properly blurring the areas of shadow or shade. As a result, according to this three-dimensional image processing apparatus, a three-dimensional image that realizes a more natural sense of three-dimensionality and sense of depth can be obtained.

A thirteenth aspect of the invention is a three-dimensional image capturing apparatus including the three-dimensional image processing apparatus according to any of the first through twelfth aspects of the invention.

Accordingly, it is possible to realize a three-dimensional image capturing apparatus that achieves the same effects as the three-dimensional image processing apparatus according to any of the first through twelfth aspects of the invention.

A fourteenth aspect of the invention is a three-dimensional image processing method that performs an image correction process on a left eye image and a right eye image contained in a three-dimensional image obtained through a dual-lens technique or a multiple-viewpoint technique, that includes an image correction.

In the image correction, a subject object is obtained from the left eye image and the right eye image, respectively, a shadow enhancement process is performed at a first strength on a region on the outside of the obtained subject object, and a shadow enhancement process is performed at a second strength that is greater than the first strength on a region on the inside of the obtained subject object.

Through this, it is possible to realize a three-dimensional image processing method that achieves the same effects as the first aspect of the invention.

A fifteenth aspect of the invention is a three-dimensional image processing method that performs an image correction process on a left eye image and a right eye image contained in a three-dimensional image obtained through a dual-lens technique or a multiple-viewpoint technique, that includes a depth generation and an image correction.

In the depth generation, a left eye image distance image and a right eye image distance image are generated by calculating, based on the left eye image and the right eye image, distance information of a subject contained in the left eye image and the right eye image.

In the image correction, a subject object is obtained from the left eye image and the right eye image based on the left eye image distance image and right eye image distance image, respectively, and (1) a shadow enhancement process is performed at a first strength on a region inside the obtained subject object, and (2) a shadow enhancement process is performed at a second strength that is lower than the first strength on a region outside the obtained subject object.

Through this, it is possible to realize a three-dimensional image processing method that achieves the same effects as the second aspect of the invention.

A sixteenth aspect of the invention is a three-dimensional image processing method that performs an image correction process on a left eye image and a right eye image contained in a three-dimensional image obtained through a dual-lens technique or a multiple-viewpoint technique, that includes a depth generation and an image correction.

In the depth generation, a left eye image distance image and a right eye image distance image are generated by calculating, based on the left eye image and the right eye image, distance information of a subject contained in the left eye image and the right eye image.

In the image correction, a subject object is obtained from the left eye image and the right eye image based on the left eye image distance image and right eye image distance image, respectively, and (1) a shadow enhancement process is performed at a first strength on an internal central region that is a region inside the obtained subject object and that corresponds to an internal region that excludes a region in the vicinity of a contour of the obtained subject object, (2) a shadow enhancement process is performed at a second strength that is lower than the first strength on an internal contour vicinity region that is a region inside the obtained subject object and that corresponds to the region in the vicinity of the contour of the obtained subject object, and (3) a shadow enhancement process is performed at a third strength that is lower than the second strength on a region outside the obtained subject object.

A seventeenth aspect of the invention is any of the fourteenth through sixteenth aspects of the invention, in which the shadow enhancement process is a process that darkens shadows or shade.

An eighteenth aspect of the invention is program for causing a computer to execute a three-dimensional image processing method that performs an image correction process on a left eye image and a right eye image contained in a three-dimensional image obtained through a dual-lens technique or a multiple-viewpoint technique. The three-dimensional image processing method includes an image correction.

In the image correction, a subject object is obtained from the left eye image and the right eye image, respectively, a shadow enhancement process is performed at a first strength on a region on the outside of the obtained subject object, and a shadow enhancement process is performed at a second strength that is greater than the first strength on a region on the inside of the obtained subject object.

Through this, it is possible to realize a program that achieves the same effects as the first aspect of the invention.

A nineteenth aspect of the invention is program for causing a computer to execute a three-dimensional image processing method that performs an image correction process on a left eye image and a right eye image contained in a three-dimensional image obtained through a dual-lens technique or a multiple-viewpoint technique. The three-dimensional image processing method includes a depth generation and an image correction.

In the depth generation, a left eye image distance image and a right eye image distance image are generated by calculating, based on the left eye image and the right eye image, distance information of a subject contained in the left eye image and the right eye image.

In the image correction, a subject object is obtained from the left eye image and the right eye image based on the left eye image distance image and right eye image distance image, respectively, and (1) a shadow enhancement process is performed at a first strength on a region inside the obtained subject object, and (2) a shadow enhancement process is performed at a second strength that is lower than the first strength on a region outside the obtained subject object.

Through this, it is possible to realize a program that achieves the same effects as the second aspect of the invention.

A twentieth aspect of the invention is program for causing a computer to execute a three-dimensional image processing method that performs an image correction process on a left eye image and a right eye image contained in a three-dimensional image obtained through a dual-lens technique or a multiple-viewpoint technique. The three-dimensional image processing method includes a depth generation and an image correction.

In the depth generation, a left eye image distance image and a right eye image distance image are generated by calculating, based on the left eye image and the right eye image, distance information of a subject contained in the left eye image and the right eye image.

In the image correction, a subject object is obtained from the left eye image and the right eye image based on the left eye image distance image and right eye image distance image, respectively, and (1) a shadow enhancement process is performed at a first strength on an internal central region that is a region inside the obtained subject object and that corresponds to an internal region that excludes a region in the vicinity of a contour of the obtained subject object, (2) a shadow enhancement process is performed at a second strength that is lower than the first strength on an internal contour vicinity region that is a region inside the obtained subject object and that corresponds to the region in the vicinity of the contour of the obtained subject object, and (3) a shadow enhancement process is performed at a third strength that is lower than the second strength on a region outside the obtained subject object.

Through this, it is possible to realize a program that achieves the same effects as the third aspect of the invention.

A twenty-first aspect of the invention is any of the eighteenth through twentieth aspects of the invention, in which the shadow enhancement process is a process that darkens shadows or shade.

Advantageous Effects

According to the present invention, a sense of three-dimensionality and thickness can be restored to a subject and a high-quality three-dimensional image with a low sense of a cardboard cutout effect can be obtained, regardless of the cause of the cardboard cutout effect.

DETAILED DESCRIPTION

Embodiments of a three-dimensional image processing apparatus and a three-dimensional image processing method according to the present invention will be described hereinafter with reference to the drawings. It will be apparent to those skilled in the art from this disclosure that the following descriptions of the embodiments are provided for illustration only and not for the purpose of limiting the invention as defined by the appended claims and their equivalents.

First Embodiment

The first embodiment will describe a dual-lens three-dimensional image capturing apparatus (digital camera, video camera, or the like) as an example of a three-dimensional image processing apparatus.

1.1: Configuration of Three-Dimensional Image Capturing Apparatus

Figure 1:
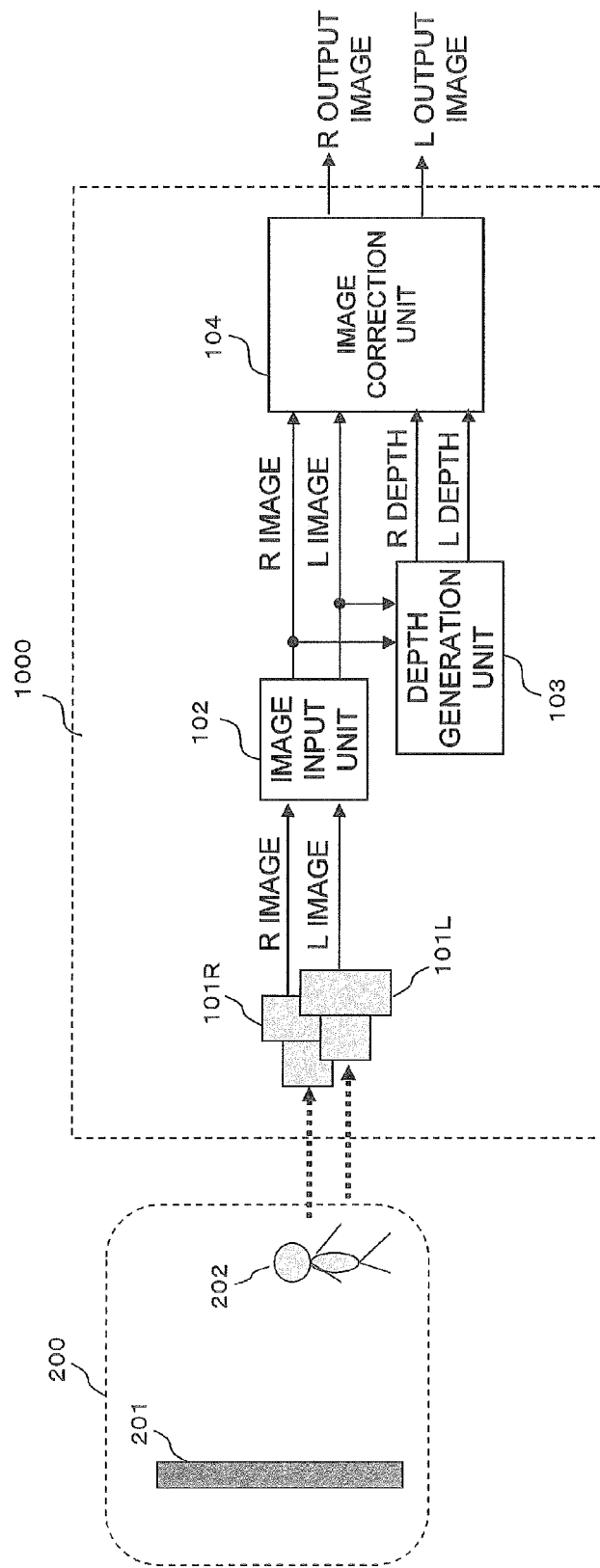
FIG. 1 is a diagram illustrating the overall configuration of a three-dimensional image capturing apparatus according to a first embodiment, including an image capturing environment.

FIG. 1 is a schematic diagram illustrating the configuration of a three-dimensional image capturing apparatus 1000 according to the first embodiment. Note that FIG. 1 schematically illustrates both the three-dimensional image capturing apparatus 1000 and a scene 200 captured by the three-dimensional image capturing apparatus 1000 (that is, a captured scene 200).

As shown in FIG. 1, the three-dimensional image capturing apparatus 1000 includes a first image capturing unit 101R that obtains a first image signal (for example, a right eye image signal (an R image signal)) by collecting subject light from a first point of view, a second image capturing unit 101L that obtains a second image signal (for example, a left eye image signal (an L image signal) by collecting subject light from a second point of view, and an image input unit 102 that converts the first image signal (for example, the R image signal) and the second image signal (for example, the L image signal) into respective digital signals.

In addition, the three-dimensional image capturing apparatus 1000 includes a depth generation unit that calculates subject distance information based on the respective first image signal (for example, the R image signal) and second image signal (for example, the L image signal) converted into digital signals and outputs the calculated information as first depth information (for example, R depth information) and second depth information (for example, L depth information), and an image correction unit 104 that performs an image correction process on the first image signal (for example, the R image signal) and the second image signal (for example, the L image signal) using the first depth information (for example, R depth information) and the second depth information (for example, L depth information).

Note that for the sake of simplicity, the following descriptions will be given assuming that a right eye image (video) is captured by the first image capturing unit 101R and a left eye image (video) is captured by the second image capturing unit 101L.

The first image capturing unit 101R includes an optical system disposed at the first point of view that collects subject light and an image sensor that obtains the first image signal (right eye image signal (R image signal)) by photoelectrically converting the collected subject light. The first image capturing unit 101R then outputs the obtained first image signal (R image signal) to the image input unit 102.

The second image capturing unit 101L includes an optical system disposed at the second point of view, corresponding to a different location than the first point of view, that collects subject light and an image sensor that obtains the second image signal (left eye image signal (L image signal)) by photoelectrically converting the collected subject light. The second image capturing unit 101L then outputs the obtained second image signal (L image signal) to the image input unit 102.

The image input unit 102 is inputted with the first image signal (R image signal) obtained by the first image capturing unit 101R, performs A/D conversion on the inputted first image signal, and outputs the A/D-converted first image signal (R image signal) to the depth generation unit 103 and the image correction unit 104.

The image input unit 102 is also inputted with the second image signal (L image signal) obtained by the second image capturing unit 101L, performs A/D conversion on the inputted second image signal, and outputs the A/D-converted second image signal (L image signal) to the depth generation unit 103 and the image correction unit 104.

The depth generation unit 103 is inputted with the first image signal (R image signal) and the second image signal (L image signal) outputted from the image input unit 102. From a first image (R image) formed based on the first image signal (R image signal) and a second image (L image) formed based the second image signal (L image signal), the depth generation unit 103 generates the first depth information (R depth information) that is depth information of the first image (R image) and the second depth information (L depth information) that is depth information of the second image (L image). The depth generation unit 103 then outputs the generated first depth information (R depth information) and second depth information (L depth information) to the image correction unit 104.

Note that it is preferable for the generation of the depth information to be carried out through, for example, disparity matching.

Figure 2:
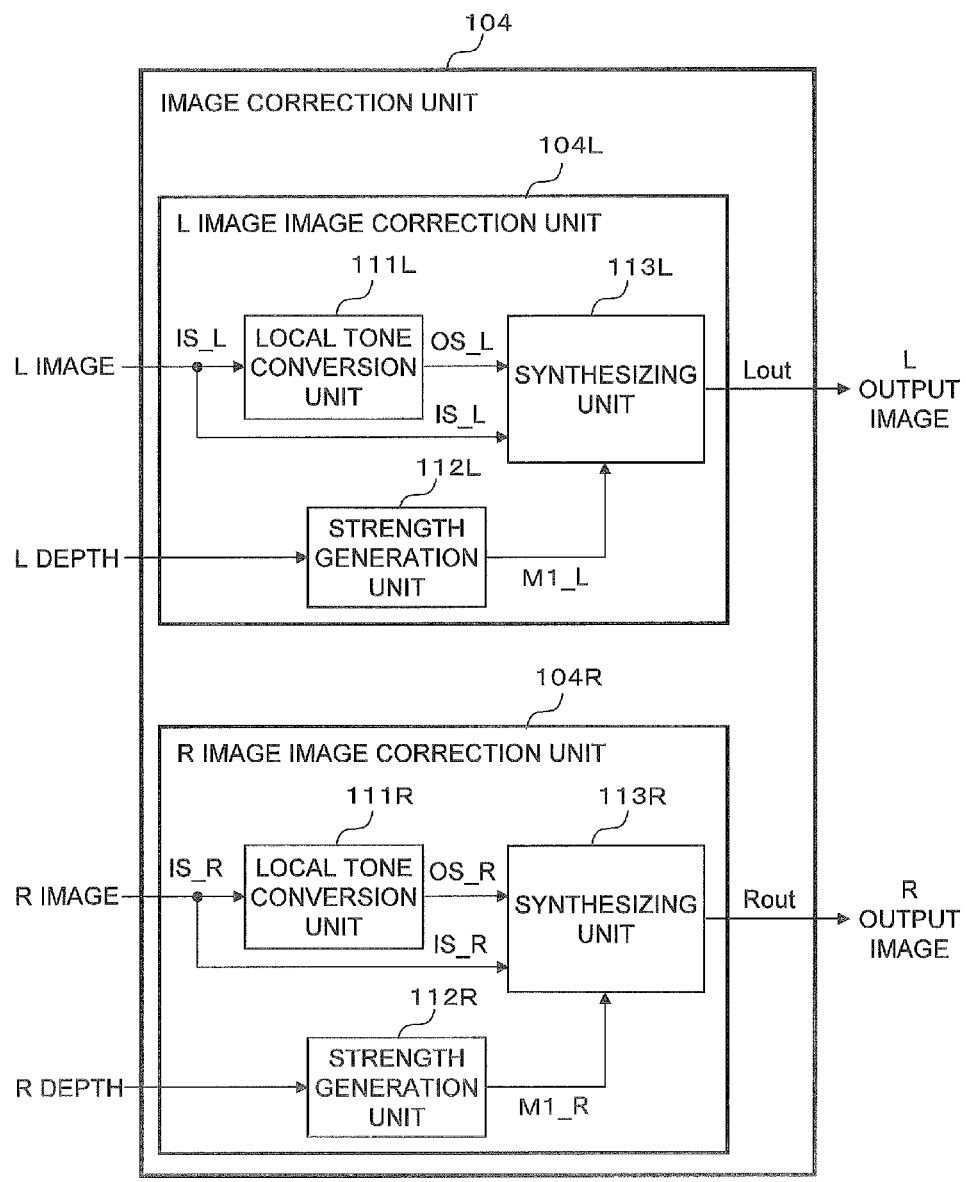
FIG. 2 is a block diagram illustrating an image correction unit according to the first embodiment.

As shown in FIG. 2, the image correction unit 104 includes an L image image correction unit 104L and an R image image correction unit 104R. The image correction unit 104 is inputted with the first image signal (R image signal) and the second image signal (L image signal) outputted from the image input unit 102, and the first depth information (R depth information) and the second depth information (L depth information) outputted from the depth generation unit 103. The image correction unit 104 carries out a correction process on the first image signal (R image signal) based on the first depth information (R depth information) and outputs the corrected first image signal (R image signal). In addition, the image correction unit 104 carries out a correction process on the second image signal (L image signal) based on the second depth information (L depth information) and outputs the corrected second image signal (L image signal).

Although it is favorable for the depth information to be obtained as the first depth information (R depth information) and the second depth information (L depth information) as described above, it is possible to use one to indirectly obtain the other, and thus two instances of the depth information are not absolutely necessary.

As shown in FIG. 2, the L image image correction unit 104L includes a local tone conversion unit 111L, a strength generation unit 112L, and a synthesizing unit 113L.

Figure 3:
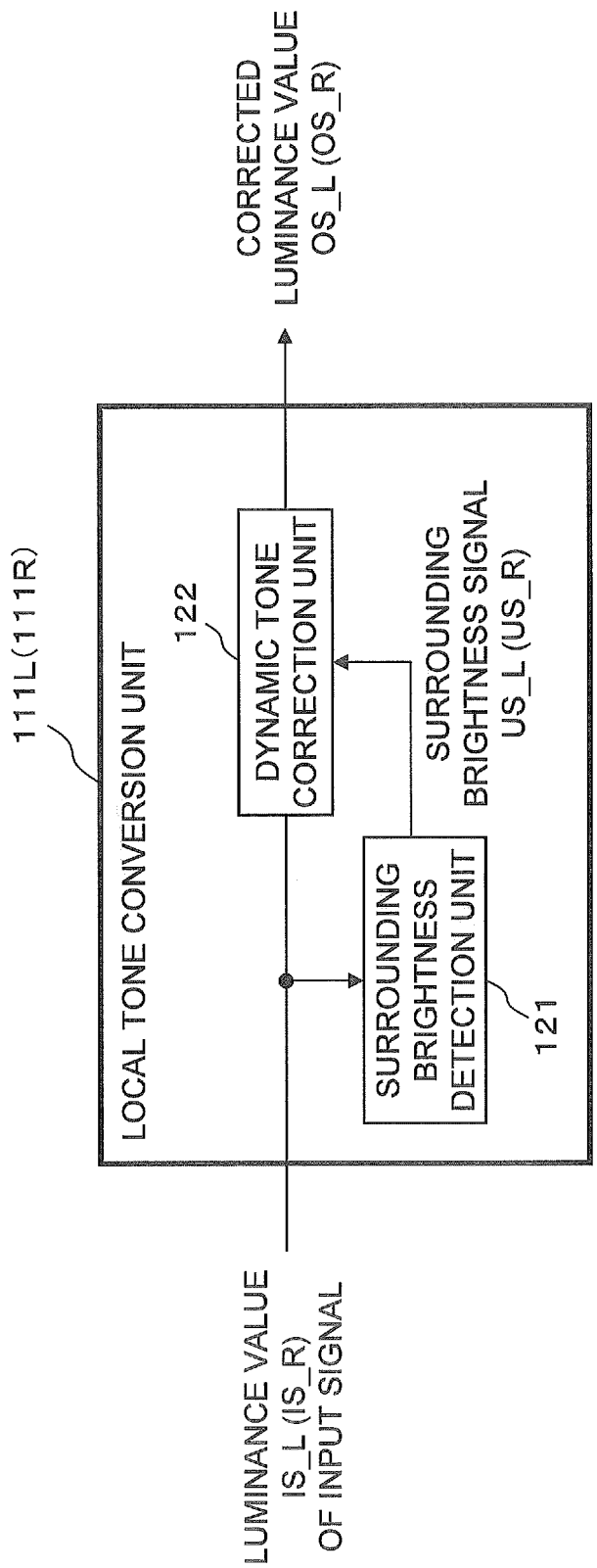
FIG. 3 is a block diagram illustrating a local tone conversion unit according to the first embodiment.

As shown in FIG. 3, the local tone conversion unit 111L includes a surrounding brightness detection unit 121 and a dynamic tone correction unit 122.

The surrounding brightness detection unit 121 is inputted with the L image signal (a luminance value IS_L of the L image signal) that is outputted from the image input unit 102 and that can form the L image, and calculates, for a region surrounding a pixel of interest (a pixel to be processed in the L image) that corresponds to the luminance value IS_L of the L image signal (the region being an image region in the periphery of the pixel of interest in the L image), a representative brightness value (for example, the average luminance value of all pixels included in the stated surrounding region). The surrounding brightness detection unit 121 then outputs the calculated representative brightness value of the image region in the periphery of the pixel of interest to the dynamic tone correction unit 122 as a surrounding brightness signal US_L.

The dynamic tone correction unit 122 is inputted with the L image signal (the luminance value IS_L of the L image signal) that is outputted from the image input unit 102 and that can form the L image, and the surrounding brightness signal US_L outputted from the surrounding brightness detection unit 121. The dynamic tone correction unit 122 performs a tone conversion process on the luminance value IS_L of the L image signal based on tone conversion properties determined based on the value of the surrounding brightness signal US_L. The tone conversion properties performed by the dynamic tone correction unit 122 are as shown in, for example, FIG. 4.

Here, the tone conversion properties of the dynamic tone correction unit 122 will be described using FIG. 4.

Figure 4:
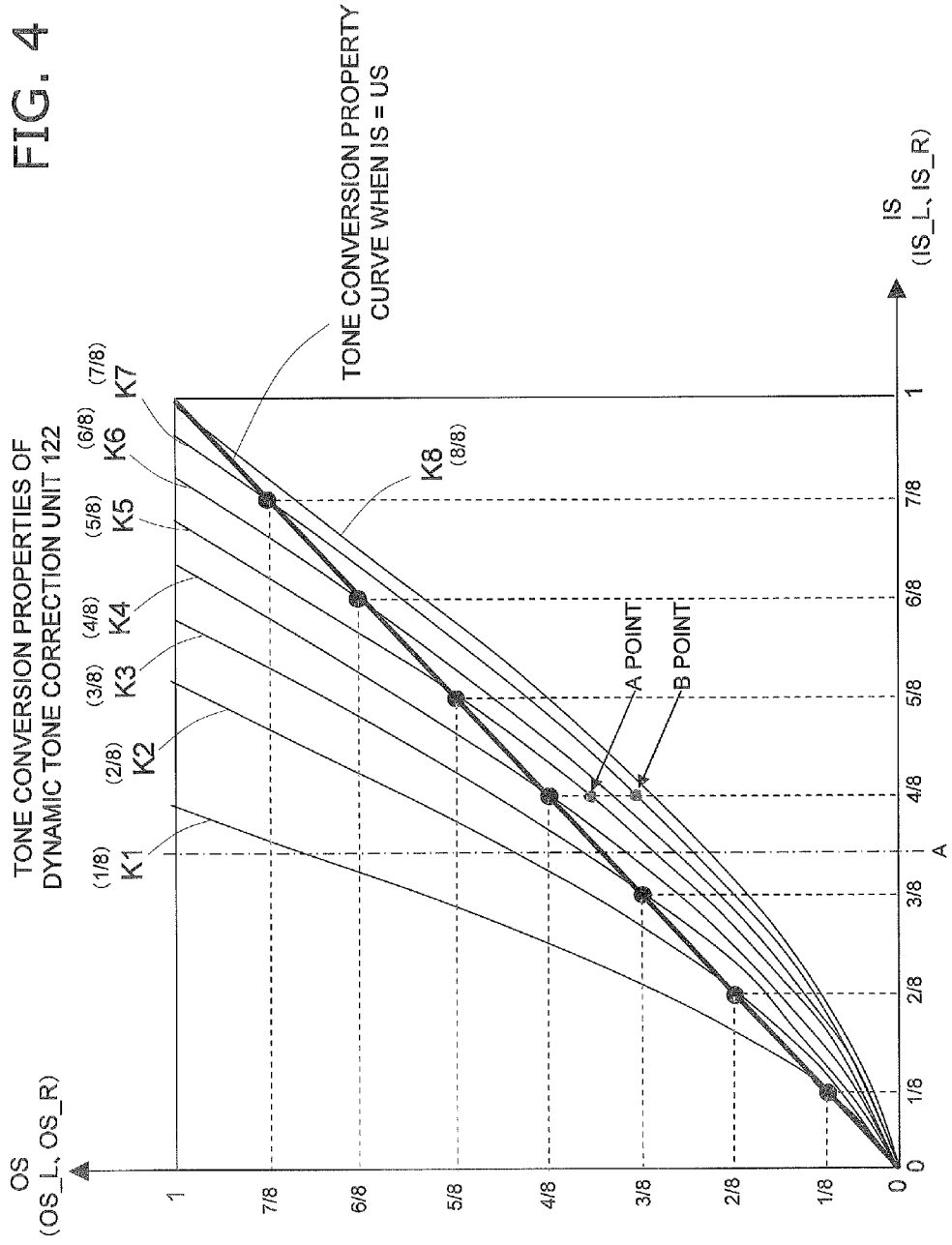
FIG. 4 is a graph illustrating conversion properties of a dynamic tone correction unit according to the first embodiment.

In FIG. 4, the horizontal axis represents the value of an IS signal (the luminance value IS_L of the L image signal or a luminance value IS_R of the R image signal) serving as an input signal, and the vertical axis represents the value of an OS signal (a tone-converted luminance value OS_L of the L image signal or a tone-converted luminance value OS_R of the R image signal) serving as an output signal; and tone conversion property curves K1 through K8, determined based on the value of the surrounding brightness signal US_L (or US_R), are graphed.

Note that in the graph shown in FIG. 4, the IS signal value, the OS signal value, and the value US (US_L or US_R) of the surrounding brightness signal are normalized to a range of [0:1].

The tone conversion property curves Kn (where n is an integer from 1 to 8) are a tone conversion curve group occurring when the value US (US_L or US_R) of the surrounding brightness signal is n/8 (where n is an integer from 1 to 8), and the tone conversion property curve group K1-K8 is set so that, in the case where the value of IS is fixed at a predetermined value (for example, at a value A shown in FIG. 4), the output value OS decreases monotonically as the value US of the surrounding brightness signal increases. Although the number in the tone conversion curve group is 8 in FIG. 4, it goes without saying that the number is not limited to this number. Meanwhile, a predetermined number of tone conversion curve groups may be set in the dynamic tone correction unit 122 (for example, a predetermined number of data specifying the tone conversion curve groups is saved in an LUT), and tone conversion curves aside from the pre-set tone conversion curve group may be realized through interpolation processes and so on. (For example, in the case of FIG. 4, a tone conversion curve for when US=3/16 may be derived through an interpolation process or the like using the tone conversion curve K1 for when US=1/8 and the tone conversion curve K2 for when US=2/8.)

Based on the tone conversion properties shown in FIG. 4, tone conversion is carried out on the IS signal value (the luminance value IS_L of the L image signal or the luminance value IS_R of the R image signal) serving as the input signal, resulting in a tone-converted image in which the overall brightness of the image is held constant while enhancing the local contrast. (In the case where the IS value and the US value are the same, the tone conversion processes corresponding to the black dots in FIG. 4 are carried out, and thus the IS value and the OS value match. As a result, the overall brightness of the image is held constant between before and after the tone conversion.)

As described above, the dynamic tone correction unit 122 performs a dynamic tone correction process on the IS signal (the luminance value IS_L of the L image signal or the luminance value IS_R of the R image signal) according to tone conversion properties such as those illustrated in FIG. 4, thus obtaining the OS signal (the tone-converted luminance value OS_L of the L image signal or the tone-converted luminance value OS_R of the R image signal). The dynamic tone correction unit 122 then outputs the OS signal (the tone-converted luminance value OS_L of the L image signal or the tone-converted luminance value OS_R of the R image signal) to the synthesizing unit 113L (a synthesizing unit 113R, in the case of the R image signal).

The strength generation unit 112L is inputted with the second depth information (L depth information) outputted from the depth generation unit 103, and based on the second depth information (L depth information), generates a first strength signal M1_L that sets the strength of the local tone conversion process (spatial vision process) (a method for generating the first strength signal M1_L will be described later). The strength generation unit 112L then outputs the first strength signal M1_L to the synthesizing unit 113L.

The synthesizing unit 113L is inputted with the L image signal (the luminance value IS_L of the L image signal) that is outputted from the image input unit 102 and that can form the L image, the OS_L signal outputted from the local tone conversion unit 111L, and the first strength signal M1_L outputted from the strength generation unit 112L. The synthesizing unit 113L synthesizes the IS_L signal and the OS_L signal based on the first strength signal M1_L. Through this, the synthesizing unit 113L obtains an L image signal Lout on which the local tone conversion process (spatial vision process) has been performed based on the strength set by the first strength signal M1_L. The synthesizing unit 113L then outputs the obtained output L image signal Lout.

The L image image correction unit 104L is thus configured in such a manner.

Note that the R image image correction unit 104R has a similar configuration as the L image image correction unit 104L, and differs from the L image image correction unit 104L only in that the inputted signals are the R image signal and the R depth information.

1.2: Operations of Three-Dimensional Image Capturing Apparatus

Operations of the three-dimensional image capturing apparatus 1000 configured as described thus far will be described hereinafter.

Note that in FIG. 1, the captured scene 200 includes a background 201 and a foreground 202. The foreground 202 corresponds to a primary subject. Operations performed by the three-dimensional image capturing apparatus 1000 using the case where the three-dimensional image capturing apparatus 1000 captures the captured scene shown in FIG. 1 in three dimensions as an example will now be described.

Note that for the sake of simplicity, an angle of convergence is set so that a center line of the angle of view captured by the first image capturing unit 101R of the three-dimensional image capturing apparatus 1000 (that is, a dot-dash line extending from 101R in FIG. 6) and a center line of the angle of view captured by the second image capturing unit 101L (a dot-dash line extending from 101L in FIG. 6) intersect at a distance (d2) at which the background 201 is located.

In addition, it is assumed that the foreground 202 (primary subject 202) is, for example, an object having a three-dimensional roundness (for example, an approximately oval-shaped object having a predetermined width when viewed from above (such as a person)).

Subject light from the captured scene 200 is collected by the first image capturing unit 101R disposed at the first point of view, and is converted into the first image signal (R image signal) by the image sensor in the first image capturing unit 101R. Likewise, subject light from the captured scene 200 is collected by the second image capturing unit 101L disposed at the second point of view, and is converted into the second image signal (L image signal) by the image sensor in the second image capturing unit 101L.

Note that the first image capturing unit 101R and the second image capturing unit 101L are disposed at a distance equivalent to an interaxial distance (stereo base length) so that the three-dimensional image capturing apparatus 1000 can obtain a three-dimensional image (a left eye image and a right eye image).

The first image signal (R image signal) outputted from the first image capturing unit 101R and the second image signal (L image signal) outputted from the second image capturing unit 101L are respectively inputted into the image input unit 102 and converted into digital signals by the image input unit 102. The first image signal (R image signal) and second image signal (L image signal) that have been converted into digital signals are then outputted to the depth generation unit 103 and the image correction unit 104.

From the first image (R image) formed based on the first image signal (R image signal) and the second image (L image) formed based the second image signal (L image signal), the depth generation unit 103 generates the first depth information (R depth information) that is depth information of the first image (R image) and the second depth information (L depth information) that is depth information of the second image (L image) through, for example, disparity matching.

Here, a method for generating the first depth information (R depth information) and the second depth information (L depth information) through disparity matching will be described using FIG. 5.

Figure 5:
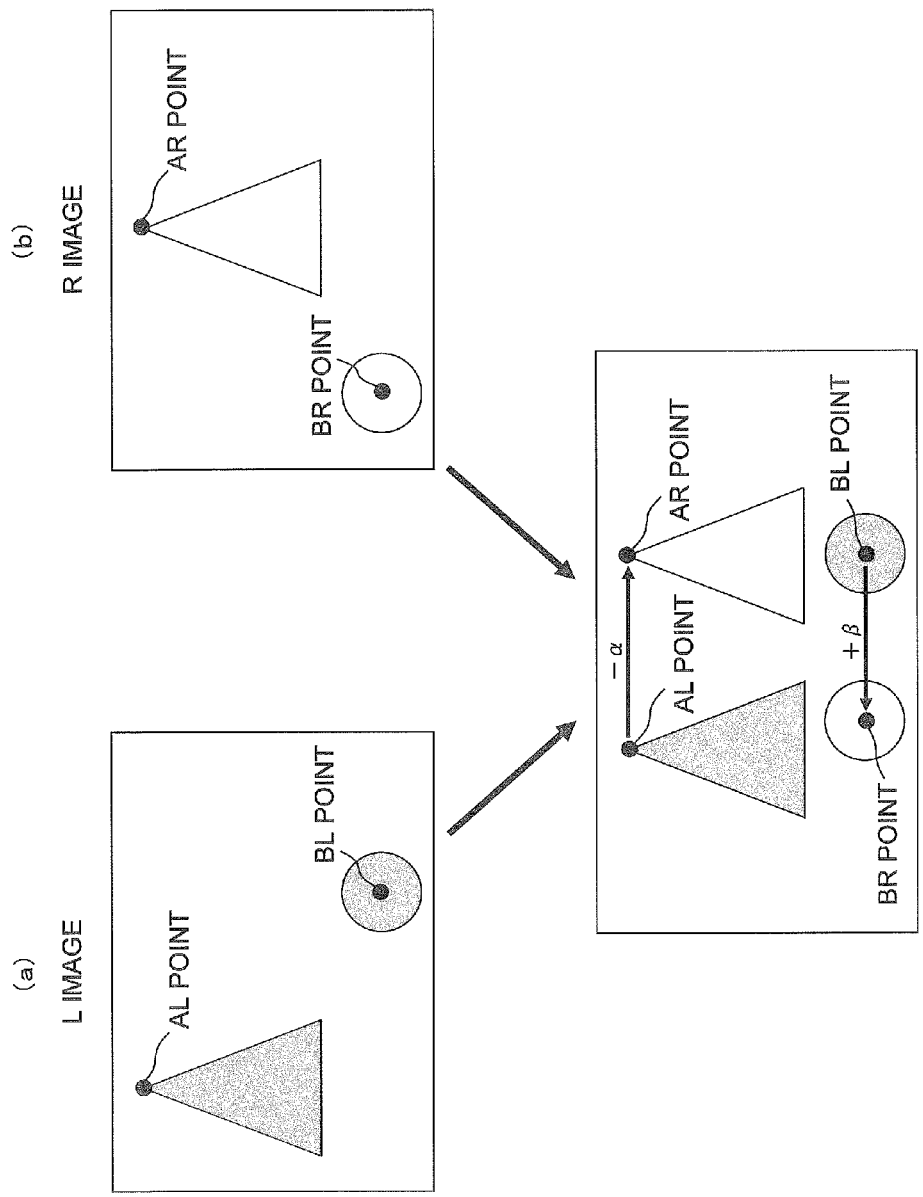
FIG. 5 is a diagram illustrating a method for generating first depth information (R depth information) and second depth information (L depth information) through disparity matching.

FIG. 5 is a diagram schematically illustrating a three-dimensional image produced when capturing a captured scene, in which a triangular object is disposed in the background and a circular object is disposed in the foreground, in three dimensions using the three-dimensional image capturing apparatus 1000. FIG. 5(a) is a diagram schematically illustrating the L image (left eye image), FIG. 5(b) is a diagram schematically illustrating the R image (right eye image), and FIG. 5(c) is a diagram illustrating the R image and the L image being overlapped and displayed as a single image.

The method for generating the first depth information (R depth information) and the second depth information (L depth information) through disparity matching is realized, for example, by executing the processes described in the following (1) through (3).

(1) First, the depth generation unit 103 uses the L image (left eye image) and the R image (right eye image) to detect that, for example, a subject A corresponding to a point AL in the L image shown in FIG. 5(a) (that is, the apex of the triangle in FIG. 5) corresponds to a point AR in the R image shown in FIG. 5(b).

(2) Then, a skew amount (disparity) Diff(A) between the two detected points, or the point AL and the point AR, is calculated.

Note that the disparity has a positive/negative symbol depending on the direction of the skew. This is, for example, positive in the case where the point in the R image is skewed to the left relative to the point in the L image, and negative when the reverse is true.

For example, in the case of FIG. 5, if it is assumed that an absolute value of the disparity for the subject A is $\alpha$ ($\geq 0$), the AR point in the R image is skewed to the right of the AL point in the L image, and thus the disparity for the subject A is calculated as "$-\alpha$". Likewise, if it assumed that an absolute value of the disparity for a subject B (the center point of the circle in FIG. 5) is $\beta$ ($\geq 0$), a BR point in the R image is skewed to the left of a BL point in the L image, and thus the disparity for the subject B is calculated as "$+\beta$".

(3) The depth generation unit 103 carries out the processes of (1) and (2) for all points (all pixels) in the image, and generates a disparity image that takes the calculated skew amounts (disparities) as pixel values. Then, a disparity image generated using the disparities calculated for the respective pixels in the L image as pixel values is taken as the L depth information (an L depth information image (a left eye image distance image)), and a disparity image generated using the disparities calculated for the respective pixels in the R image as pixel values is taken as the R depth information (an R depth information image (a right eye image distance image)).

For example, with the L depth information (L depth information image (left eye image distance image)), the value of the pixel corresponding to the AL point in the L image shown in FIG. 5(a) is $-\alpha$, which is the disparity of the subject A, whereas with the R depth information (R depth information image (right eye image distance image)), the value of the pixel corresponding to the AR point in the R image shown in FIG. 5(b) is $-\alpha$, which is the disparity of the subject A.

Note that "distance image" refers to an image in which for each pixel, a value having correlation with the distance between the actual location of the subject corresponding to each pixel (that is, a location within a three-dimensional space) and the location of the three-dimensional image capturing apparatus 1000 is mapped.

Note that the method for generating the first depth information (R depth information) and the second depth information (L depth information) through disparity matching is merely an example, and the method is not limited thereto. For example, the stated symbols for the disparities may be reversed. In addition, the depth generation unit 103 may obtain the left eye image distance image and the right eye image distance image, and may obtain the L depth information and the R depth information, using another method.

The L depth information and the R depth information generated as described above are respectively outputted to the image correction unit 104.

Cardboard Cutout Effect and Shadow Enhancement Processing

Here, a cardboard cutout effect and shadow enhancement processing (for example, a contrast enhancement process) in a three-dimensional image will be described using the drawings.

Figure 6:
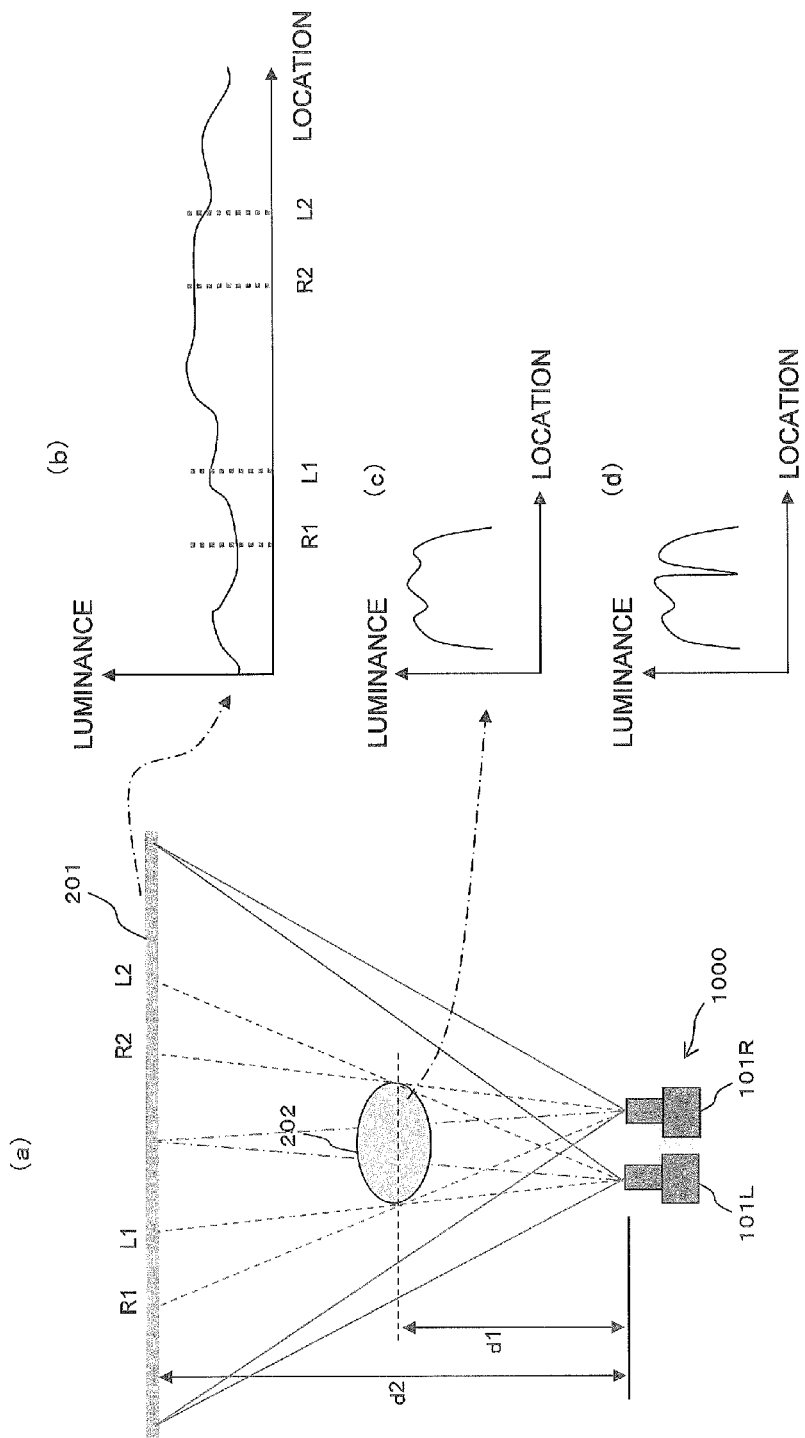
FIG. 6 is a diagram illustrating a relationship between an image capturing environment and a subject.

FIG. 6 is a diagram schematically illustrating (an example of) a relationship between an image capturing environment and the subject in the case where three-dimensional image capturing is carried out using the three-dimensional image capturing apparatus 1000. FIG. 6(a) is a diagram illustrating the image capturing environment (captured scene) 200, and the first image capturing unit 101R and the second image capturing unit 101L, as seen from above. In the image capturing environment (captured scene) 200, the primary subject 202 in the foreground and a subject 201 in the background are in a positional relationship such as that illustrated in FIG. 6(a). Although the subject 201 in the background is illustrated, for the sake of simplicity, as being a wall or the like on which a picture is drawn, it should be noted that the subject is not limited to such a subject, and it goes without saying that the subject may be any exemplary subject.

FIG. 6(b) illustrates a luminance distribution of the picture drawn on the subject 201 in the background, whereas FIG. 6(c) illustrates a frontal luminance distribution of the primary subject 202 in the foreground as seen from the three-dimensional image capturing apparatus 1000 (a camera). FIG. 6(d) illustrates another luminance distribution of the primary subject 202, which will be used in later descriptions.

Note that in FIGS. 6(b) through (d), the horizontal axis represents a position in the horizontal direction, whereas the vertical axis represents luminance.

The angle of convergence of the first image capturing unit 101R and second image capturing unit 101L of the three-dimensional image capturing apparatus 1000 is set so that the image capturing ranges match at the subject distance d2 of the background subject 201. In other words, the angle of convergence is set so that the points of convergence of the first image capturing unit 101R and the second image capturing unit 101L meet at the background subject 201 located at the subject distance d2. Accordingly, when a three-dimensional image obtained by capturing the image capturing scene shown in FIG. 6(a) in three dimensions is displayed in a display apparatus (a three-dimensional image display apparatus), a three-dimensional image is displayed in which the background subject 201 has an assigned position upon a display screen surface, the primary subject 202 has an assigned position that is in front of the display screen surface, and thus the primary subject 202 that is displayed appears to "jump out".

Positions L1 and L2 in FIG. 6 are background positions near the left and right ends of the subject 202 in the second image capturing unit 101L, whereas positions R1 and R2 are background positions near the left and right ends of the subject 202 in the first image capturing unit 101R. Note that the reason the angle of convergence is set as mentioned above is to simplify the descriptions, and thus the angle of convergence may be set in any desired manner.

Figure 7:
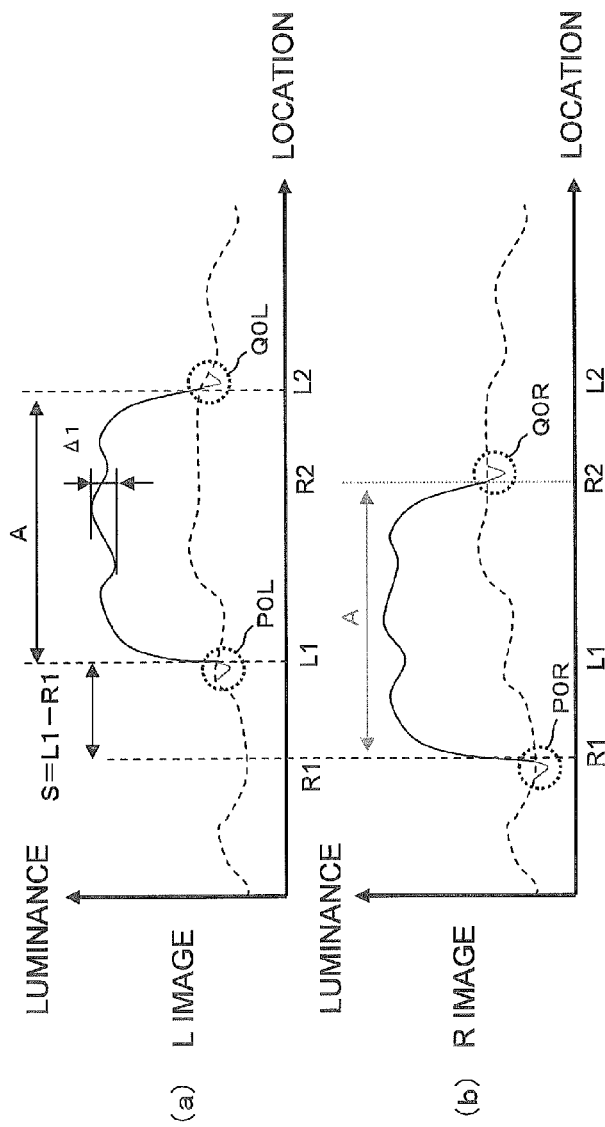
FIG. 7 illustrates examples of image signals captured by a first image capturing unit and a second image capturing unit.

FIG. 7 is a diagram illustrating a relationship between positions in the horizontal direction and luminances of a three-dimensional image (that is, an L image and an R image) obtained by capturing the image capturing scene 200 shown in FIG. 6 in three dimensions. Specifically, FIG. 7(a) is a diagram illustrating a relationship between the position in the horizontal direction and the luminance of the L image, whereas FIG. 7(b) is a diagram illustrating a relationship between the position in the horizontal direction and the luminance of the R image. A three-dimensional image having the luminance distribution shown in FIG. 7 corresponds to an image outputted by a conventional three-dimensional image capturing apparatus.

Note that in FIG. 7, the luminance of the background subject 201 is indicated by a dotted line, whereas the luminance of the primary subject 202 is indicated by a solid line. In addition, many cameras carry out aperture correction as a camera signal process, and thus a ringing effect (halos) often appear in the edge areas and the like of the captured image, as indicated by the regions P0L, Q0L, P0R, and Q0R in FIG. 7.

FIG. 7 illustrates a case in which the luminance of the primary subject 202 is higher than the luminance of the background subject 201, but the embodiment is not limited thereto, and the luminance of the background subject 201, the luminance of the primary subject 202, and so on may have different luminance distributions.

As for the luminance of the background subject 201, the L image and the R image are in the same position (that is, having the subject distance) (that is, the points of convergence are on the background subject 201 and there is no disparity in the background subject 201), and therefore the background subject 201 has an assigned position on the surface of the display screen. In other words, the luminance distribution of the L image and the luminance distribution of the R image in the background subject 201 are the same.

As opposed to this, the primary subject 202 corresponds to the positions L1-L2 in the L image and the positions R1-R2 in the R image. In other words, the region in the L image that the primary subject 202 corresponds to is further to the right than the region in the R image that the primary subject 202 corresponds to. For this reason, in the case where a three-dimensional image corresponding to FIG. 7 is displayed three-dimensionally, the primary subject 202 has an assigned position further toward the foreground than the display screen surface (that is, an assigned position in a position that "jumps out").

Note that in FIG. 7, A indicates the width of the primary subject 202, and S indicates an amount of shift in the position of the primary subject 202 between the L image and the R image (this corresponds to the disparity). In other words, S=L1−R1 or S=L2−R2. In addition, Δ1 in FIG. 7 indicates a luminance difference at a predetermined location in the primary subject 202.

Here, the following descriptions will be given assuming that the cardboard cutout effect is felt in the primary subject 202 when the three-dimensional image indicated in FIG. 7 is displayed in a display apparatus and viewed in three dimensions.

Note that the cardboard cutout effect is not only caused by distortion in the three-dimensional geometric expression caused by the aforementioned disparity between the two eyes, but is thought to also be caused by high-level mechanisms of human perception, such as a sense of the cardboard cutout effect occurring when objects appear as synthetic images due to their contours, colors, shapes, and so on.

The three-dimensional image capturing apparatus 1000 according to the present embodiment aims to ameliorate the sense of the cardboard cutout effect through shadow enhancement of local shadows or shade, performed by illuminating protrusions and recesses, bulges, and so on in the front surface of the primary subject 202.

Although various known methods exist for shadow enhancement (shadow enhancement processing), here, descriptions will be given using an example in which a local contrast enhancement process capable of enhancing the natural contrast by enhancing visual brightness contrast properties through image processing (for example, see the local contrast enhancement processes (spatial vision processes) disclosed in International Publication WO 2005/027043, International Publication WO 2007/043460, and so on).

Figure 8:
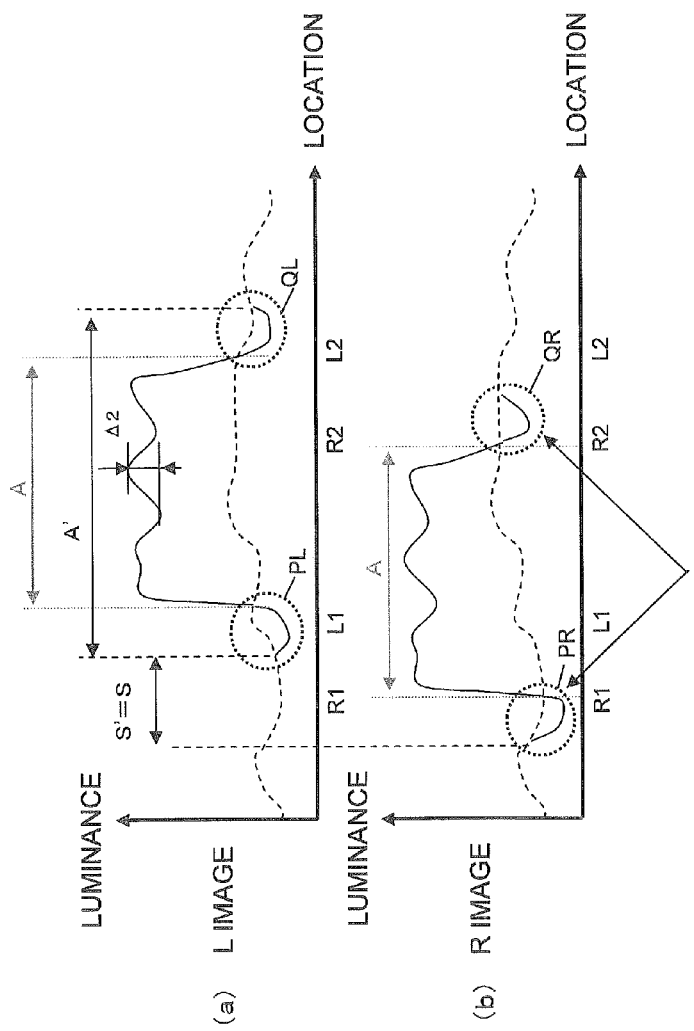
FIG. 8 illustrates an example of image quality correction performed using local contrast.

FIG. 8 is a diagram illustrating an example of image quality correction in which the aforementioned local contrast enhancement process has been carried out on the L image and the R image, respectively. Specifically, FIG. 8(a) is a diagram illustrating a relationship between the position in the horizontal direction and the luminance of the corrected L image of which image quality has been corrected, whereas FIG. 8(b) is a diagram illustrating a relationship between the position in the horizontal direction and the luminance of the corrected R image of which image quality has been corrected.

As a result of executing the local contrast enhancement process on the L image and the R image, a luminance difference Δ2 at the predetermined location in the primary subject 202 becomes Δ2>Δ1, the shadows in the primary subject 202 are enhanced, and therefore it can be considered that this improves the sense of three-dimensionality/sense of bulging within the object (that is, in regions that are further inward than the contour areas of the primary subject 202).

Accordingly, it was assumed that the cardboard cutout effect in the primary subject 202 will be ameliorated by carrying out the local contrast enhancement process on the three-dimensional image. However, it can be seen that in reality, the cardboard cutout effect is not reduced, and instead worsens.

The following causes (1) and (2) can be considered as causes for this.

(1) an increase in the cardboard cutout effect due to perceiving the image as a synthetic image As shown in FIG. 8, the local contrast is also enhanced at both end areas of the primary subject 202 when the local contrast enhancement processes are carried out on the three-dimensional image, and the luminance difference between the primary subject 202 and the background subject 201 is enhanced as a result. Due to this, a person will sense that the image has been synthesized by overlaying the primary subject 202 upon the background subject 201. It is thought that the sense of the cardboard cutout effect is exacerbated because there is a strong tendency for a human to sense that such a synthetic image is a flat image.

(2) an increase in the sense of the cardboard cutout effect due to a ringing effect Meanwhile, performing the local contrast enhancement process on the three-dimensional image causes a ringing effect, to arise in the background subject 201 in areas adjacent to the primary subject 202, which results from the brightness contrast between the background subject 201 and the primary subject 202. In this example, the primary subject 202 is surrounded by a background whose luminosity is reduced.

Such being the case, a person's vision will not match disparities with the background at this area treated as a background pattern, and will instead match disparities as darkened lines. As a result, the background on both sides of the primary subject 202 (the areas corresponding to regions PL, QL, PR, and QR in FIG. 8) are perceived as part of the foreground (the primary subject 202), and the width of the foreground (the width of the primary subject) is perceived not as the original width A but instead as a wider width A' (A'>A).

In actuality, the result is an unnatural three-dimensional image in which part of the background, which should be farther away, surrounds the foreground (the primary subject 202), and this is thought to exacerbate the sense of the cardboard cutout effect in the foreground (the primary subject 202).

Therefore, if shadow enhancement processing (for example, contrast enhancement processing), which was effective in conventional two-dimensional images, is applied as-is to a three-dimensional image, the cardboard cutout effect will be exacerbated in the three-dimensional image.

Accordingly, with the three-dimensional image capturing apparatus 1000, shadow enhancement processing that is suited to three-dimensional images is executed on the three-dimensional image, which properly prevents the cardboard cutout effect from being exacerbated. Specifically, by carrying out an image correction process on the three-dimensional image (the R image and the L image) using the image correction unit 104, shadow enhancement processing suited to three-dimensional images is executed, thus properly preventing the cardboard cutout effect from being exacerbated in the three-dimensional image.

1.2.1: Operations of Image Correction Unit 104

Next, operations performed by the image correction unit 104 will be described.

The L image image correction unit 104L executes processing on the L image using the L depth information and the R image image correction unit 104R executes processing on the R image using the R depth information, but because the details of those processes are the same, the following descriptions will focus on the L image image correction unit 104L.

Operations of Strength Generation Unit 112

First, operations performed by the strength generation unit 112L of the image correction unit 104L will be described.

Note that the operations performed by a strength generation unit 112R of the image correction unit 104R are the same as those performed by the strength generation unit 112L.

Figure 9:
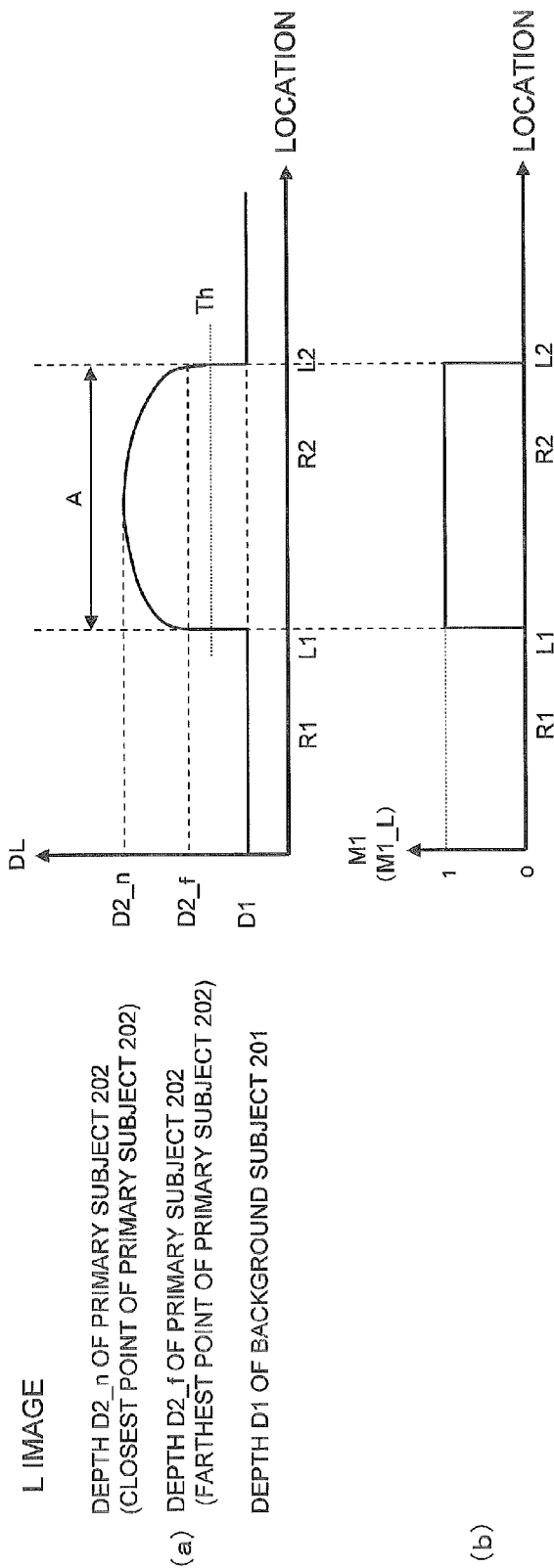
FIG. 9 is a diagram illustrating a signal waveform in a strength generation unit according to the first embodiment.

FIG. 9 is a diagram illustrating operations performed by a first strength generation unit 112L. FIG. 9(a) illustrates a location in the horizontal direction on the horizontal axis and a value of the L depth information on the vertical axis. In other words, DL in FIG. 9(a) indicates depth information (distance information) of the L image for a pixel location in the L image, and expresses the depth information (distance information) of the L image provided from the depth generation unit 103. Here, DL takes on a lower value for further distances (that is, greater subject distances), and takes on a higher value for closer distances (that is, lower subject distances).

Accordingly, as shown in FIG. 9(a), the depth information (distance information) of the primary subject 202 has a higher value than the depth information (distance information) of the background subject 201. Meanwhile, as shown in FIG. 9(a), the value of the L depth information of the primary subject 202 takes on a value in a range from D2_f to D2_n. In other words, the value of the L depth information at the closest point of the primary subject 202 is D2_n, and the value of the L depth information at the farthest point of the primary subject 202 is D2_f. Meanwhile, because the background subject 201 is a flat wall, the L depth information of the background subject 201 is a constant D1.

The strength generation unit 112L generates a first strength signal M1 (an L image first strength signal M1_L) shown in FIG. 9(b) by binarizing the inputted L depth information using a predetermined threshold Th. Note that in the case where the first strength signal M1 is generated from the L depth information, the following equation, in which two predetermined thresholds Th1 and Th2 (>Th1) are employed, may be used:

$$Th1 \leq (L\ depth\ information) \leq Th2$$

and in the case where that formula holds true, the value of the first strength signal M1 may be set to "1".

Then, the first strength signal M1 (L image first strength signal M1_L) generated by the strength generation unit 112L is outputted to the synthesizing unit 113L.

Operations of Local Tone Conversion Unit 111

Next, operations performed by the local tone conversion unit 111L of the image correction unit 104L will be described.

Note that the operations performed by a local tone conversion unit 111R of the image correction unit 104R are the same as those performed by the local tone conversion unit 111L.

The local tone conversion unit 111L executes a local tone conversion process on the inputted L image signal (corresponding to a pixel of interest in the L image) using a spatial visual processing. Specifically, the representative brightness value of the image region surrounding the pixel of interest (for example, an average brightness value (average luminance value) of the surrounding image region) is calculated by the surrounding brightness detection unit 121 of the local tone conversion unit 111L, and the calculated representative brightness value is outputted to the dynamic tone correction unit 122 as the surrounding brightness signal US_L.

The dynamic tone correction unit sets the properties of the tone conversion to be executed on the inputted L image signal (the pixel of interest in the L image) based on the surrounding brightness signal US_L outputted from the surrounding brightness detection unit 121. Specifically, a tone conversion property curve for performing the tone conversion on the pixel of interest is selected from the tone conversion property curves K1-K8 shown in FIG. 4, or is derived through an interpolation process or the like performed on the tone conversion property curves K1-K8, in accordance with the value of the surrounding brightness signal US_L. Then, the tone-converted L image signal is obtained as OS_L by performing tone conversion on the pixel of interest using the tone conversion property curve determined by the dynamic tone correction unit. The obtained tone-converted L image signal OS_L is then outputted to the synthesizing unit 113L.

Operations of Synthesizing Unit 113

The synthesizing unit 113L selects the tone-converted L image signal OS_L outputted from the local tone conversion unit 111L or an L image signal IS_L outputted from the image input unit 102 (that is, an L image signal on which the tone conversion process has not been executed) based on the value of the L image first strength signal M1_L.

In other words, the value of the L image first strength signal M1_L is "0" or "1", as shown in FIG. 9(b). Therefore, (1) in the case where M1_L=0, the synthesizing unit 113L selects and outputs the L image signal IS_L (the L image signal on which the tone conversion process has not been executed), whereas (2) in the case where M1_L=1, the synthesizing unit 113L selects and outputs the L image signal OS_L on which the local tone conversion process has been executed.

Figure 10:
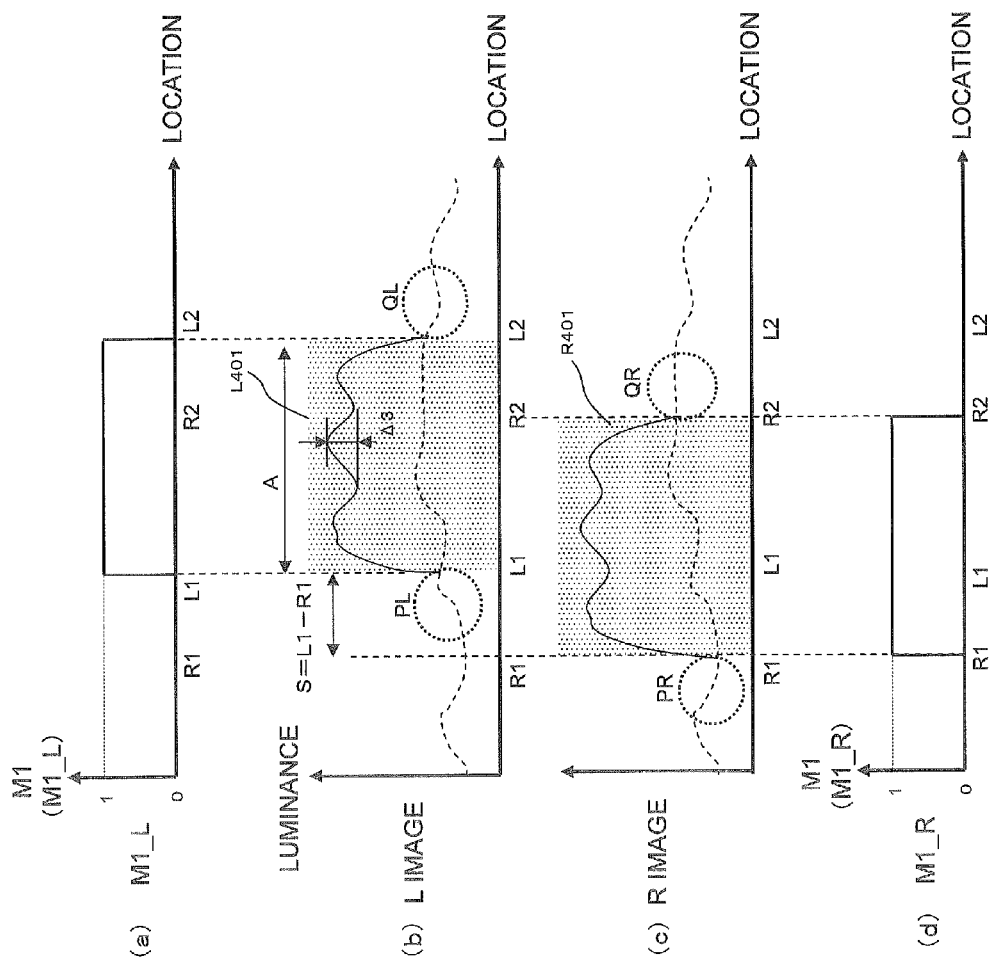
FIG. 10 illustrates a processing result from the image correction unit according to the first embodiment.

By the synthesizing unit 113L operating as described above, the image correction unit 104 executes the local tone conversion process only on image signals corresponding to the shaded regions in FIG. 10 (that is, a region L401 for the L image (a region in which the first strength signal M1_L is "1") and a region R401 for the R image (a region in which a first strength signal M1_R is "1")), and does not execute the local tone conversion process on image signals corresponding to regions outside of the shaded areas in FIG. 10.

Accordingly, the occurrence of ringing and the like in the regions PL, QL, PR, and QR shown in FIG. 10 is suppressed. As a result, the three-dimensional image obtained by the three-dimensional image capturing apparatus 1000 is a three-dimensional image in which the occurrence of the cardboard cutout effect is suppressed and a natural sense of three-dimensionality is achieved.

1.3: Three-dimensional Image Processing Method

Figure 11:
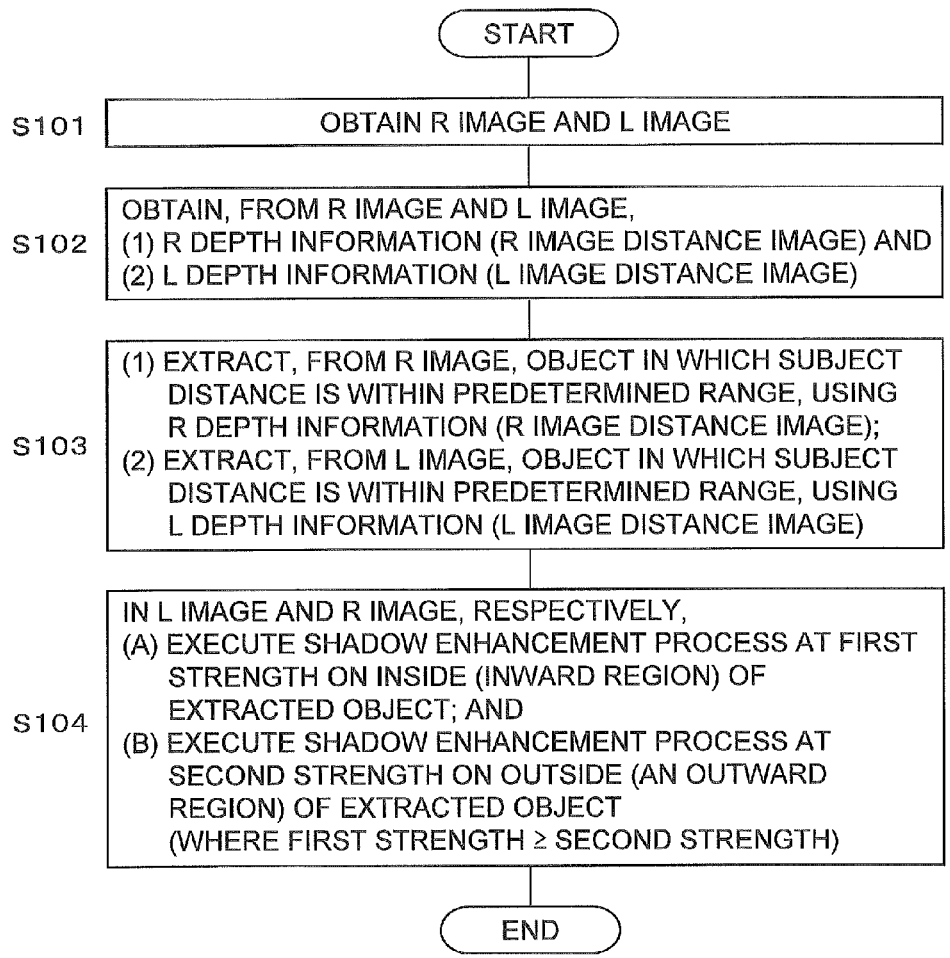
FIG. 11 is a flowchart illustrating a three-dimensional image processing method according to the first embodiment.

Next, a three-dimensional image processing method according to the present embodiment will be described using the flowchart in FIG. 11. Note that this three-dimensional image processing method is realized by, for example, a computer using a program. In this case, the primary element that performs the operations of the three-dimensional image processing method is, for example a CPU.

(S101): a left eye image (L image) and right eye image (R image) that can form a three-dimensional image are obtained.

(S102): the R depth information (R image distance image) and L depth information (L image distance image) are obtained from the R image and L image obtained in S101 through disparity matching.

(S103): (1) an object whose subject distance is within a predetermined range is obtained from the R image using the R depth information (R image distance image) obtained in S102; and (2) an object whose subject distance is within a predetermined range is obtained from the L image using the L depth information (L image distance image).

Note that here, it is preferable for the "predetermined range" to be, for example, a value set so that an object corresponding to a person can be detected as a single object. Making such a setting makes it possible to accurately obtain an object present at approximately the same subject distance.

In addition, the process for obtaining the object may be carried out by manually obtaining (extracting) the object. Information regarding the obtainment of the object may be inputted from the exterior, and the object may be obtained based on that information.

(S104): for each of the L image and the R image, (A) shadow enhancement processing is executed on the inside (an inward region) of the obtained object at a first strength, and (B) shadow enhancement processing is executed on the outside (an outward region) of the obtained object at a second strength.

Note that it is assumed that the first strength≥the second strength. In other words, a stronger shadow enhancement processing (for example, a local contrast enhancement process) is executed on the inside (the inward region) of the obtained object.

Note that the second strength includes a strength that does not execute the shadow enhancement processing. For example, the second strength may be set to "0" and no shadow enhancement processing carried out on the outside (the outward region) of the obtained object, and the first strength may be set to "1" and the shadow enhancement processing carried out on the inside (the inward region) of the obtained object.

In the above three-dimensional image processing method, a three-dimensional image is corrected by executing shadow enhancement processing on the inside (the inward region) of an object in the three-dimensional image at a higher strength then on the outside (the outward region) of the object, and as a result, the three-dimensional image on which the stated three-dimensional image processing method has been executed is a three-dimensional image in which the occurrence of a ringing effect and the like at the contours of the object is properly suppressed, which in turn properly suppresses the occurrence of the cardboard cutout effect.

Second Embodiment

Next, a second embodiment will be described.

Like the first embodiment, the second embodiment will describe a dual-lens three-dimensional image capturing apparatus (digital camera, video camera, or the like) as an example of the three-dimensional image processing apparatus.

2.1: Configuration of Three-dimensional Image Capturing Apparatus

The configuration of the three-dimensional image capturing apparatus according to the second embodiment is similar to as the configuration of the three-dimensional image capturing apparatus 1000 according to the first embodiment.

The three-dimensional image capturing apparatus according to the second embodiment differs from the three-dimensional image capturing apparatus 1000 according to the first embodiment in the details of the processing performed by the strength generation units 112L and 112R of the image correction unit 104 and the details of the processing performed by the synthesizing units 113L and 113R.

Accordingly, the following will describe the details of the processing performed by the strength generation units 112L and 112R, and the details of the processing performed by the synthesizing units 113L and 113R, in the three-dimensional image capturing apparatus according to the present embodiment.

Note that as in the first embodiment, the processing performed on the R image is the same as the processing performed on the L image, and thus the processing performed on the L image will primarily be described.

2.2: Operations of Three-dimensional Image Capturing Apparatus

Operations of Strength Generation Unit 112

First, operations performed by the strength generation unit 112L of the image correction unit 104L will be described.

Note that the operations performed by a strength generation unit 112R of the image correction unit 104R are the same as those performed by the strength generation unit 112L.

Figure 12:
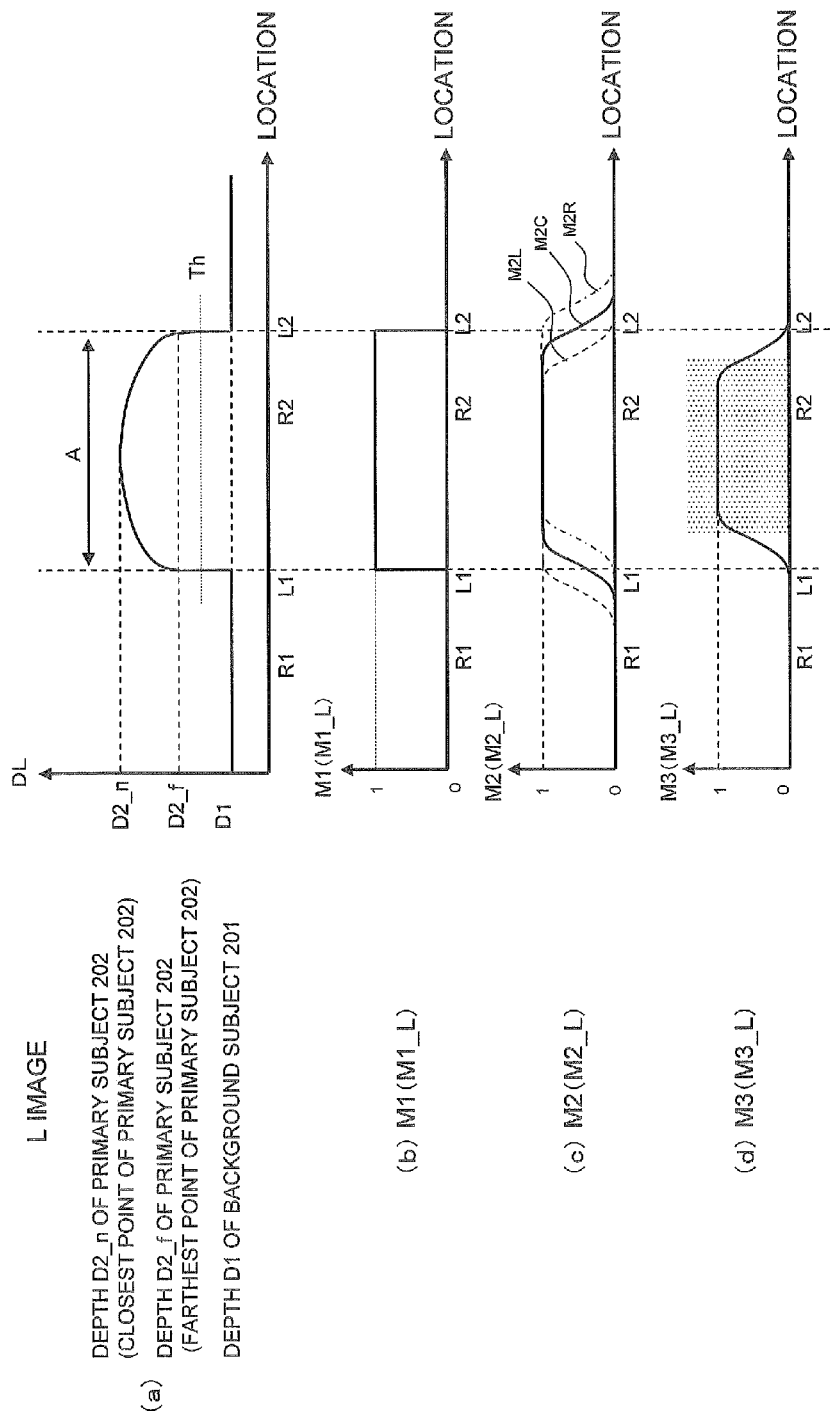
FIG. 12 is a diagram illustrating a signal waveform in a strength generation unit according to a second embodiment.

FIG. 12 is a diagram illustrating operations performed by the first strength generation unit 112L. FIG. 12(*a*) illustrates a location in the horizontal direction on the horizontal axis and a value of the L depth information on the vertical axis. In other words, DL in FIG. 12(*a*) indicates depth information (distance information) of the L image for a pixel location in the L image, and expresses the depth information (distance information) of the L image provided from the depth generation unit 103. Here, DL takes on a lower value for further distances (that is, greater subject distances), and takes on a higher value for closer distances (that is, lower subject distances).

Accordingly, as shown in FIG. 12(*a*), the depth information (distance information) of the primary subject 202 has a higher value than the depth information (distance information) of the background subject 201. Meanwhile, as shown in FIG. 12(*a*), the value of the L depth information of the primary subject 202 takes on a value in a range from D2_*f* to D2_*n*. In other words, the value of the L depth information at the closest point of the primary subject 202 is D2_*n*, and the value of the L depth information at the farthest point of the primary subject 202 is D2_*f*. Meanwhile, because the background subject 201 is a flat wall, the L depth information of the background subject 201 is a constant D1.

The strength generation unit 112L generates the first strength signal M1 (the L image first strength signal M1_L) shown in FIG. 12(*b*) by binarizing the inputted L depth information using a predetermined threshold Th. Note that in the case where the first strength signal M1 is generated from the L depth information, the following equation, in which predetermined two thresholds Th1 and Th2 (>Th1) are employed, is used:

$$Th1 \leq (L \text{ depth information}) \leq Th2$$

and in the case where that formula holds true, the value of the first strength signal M1 may be set to "1".

Next, the strength generation unit 112L uses a low-pass filter (not shown) to impose a bandwidth limit on (1) the first strength signal M1, (2) the result of shifting the first strength signal M1 to the left by a predetermined number of pixels, and (3) the result of shifting the first strength signal M1 to the right by a predetermined number of pixels, thus obtaining three signals, or a signal M2C, a signal M2L, and a signal M2R, as shown in FIG. 12(*c*).

Then, the strength generation unit 112L carries out processing corresponding to the following formula on the signal M2C, the signal M2L, and the signal M2R, and obtains a third strength signal M3 (FIG. 12(*d*)) that is a signal composed of the minimum signal values of the stated three signals.

$$M3 = \min(M2C, M2L, M2R)$$

The third strength signal M3 is a signal in which the inside (the areas inward from the contours of the primary subject 202) of an object in the foreground (that is, the primary subject 202) is detected, and is thus outputted to the synthesizing unit 113 from the strength generation unit 112L as a third strength signal M3_L.

Operations of Synthesizing Unit 113

The synthesizing unit 113L synthesizes the tone-converted L image signal OS_L outputted from the local tone conversion unit 111L and the L image signal IS_L outputted from the image input unit 102 (that is, an L image signal on which the tone conversion process has not been executed) based on the value of the L image third strength signal M3_L.

Specifically, the synthesizing unit 113L obtains an output L image signal Lout by executing processing corresponding to the following formula. In other words, the synthesizing unit 113L obtains the output L image signal Lout by blending (synthesizing) through internal division of the L image signal (the pixel value of the pixel of interest) IS_L and the L image signal OS_L resulting from executing the contrast enhancement process on the L image signal IS_L, using the L image third strength signal M3_L as an internal division ratio.

$$Lout=(OS\_L-IS\_L)*M3\_L+IS\_L$$

Through this, with the three-dimensional image capturing apparatus according to the present embodiment, a three-dimensional image whose local contrast is enhanced central to the shaded region in FIG. 12 (the L image, in FIG. 12) can be obtained.

Figure 13:
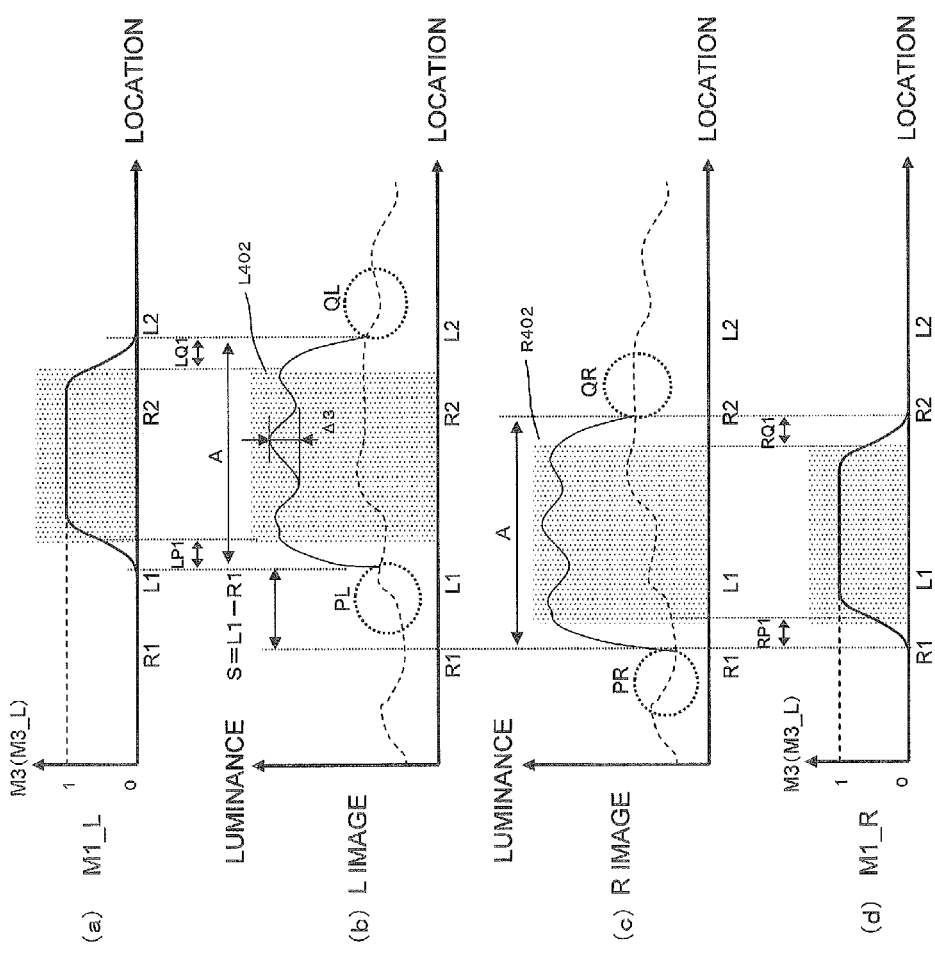
FIG. 13 illustrates a processing result from an image correction unit according to the second embodiment.

By the synthesizing unit 113L operating as described above, (1) the image correction unit 104 can execute a high-strength local tone conversion process on image signals corresponding to the shaded regions in FIG. 13 (a region L402 for the L image and a region R402 for the R image), (2) can avoid executing the local tone conversion process on image signals corresponding to regions aside from the primary subject 202 (regions aside from the region A in FIG. 13), and (3) can change the processing strength of the local tone conversion process (that is, the contrast enhancement strength) so as to continuously increase the further inward in the primary subject 202 the location is, for inward regions near the contours of the primary subject 202 (for example, regions LP1, LQ1, RP1, and RQ1 in FIG. 13).

Accordingly, with the three-dimensional image capturing apparatus according to the present embodiment, the occurrence of a ringing effect or the like in the regions PL, QL, PR, and QR shown in FIG. 13 can be suppressed, and the degree (strength) of the shadow enhancement (for example, local contrast enhancement) can be continually changed as the location within the object (for example, the primary subject 202) progresses inward from the contour areas of the object. For this reason, with the three-dimensional image capturing apparatus according to the present embodiment, improper correction processing (shadow enhancement processing or the like) that would cause the occurrence of the cardboard cutout effect is not executed on image signals corresponding to the vicinity of the contours of an object (a predetermined object corresponding to the subject), whereas proper shadow enhancement processing (for example, local contrast enhancement processing) can be executed on image signals corresponding to the inside of the object (the predetermined object corresponding to the subject). As a result, a three-dimensional image obtained by the three-dimensional image capturing apparatus according to the present embodiment is an image having a reduced sense of the cardboard cutout effect and a natural sense of three-dimensionality.

Object Detection Using Depth Information (Distance Information)

It is necessary to take care to note that the "object" discussed in the aforementioned embodiment refers to a subject at approximately the same subject distance. For example, assume that a vertical black line is drawn on the surface of the primary subject 202 (see FIG. 6(d)).

Figure 14:
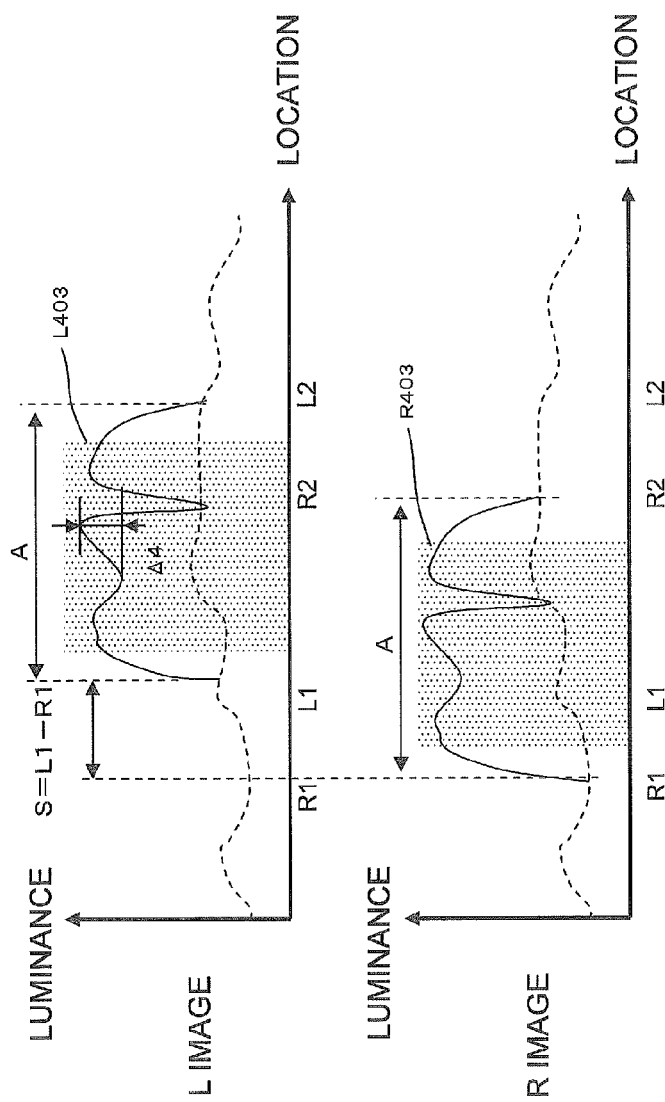
FIG. 14 illustrates a processing result from the image correction unit according to the first embodiment.

In this case, if the object is detected (extracted) through a simple contour extraction process (that is, a contour extraction process that does not use distance information), the object will appear as two objects. However, in a three-dimensional image that uses two images, or a left eye image and a right eye image, it can be seen that these two objects have approximately the same disparity S. In other words, with the three-dimensional image capturing apparatus according to the present invention, the disparity of respective objects can be obtained by the depth generation unit 103, and thus it can easily be determined whether or not two objects detected through a simple contour extraction process (a contour extraction process that does not use distance information) are at approximately the same subject distance. Therefore, with the three-dimensional image capturing apparatus according to the present invention, the primary subject 202 is not erroneously detected as two objects, and can be detected as a single object with certainty, even in the case where a vertical black line is drawn on the surface of the primary subject 202 as described above. For this reason, with the three-dimensional image capturing apparatus according to the present invention, the region within the object (primary subject 202) can be detected, with certainty, as the region A shown in FIG. 14 (or that regions on which the three-dimensional image capturing apparatus according to the second embodiment carries out a shadowing process at a predetermined or greater strength are L403 and R403 (regions corresponding to L402 and L402 in FIG. 13, in the case where the primary subject 202 is as shown in FIG. 6(c)).

Through this, with the three-dimensional image capturing apparatus according to the present invention, if the primary subject 202 is a person, problems such as clothing and hands being treated as being distanced from each other and so on can be avoided.

Note that the second embodiment provides descriptions of a case in which a local contrast enhancement process having a strength greater than or equal to a predetermined value is carried out on the region 402 (the regions L402 and R402), whereas a contrast enhancement process is carried out on object contour regions at a low strength (a strength that is less than the predetermined value). However, in the case where the object contours of the primary subject 202 are originally slightly blurry in the L image and the R image, it is preferable to apply a slight amount of local contrast enhancement, rather than applying no local contrast enhancement at all.

In addition, there are cases where due to pre-existing signal processing, the ringing effect is already slightly present in the object contour areas of the primary subject 202 in the L image and the R image. In such a case, it is preferable to remove the ringing effect by reducing the strength of the local contrast enhancement process (setting the strength amount to "1" or less (setting the value of the third strength signal to "1" or less) and adding blur).

It can thus be seen that a variety of cases exist, but what is common in all cases is that the contrast strength amount in the region 402 (the regions L402 and R402) is set to be greater than the contrast strength amount at the object contour regions (regions corresponding to a predetermined width to the left and right of the object contours).

To summarize the processing of the present embodiment, in the case where a subject at approximately the same subject distance is taken as the object, the contrast strength amount for the interior regions of the object at approximately the same subject distance is set to be greater than the contrast strength amount for contour regions of an object for which the subject distance changes.

2.3: Three-dimensional Image Processing Method

Figure 15:
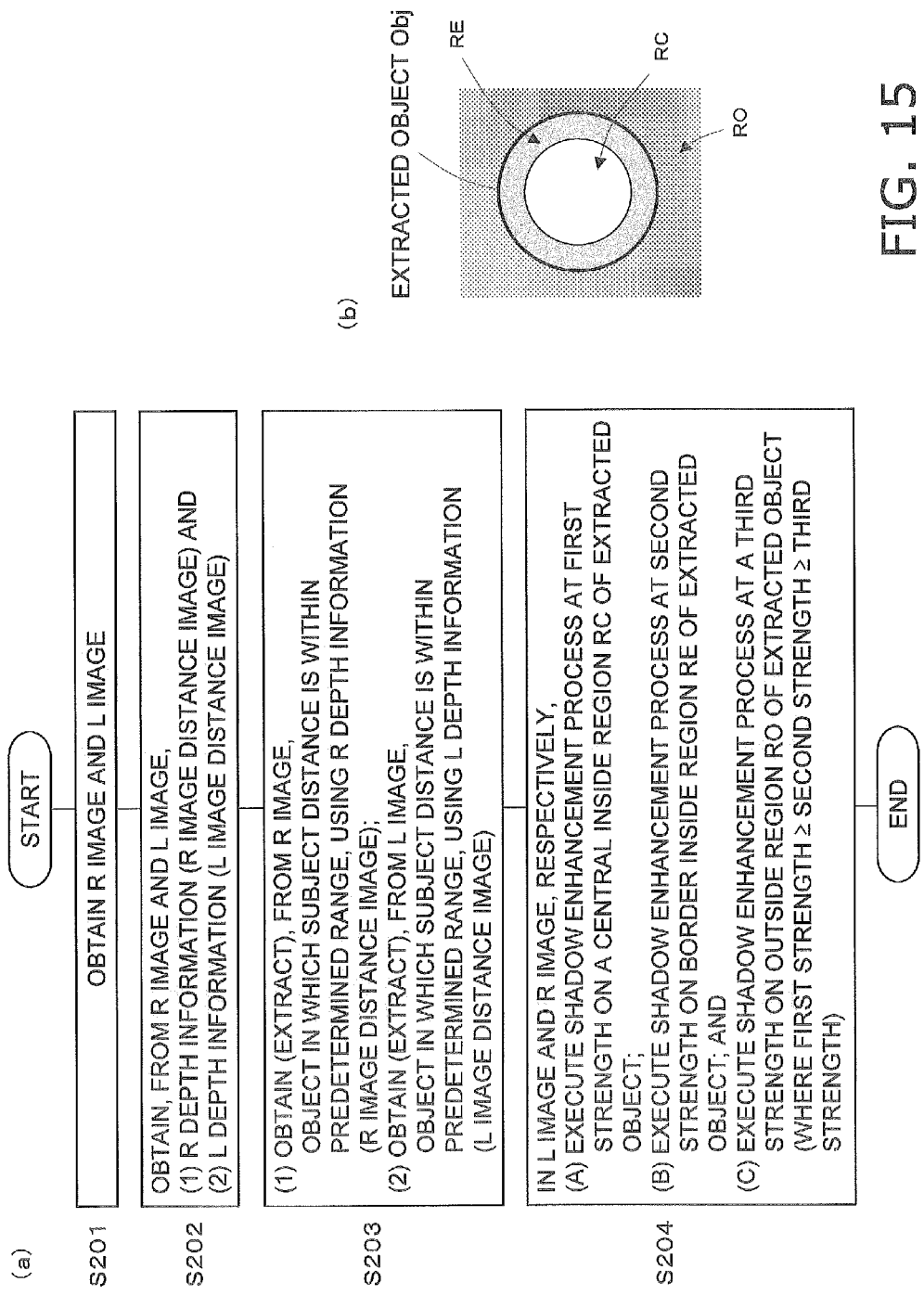
FIG. 15 is a flowchart illustrating a three-dimensional image processing method according to the second embodiment.

Next, a three-dimensional image processing method according to the present embodiment will be described using the flowchart in FIG. 15(a). Note that this three-dimensional image processing method is realized by, for example, a computer using a program. In this case, the primary element that performs the operations of the three-dimensional image processing method is, for example a CPU.

(S201): a left eye image (R image) and right eye image (L image) that can form a three-dimensional image are obtained.

(S202): the R depth information (R image distance image) and L depth information (L image distance image) are obtained from the R image and L image obtained in S201 through disparity matching.

(S203): (1) an object whose subject distance is within a predetermined range is extracted from the R image using the R depth information (R image distance image) obtained in S202; and (2) an object whose subject distance is within a predetermined range is extracted from the L image using the L depth information (L image distance image).

Note that here, it is preferable for the "predetermined range" to be, for example, a value set so that an object corresponding to a person can be detected as a single object. Making such a setting makes it possible to accurately extract an object present at approximately the same subject distance.

(S204): for each of the L image and the R image, (A) shadow enhancement processing is executed on a central inside region RC of the extracted object at a first strength, (B) shadow enhancement processing is executed on a border inside region RE of the extracted object at a second strength, and (C) shadow enhancement processing is executed on an outside region RO of the extracted object at a third strength.

Note that it is assumed that the first strength≥the second strength≥the third strength.

Meanwhile, the "central inside region RC" refers to an internal region of the extracted object that excludes the regions in the vicinity of the contours thereof, and for example, corresponds to the region indicated as a region RC that is present on the inside (the inward area) of an extracted object Obj in FIG. 14(b).

Furthermore, the "border inside region RE" refers to the regions in the vicinity of the contours of the extracted object, and for example, corresponds to the region indicated as a region RE that is an interior region in the vicinity of the contour areas of the extracted object Obj in FIG. 14(b).

Further still, the "outside region RO" refers to a region that is outside (in an outward area) of the extracted object, and for example, in FIG. 14(b), corresponds to a region indicated as a region RO that is outside of the extracted object Obj in FIG. 14(b).

Furthermore, it is preferable for the second strength in the border inside region RE to continually change.

In the stated three-dimensional image processing method, shadow enhancement processing is executed on a three-dimensional image at a higher strength as the location progresses from the outside (an outer-side region) of an object in the three-dimensional image toward the inside (and interside region) of the object. Through this, the three-dimensional image on which the stated three-dimensional image processing method has been executed is a three-dimensional image that properly suppresses the occurrence of the ringing effect and the like at the contour areas of the object and that properly suppresses the occurrence of the cardboard cutout effect.

Third Embodiment

Next, a third embodiment will be described.

In the present embodiment, a technique for implementing three-dimensional image processing that darkens shadows will be described.

The techniques in the aforementioned embodiments are techniques for enhancing the brightness contrast, and thus although shadows are enhanced, the brightness of areas aside from shadows is also enhanced.

The inventors of the present invention realize that enhancing only areas of shadow in a three-dimensional image is effective for naturally enhancing the sense of three-dimensionality and the sense of depth (that is, for realizing a natural sense of three-dimensionality and a natural sense of depth).

In order to increase the sense of three-dimensionality, it is desirable to enhance natural shadows as much as possible. Enhancing only the amount of shadow produced by protrusions and recesses in the surface of an object is natural and highly effective for obtaining a heightened sense of three-dimensionality (protrusions and recesses).

The method for enhancing the local contrast described in the aforementioned embodiments is a method that enhances the brightness contrast, and although the shadows are enhanced with such a method, areas aside from the shadows are also enhanced. For example, with a method that enhances the local contrast, the local intensity of light is enhanced, and thus not only are shadows enhanced, but brightness is also enhanced. In addition, with the method that enhances the local contrast, elements that have no relation to shadows, such as changes in color, changes in brightness (changes in reflectance), and so on, on the surface of the object, are enhanced as well. For this reason, when viewed by a person, a three-dimensional image obtained through the method of enhancing the local contrast does not appear to have its shadows enhanced, and instead tends to appear only as an overall sharper scene, rather than having an increased sense of three-dimensionality.

In light of this, the present embodiment describes a three-dimensional image processing technique capable of obtaining a three-dimensional image having a more natural sense of three-dimensionality and sense of depth by selectively enhancing areas of shadow (that is, by performing a three-dimensional image process that darkens shadows).

Like the aforementioned embodiments, the third embodiment will describe a dual-lens three-dimensional image capturing apparatus (digital camera, video camera, or the like) as an example of the three-dimensional image processing apparatus. Note, however, that the three-dimensional image processing apparatus is not limited to a dual-lens three-dimensional image capturing apparatus, and the three-dimensional image processing apparatus may, for example, be a multi-viewpoint three-dimensional image capturing apparatus.

The configuration of the three-dimensional image capturing apparatus according to the third embodiment is similar to the configuration of the three-dimensional image capturing apparatus 1000 according to the first embodiment.

The three-dimensional image capturing apparatus according to the third embodiment replaces the local tone conversion units 111L and 111R of the image correction unit 104 in the three-dimensional image capturing apparatus 1000 of the first embodiment with local tone conversion units 111AL and 111AR. The three-dimensional image capturing apparatus according to the third embodiment differs from the three-dimensional image capturing apparatus 1000 according to the first embodiment in this respect. The three-dimensional image capturing apparatus according to the third embodiment is the same as the three-dimensional image capturing apparatus according to the first embodiment in other respects.

Accordingly, the following will describe the configurations and processing details of the local tone conversion units 111AL and 111AR in the three-dimensional image capturing apparatus according to the present embodiment.

Note that as in the first embodiment, the processing performed on the R image is the same as the processing performed on the L image, and thus the processing performed on the L image will primarily be described.

3.1 Local Tone Conversion Unit 111AL

Figure 16:
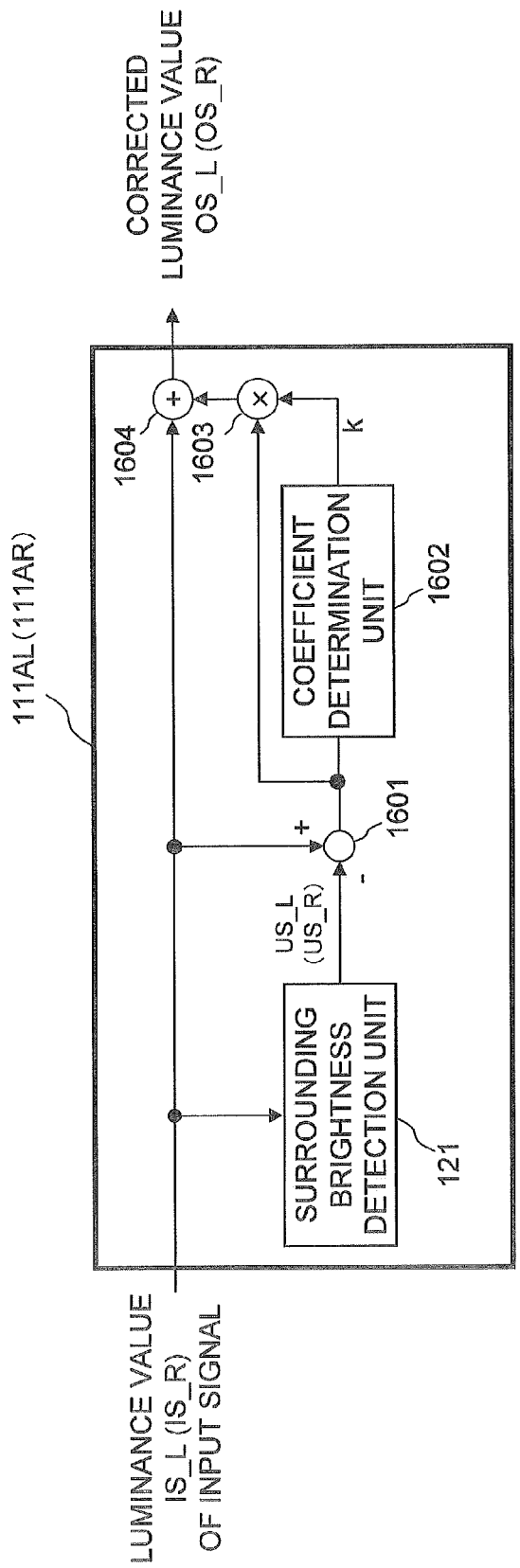
FIG. 16 is a block diagram illustrating a local tone conversion unit 111AL (111AR) according to a third embodiment.

As shown in FIG. 16, the local tone conversion unit 111AL includes the surrounding brightness detection unit 121, a subtractor 1601, a coefficient determination unit 1602, a multiplier 1603, and an adder 1604.

The surrounding brightness detection unit 121 is the same as the surrounding brightness detection unit 121 in the aforementioned embodiments. The surrounding brightness detection unit 121 is inputted with the L image signal (the luminance value IS_L of the L image signal) that is outputted from the image input unit 102 and that can form the L image, and calculates, for a region surrounding a pixel of interest (a pixel to be processed in the L image) that corresponds to the luminance value IS_L of the L image signal (the region being an image region in the periphery of the pixel of interest in the L image), a representative brightness value (for example, the average luminance value of all pixels included in the stated surrounding region). The surrounding brightness detection unit 121 then outputs the calculated representative brightness value of the image region in the periphery of the pixel of interest to the subtractor 1601 as the surrounding brightness signal US_L.

The subtractor 1601 is inputted with the luminance value IS_L of the L image signal and the surrounding brightness signal US_L, carries out a subtraction process corresponding to the following formula:

$$(IS\_L) - (US\_L)$$

and outputs a differential signal ((IS_L)−(US_L)) obtained through the subtraction process to the coefficient determination unit 1602 and the multiplier 1603.

The coefficient determination unit 1602 is inputted with the differential signal ((IS_L)−(US_L)), and carries out the following processing based on the value of that differential signal.

(1) In the case where the signal value of the differential signal ((IS_L)−(US_L)) is negative (that is, the case where IS_L≤US_L), k is set to k1, and the set coefficient k (=k1) is outputted to the multiplier 1603; whereas (2) in the case where the signal value of the differential signal ((IS_L)−(US_L)) is not negative (that is, the case where IS_L≥US_L), k is set to k2 (where k2<k1), and the set coefficient k (=k2) is outputted to the multiplier 1603.

The multiplier 1603 is inputted with the differential signal ((IS_L)−(US_L)) outputted from the surrounding brightness detection unit 121 and the coefficient k outputted from the coefficient determination unit 1602, and performs a multiplication process corresponding to:

$$k \times ((IS\_L) - (US\_L))$$

The multiplication signal (k×((IS_L)−(US_L))) obtained through this multiplication process is then outputted to the adder 1604.

The adder 1604 is inputted with the luminance value IS_L of the L image signal and the multiplication signal (k×((IS_L)−(US_L))) outputted from the multiplier 1603, and by adding the two together, obtains the corrected luminance value OS_L. In other words, the adder 1604 carried out processing corresponding to $$OS\_L = IS\_L + k \times ((IS\_L) - (US\_L))$$

and obtains the corrected luminance value OS_L.

As described above, the local tone conversion unit 111AL:
(1) executes processing corresponding to the following formula in the case where the signal value of the differential signal ((IS_L)−(US_L)) is negative (that is, the case where IS_L<US_L):

$$OS\_L = IS\_L + k1 \times ((IS\_L) - (US\_L))$$

and obtains the corrected luminance value OS_L; and (2) executes processing corresponding to the following formula in the case where the signal value of the differential signal ((IS_L)−(US_L)) is not negative (that is, the case where IS_L≥US_L):

$$OS\_L = IS\_L + k2 \times ((IS\_L) - (US\_L))$$

(where k2<k1)
and obtains the corrected luminance value OS_L.

In other words, in the stated processing, (1) in the case where the brightness (luminance value) of the pixel to be processed is lower than the brightness (for example, the average luminance value) in the periphery of the pixel to be processed, the value of the coefficient k is set to a high value k1 (>k2), increasing the strength of unsharp masking; and (2) in the case where the brightness (luminance value) of the pixel to be processed is higher than the brightness (for example, the average luminance value) in the periphery of the pixel to be processed, the value of the coefficient k is set to a low value k2 (<k1), reducing the strength of unsharp masking.

Through this, the three-dimensional image processing apparatus according to the present embodiment can implement an image process that darkens shadows.

In other words, with the three-dimensional image processing apparatus according to the present embodiment, in the case where the brightness (luminance value) of the pixel to be processed is lower than the brightness (for example, the average luminance value) of the periphery of the pixel to be processed, the value of the coefficient k is set to a high value k1 (>k2), and thus a higher amount of change ((IS_L)−(US_L)) in the image region that includes the pixel to be processed is added. Accordingly, the strength of the enhancement of the unsharp masking is increased. As a result, areas of shadow in the three-dimensional image are enhanced (that is, three-dimensional image processing is executed so that the shadows are darkened). (The L image correction unit 104L of the three-dimensional image processing apparatus according to the present embodiment executes processing using the corrected luminance value OS_L in which areas of shadow have been enhanced, and thus the areas of shadow in the three-dimensional image are enhanced.)

On the other hand, in the three-dimensional image processing apparatus according to the present embodiment, in the case where the brightness (luminance value) of the pixel to be processed is higher than the brightness (for example, the average luminance value) of the periphery of the pixel to be processed, the value of the coefficient k is set to a low value k2 (<k1), and thus a lower amount of change ((IS_L)−(US_L)) in the image region that includes the pixel to be processed is added. Accordingly, the strength of the enhancement of the unsharp masking is reduced (the unsharp masking effect is weakened). As a result, areas aside from shadows in the three-dimensional image (for example, bright areas) undergo only a small amount of enhancement.

Note that by setting the value of the coefficient k to "0" in the case of (2) in the aforementioned processing, the unsharp masking effect can be reduced to "none". In other words, in this case, the unsharp masking processing is executed only in the case where the brightness (luminance value) of the pixel to be processed is lower than the brightness (for example, the average luminance value) in the periphery of the pixel to be processed, and thus in the three-dimensional image processing apparatus according to the present embodiment, only processing that darkens the value of the pixel to be processed is executed (that is, processing that enhances areas of shadow is executed).

Figure 17:
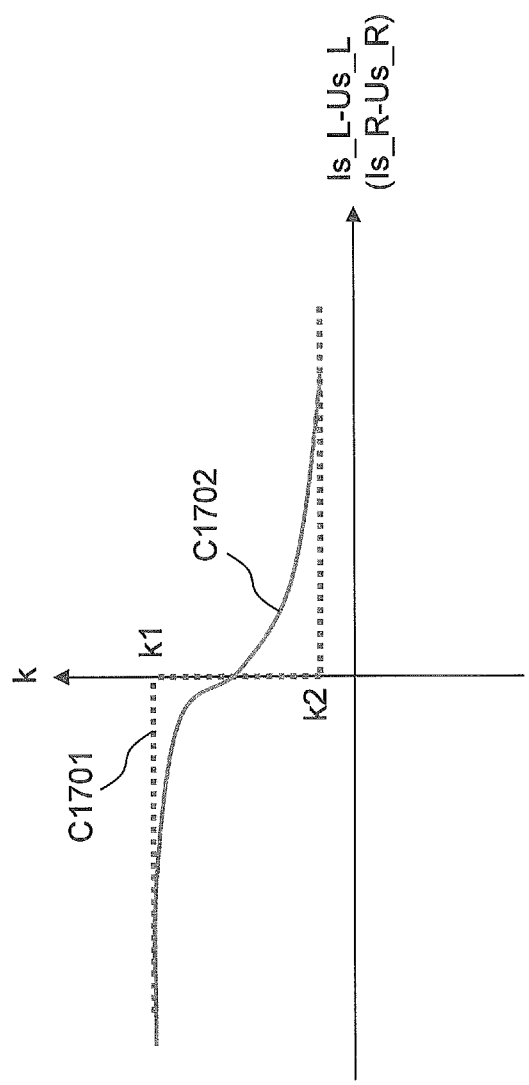
FIG. 17 is a diagram illustrating a relationship (properties) between a coefficient k and a differential signal (IS_L−US_L).

Although the coefficient k is determined by the coefficient determination unit 1602 based on a property C1701 illustrated in FIG. 17 in the aforementioned processing, it should be noted that the embodiment is not limited thereto, and for example, the coefficient determination unit 1602 may determine the coefficient k based on a property C1702 illustrated in FIG. 17 (that is, may cause the coefficient k to continually change relative to a change in the value of the differential signal (IS_L−US_L)). In the case where the coefficient determination unit 1602 determines the coefficient k based on the property C1702 illustrated in FIG. 17, the coefficient k continually changes relative to changes in the value of the differential signal (IS_L−US_L), and thus the three-dimensional image processing apparatus according to the present embodiment can obtain a three-dimensional image having a more natural image quality.

Accordingly, the three-dimensional image processing apparatus according to the present embodiment can implement an image process that darkens shadows. Through this, the three-dimensional image obtained by the three-dimensional image processing apparatus according to the present embodiment is a three-dimensional image in which areas of shadow have been selectively enhanced. As a result, a three-dimensional image obtained by the three-dimensional image processing apparatus according to the present embodiment is a three-dimensional image that reproduces a more natural sense of three-dimensionality and sense of depth.

Note that the present embodiment and the second embodiment may be combined. Through this, a three-dimensional image process that darkens shadows can be implemented even in the three-dimensional image processing technique according to the second embodiment.

First Variation

Next, a first variation on the present embodiment will be described.

Figure 18:
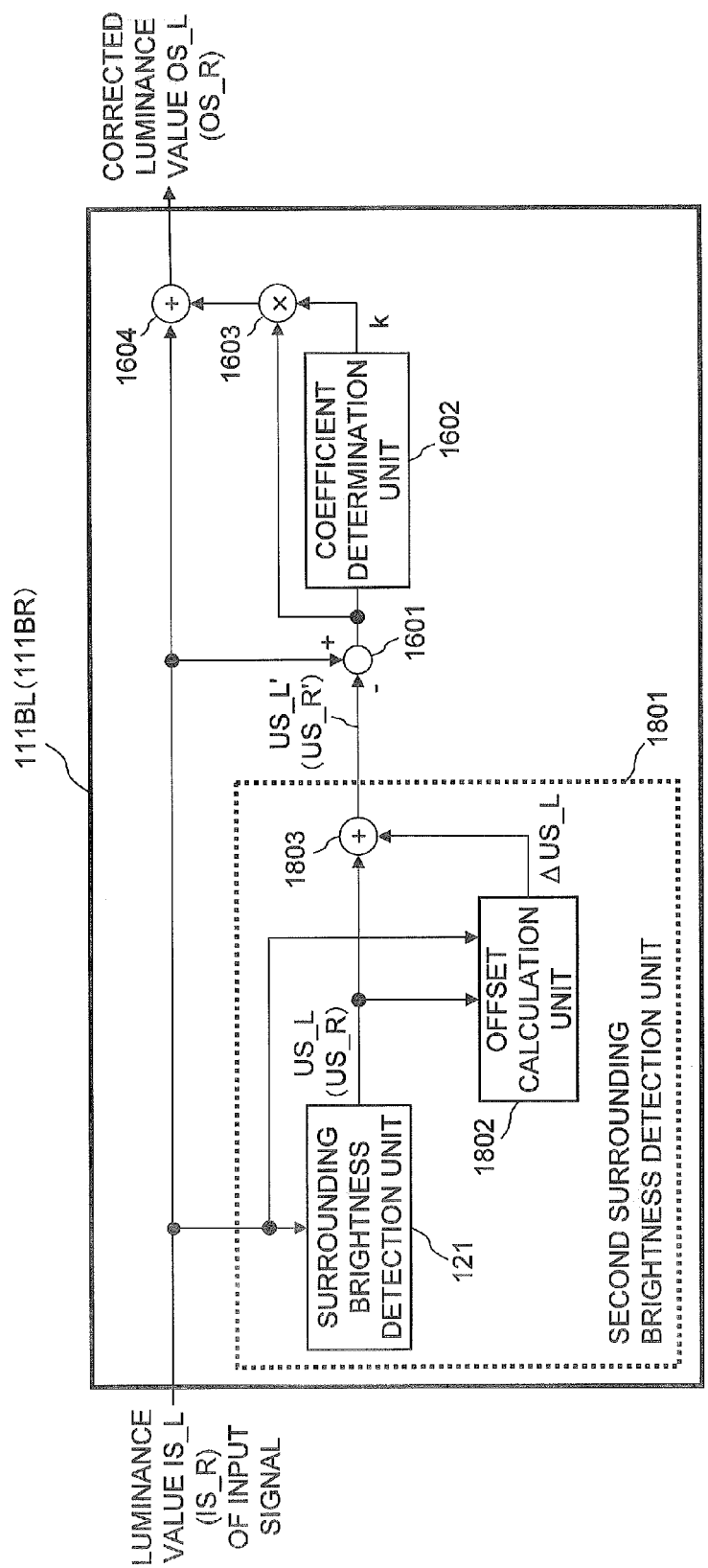
FIG. 18 is a block diagram illustrating a local tone conversion unit 111BL (111BR) according to a first variation on the third embodiment.

The three-dimensional image capturing apparatus according to the present variation has a configuration in which the local tone conversion units 111AL and 111BR of the three-dimensional image capturing apparatus according to the third embodiment have been replaced with the local tone conversion units 111BL and 111BR illustrated in FIG. 18. To be more specific, the three-dimensional image capturing apparatus according to the present variation has a configuration in which the surrounding brightness detection unit 121 in the local tone conversion units 111AL and 111BR of the three-dimensional image capturing apparatus according to the third embodiment has been replaced with a second surrounding brightness detection unit 1801 illustrated in FIG. 18.

The three-dimensional image capturing apparatus according to the present variation is the same as the three-dimensional image capturing apparatus according to the third embodiment in other respects.

Accordingly, the following will describe the configurations and processing details of the local tone conversion units 111BL and 111BR in the three-dimensional image capturing apparatus according to the present variation.

Note that as in the first embodiment, the processing performed on the R image is the same as the processing performed on the L image, and thus the processing performed on the L image will primarily be described.

Furthermore, portions that are the same as those of the previous embodiments will be assigned the same reference numerals, and descriptions thereof will be omitted.

3.2: Local Tone Conversion Unit 111BL

As shown in FIG. 18, the local tone conversion unit 111BL includes the second surrounding brightness detection unit 1801, the subtractor 1601, the coefficient determination unit 1602, the multiplier 1603, and the adder 1604.

The subtractor 1601, the coefficient determination unit 1602, the multiplier 1603, and the adder 1604 are the same as those described in the third embodiment.

As shown in FIG. 18, the second surrounding brightness detection unit 1801 includes the surrounding brightness detection unit 121, an offset calculation unit 1802, and an adder 1803.

The surrounding brightness detection unit 121 illustrated in FIG. 18 is the same as the surrounding brightness detection unit 121 illustrated in FIG. 16.

The offset calculation unit 1802 is inputted with the luminance value IS_L of the L image signal and the surrounding brightness signal US_L outputted from the surrounding brightness detection unit 121, and calculates an offset value ΔUS_L from the luminance value IS_L of the L image signal and the surrounding brightness signal US_L. The offset calculation unit 1802 then outputs the calculated offset value ΔUS_L to the adder 1803.

The offset calculation unit 1802 calculates the offset value ΔUS_L in, for example, the following manner.

(A) Average Value of Absolute Value of Difference

The offset calculation unit 1802 may take N number of samples (where N is a natural number) and calculate the average value of the absolute value of the difference between the luminance value IS_L of the L image signal and the surrounding brightness signal US_L. The offset calculation unit 1802 may then take the calculated average value as the offset value ΔUS_L. In other words, the offset calculation unit 1802 calculates the offset value ΔUS_L through a process (where the number of samples is N (N: a natural number)) corresponding to (Equation 1) below. Note that for easy use in later-stage signal processing, the offset value ΔUS_L may be found having adjusted the range of the offset value using a coefficient c1, as in (Equation 1) below. In addition, (Equation 1) below expresses a general equation that does not distinguish between L image processing and R image processing. In other words, in the case of the L image processing, ΔUS=ΔUS_L, IS=IS_L, and US=US_L in the following (Equation 1), whereas in the case of the R image processing, ΔUS=ΔUS_R, IS=IS_R, and US=US_R in the following (Equation 1) (the same applies for (Equation 2) and (Equation 3), mentioned later).

$$\Delta us = c_1 \frac{1}{N} \sum |Is - Us| \qquad \text{Equation 1}$$

(B) Variance The offset calculation unit 1802 may take N number of samples (where N is a natural number) and calculate a variance of the luminance value IS_L of the L image signal and the surrounding brightness signal US_L. The offset calculation unit 1802 may then take the calculated variance as the offset value ΔUS_L. In other words, the offset calculation unit 1802 calculates the offset value ΔUS_L through a process (where the number of samples is N (N: a natural number)) corresponding to (Equation 2) below. Note that for easy use in later-stage signal processing, the offset value ΔUS_L may be found having adjusted the range of the offset value using a coefficient c2, as in (Equation 2) below.

$$\Delta us = c_2 \frac{1}{N} \sum (Is - Us)^2 \quad \text{Equation 2}$$

(C) Standard Deviate The offset calculation unit 1802 may take N number of samples (where N is a natural number) and calculate a standard deviate of the luminance value IS_L of the L image signal and the surrounding brightness signal US_L. The offset calculation unit 1802 may then take the calculated standard deviate as the offset value ΔUS_L. In other words, the offset calculation unit 1802 calculates the offset value ΔUS_L through a process (where the number of samples is N (N: a natural number)) corresponding to (Equation 3) below. Note that for easy use in later-stage signal processing, the offset value ΔUS_L may be found having adjusted the range of the offset value using a coefficient c3, as in (Equation 3) below.

$$\Delta us = c_3 \frac{1}{N} \sqrt{\sum (Is - Us)^2} \quad \text{Equation 3}$$

Note that it is preferable for the target of the sampling performed in the computational processes of the above (Equation 1) to (Equation 3) (that is, the target of the N samples) to be N pixels present in the vicinity of the pixel to be processed in the image region.

The adder 1803 is inputted with the surrounding brightness signal US_L outputted from the surrounding brightness detection unit 121 and the offset value ΔUS_L outputted from the offset calculation unit 1802, and adds the surrounding brightness signal US_L to the offset value ΔUS_L. The adder 1803 then outputs the result of the addition (US_L+ΔUS_L) to the subtractor 1601 as a corrected surrounding brightness signal US_L'.

The corrected surrounding brightness signal US_L' obtained in this manner (1) is the same value as the surrounding brightness signal US_L in areas (image regions) where there is little change in the luminance value IS_L of the L image signal, but (2) is a higher value than the surrounding brightness signal US_L (a higher signal value) in areas (image regions) where there is a large amount of change in the luminance value IS_L of the L image signal.

Figure 19:
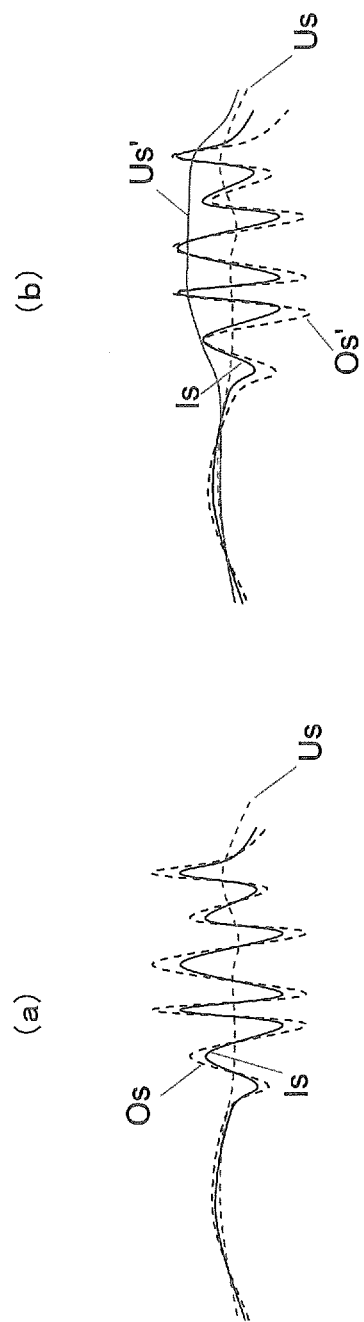
FIG. 19(a) is a diagram illustrating (an example of) signal waveforms of a luminance value IS_L (waveform Is), a surrounding brightness signal US_L (waveform Us), and a corrected luminance value OS_L (waveform Os) obtained by performing a local tone conversion process (contrast enhancement process) on an L image signal.
FIG. 19(b) is a diagram illustrating (an example of) signal waveforms of the luminance value IS_L (waveform Is), a corrected surrounding brightness signal US_L' (waveform Us'), and a corrected luminance value OS_L (waveform Os') obtained by performing a local tone conversion process (contrast enhancement process) on the L image signal.

For example, as shown in FIG. 19(*b*), in the case where the luminance value IS_L of the L image signal is a waveform Is as shown in FIG. 19(*b*), the corrected surrounding brightness signal US_L' has a waveform Us'. As can be seen from FIG. 19(*b*), the corrected surrounding brightness signal US_L' (waveform Us')

(1) is the same value as the surrounding brightness signal US_L (a waveform Us) in areas (image regions) where there is little change in the luminance value IS_L (waveform Is) of the L image signal, but (2) is a higher value than the surrounding brightness signal US_L (a waveform Us) (a higher signal value) in areas (image regions) where there is a large amount of change in the luminance value IS_L (waveform Is) of the L image signal.

With the three-dimensional image capturing apparatus according to the present variation, a similar process as the process performed in the third embodiment is carried out using the corrected surrounding brightness signal US_L'.

In other words, the local tone conversion unit 111BL according to the present variation:

(1) executes processing corresponding to the following formula in the case where the signal value of the differential signal ((IS_L)−(US_L')) is negative (that is, the case where IS_L<US_L'):

$$OS\_L = IS\_L + k1 \times ((IS\_L) - (US\_L'))$$

and obtains the corrected luminance value OS_L.

(2) executes processing corresponding to the following formula in the case where the signal value of the differential signal ((IS_L)−(US_L')) is not negative (that is, the case where IS_L≥US_L'):

$$OS\_L = IS\_L + k2 \times ((IS\_L) - (US\_L'))$$

(where k2<k1)

and obtains the corrected luminance value OS_L.

In other words, in the stated processing, (1) in the case where the brightness (luminance value) of the pixel to be processed is lower than the brightness set by the corrected surrounding brightness signal US_L', the value of the coefficient k is set to a high value k1 (>k2), increasing the strength of the unsharp masking; and (2) in the case where the brightness (luminance value) of the pixel to be processed is higher than the brightness set by the corrected surrounding brightness signal US_L', the value of the coefficient k is set to a low value k2 (<k1), reducing the strength of the unsharp masking.

Through this, the three-dimensional image processing apparatus according to the present variation can implement an image process that darkens shadows.

Note that by setting the value of the coefficient k to "0" in the case of (2) in the aforementioned processing, the unsharp masking effect can be reduced to "none". In other words, in this case, the unsharp masking processing is executed only in the case where the brightness (luminance value) of the pixel to be processed is lower than the brightness set by the corrected surrounding brightness signal US_L', and thus in the three-dimensional image processing apparatus according to the present variation, only processing that darkens the value of the pixel to be processed is executed (that is, processing that enhances areas of shadow is executed).

Figure 20:
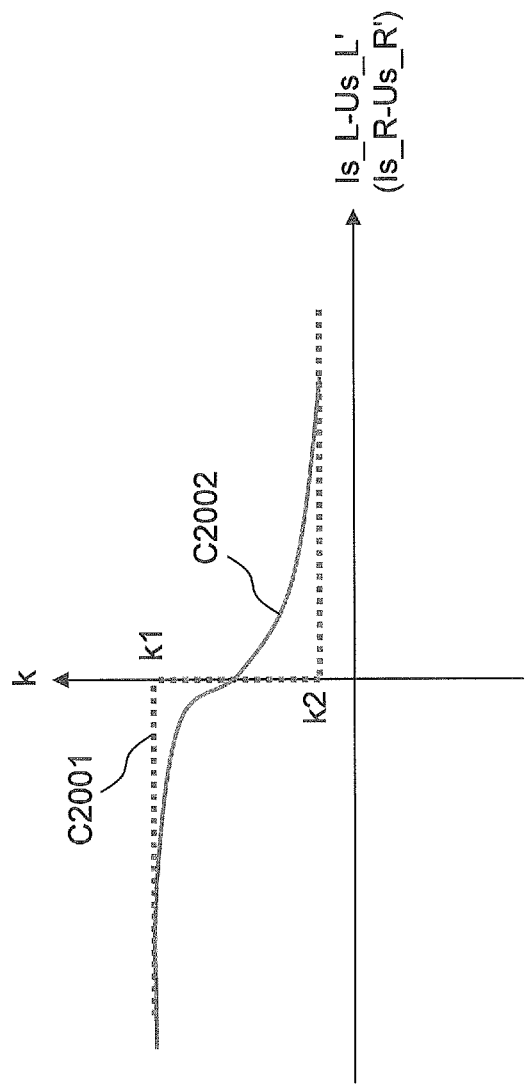
FIG. 20 is a diagram illustrating a relationship (properties) between a coefficient k and a differential signal (IS_L−US_L').

Although the coefficient k is determined by the coefficient determination unit 1602 based on a property C2001 illustrated in FIG. 20 in the aforementioned processing, it should be noted that the variation is not limited thereto, and for example, the coefficient determination unit 1602 may determine the coefficient k based on a property C2002 illustrated in FIG. 20 (that is, may cause the coefficient k to continually change relative to a change in the value of the differential signal (IS_L−US_L')). In the case where the coefficient determination unit 1602 determines the coefficient k based on the property C2002 illustrated in FIG. 20, the coefficient k continually changes relative to changes in the value of the differential signal (IS_L−US_L'), and thus the three-dimensional image processing apparatus according to the present variation can obtain a three-dimensional image having a more natural image quality.

Here, the corrected luminance value OS_L obtained by the three-dimensional image processing apparatus according to the present variation will be described using FIG. 19.

FIG. 19(*a*) illustrates the corrected luminance value OS_L (waveform Os) obtained by performing a local tone conversion process (contrast enhancement process) on the luminance value IS_L (waveform Is) of the L image signal and the surrounding brightness signal US_L (waveform Us).

FIG. 19(b) illustrates the corrected luminance value OS_L (waveform Os') obtained by performing a local tone conversion process (contrast enhancement process) on the luminance value IS_L (waveform Is) of the L image signal and the corrected surrounding brightness signal US_L' (waveform Us'). In other words, FIG. 19(b) illustrates an example of a signal waveform obtained by the three-dimensional image processing apparatus according to the present variation.

As can be seen from FIG. 19, with the three-dimensional image processing apparatus according to the present variation, the signal value of the corrected surrounding brightness signal US_L' (waveform Us') rises in areas of high change in the luminance value IS_L (waveform Is) of the L image signal, and thus the degree of enhancement made by the unsharp masking process is higher on the luminance value IS_L (waveform Is) of the L image signal, which has a lower signal value than the signal value of the corrected surrounding brightness signal US_L'. As a result, as shown in FIG. 19(b), processing for darkening (that is, processing that reduces the tone value) is executed on areas of high change in the luminance value IS_L (waveform Is) of the L image signal. Through this, with the three-dimensional image processing apparatus according to the present variation, areas of shadow in, for example, detailed areas of an object can be effectively enhanced (that is, shadows in the detailed areas can be effectively darkened).

As described above, with the three-dimensional image processing apparatus according to the present variation, using the corrected surrounding brightness signal US_L' makes it possible to implement image processing that effectively darkens shadows in detailed areas and the like of an object. Through this, a three-dimensional image obtained by the three-dimensional image capturing apparatus (three-dimensional image processing apparatus) according to the present variation is a three-dimensional image in which areas of shadow have been selectively enhanced. As a result, the three-dimensional image obtained by the three-dimensional image capturing apparatus (three-dimensional image processing apparatus) according to the present embodiment is a three-dimensional image that reproduces a more natural sense of three-dimensionality and sense of depth.

Note that the present variation and the second embodiment may be combined. Through this, a three-dimensional image process that achieves the effects of the present variation can be implemented even in the three-dimensional image processing technique according to the second embodiment.

Second Variation

Next, a second variation on the present embodiment will be described.

Figure 21:
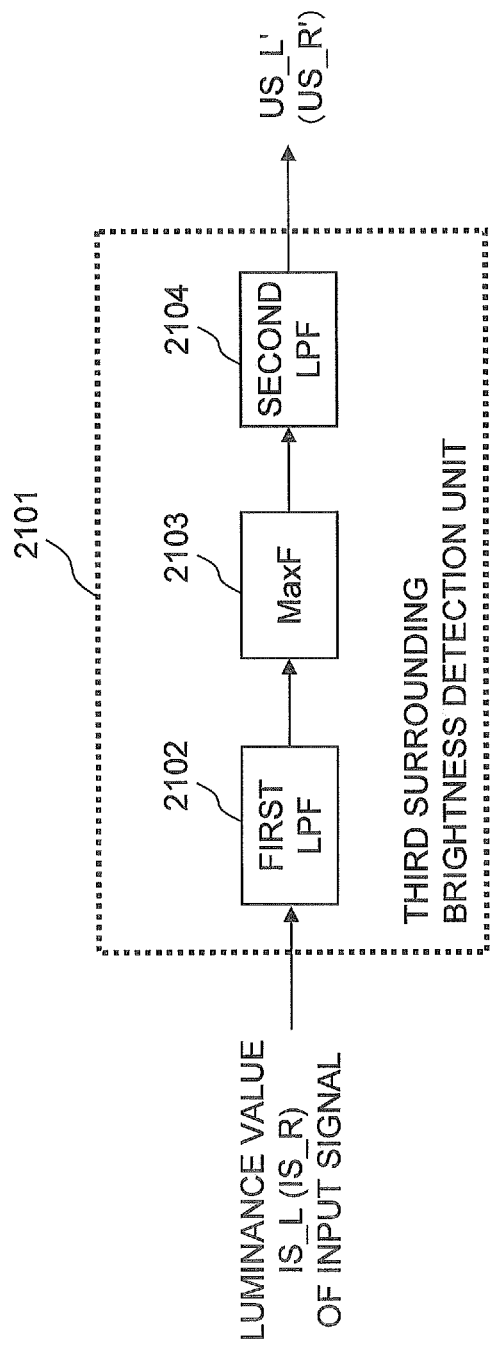
FIG. 21 is a block diagram illustrating a third surrounding brightness detection unit 2101 according to a second variation on the third embodiment.

A three-dimensional image capturing apparatus according to the present variation has a configuration in which the second surrounding brightness detection unit 1801 of the three-dimensional image capturing apparatus according to the first variation on the third embodiment has been replaced with a third surrounding brightness detection unit 2101 illustrated in FIG. 21.

The three-dimensional image capturing apparatus according to the present variation is the same as the three-dimensional image capturing apparatus according to the first variation on the third embodiment in other respects.

Accordingly, the following will describe the configurations and processing details of the third surrounding brightness detection unit 2101 in the three-dimensional image capturing apparatus according to the present variation.

Note that as in the aforementioned embodiments, the processing performed on the R image is the same as the processing performed on the L image, and thus the processing performed on the L image will primarily be described.

Furthermore, portions that are the same as those of the previous embodiments will be assigned the same reference numerals, and descriptions thereof will be omitted.

3.3: Third Surrounding Brightness Detection Unit 2101

Unlike the second surrounding brightness detection unit 1801, the third surrounding brightness detection unit 2101 does not use the surrounding brightness signal US_L, and rather obtains the corrected surrounding brightness signal US_L' that has a large signal value for areas having a high amount of change in the luminance value IS_L of the L image signal.

As shown in FIG. 21, the third surrounding brightness detection unit 2101 includes a first low-pass filter 2102, a max filter 2103, and a second low-pass filter 2104.

The first low-pass filter 2102 is inputted with the luminance value IS_L of the L image signal, and executes a filtering process (a low-pass filtering process) that removes fine noise components (high-frequency noise components) from the inputted luminance value IS_L of the L image signal. The first low-pass filter 2102 then outputs the filtered L image signal to the max filter 2103.

The max filter 2103 is inputted with the output of the first low-pass filter 2102, and executes a max filtering process. Specifically, for the output of the first low-pass filter 2102 (that is, the low-pass filtered L image signal), the max filter 2103 detects the maximum pixel value for a pixel to be processed and N (where N is a natural number) peripheral pixels (sample points) present in the vicinity of the pixel to be processed. The max filter 2103 then outputs the detected maximum value to the second low-pass filter 2104.

The second low-pass filter 2104 is inputted with the output of the max filter 2103, and executes a low-pass filtering process on the inputted signal. The low-pass filtering process performed by the second low-pass filter 2104 is a process for removing unnecessary high-frequency components from the output of the max filter 2103. The second low-pass filter 2104 then outputs the low-pass filtered signal as the corrected surrounding brightness signal US_L'.

As described above, in the third surrounding brightness detection unit 2101, the maximum value in a predetermined filter range (a filter range determined by a pixel to be processed and the peripheral pixels thereof) is taken from a signal from which fine noise components have been removed (the signal outputted by the first low-pass filter 2102), and a signal whose signal is the maximum value (that is, the signal outputted from the max filter 2103) is obtained. Furthermore, the third surrounding brightness detection unit 2101 obtains the corrected surrounding brightness signal US_L' by removing the unnecessary high-frequency components from the signal outputted by the max filter 2103.

Therefore, the third surrounding brightness detection unit 2101 does not use the surrounding brightness signal US_L, and rather uses only the luminance value IS_L of the L image signal to obtain the corrected surrounding brightness signal US_L' that has a large signal value for areas having a high amount of change in the luminance value IS_L of the L image signal.

Furthermore, with the three-dimensional image capturing apparatus according to the present variation, image processing that effectively darkens shadows in areas of detail in an object can be implemented, in the same manner as in the first variation of the third embodiment, by using the corrected surrounding brightness signal US_L' obtained by the third surrounding brightness detection unit 2101. Through this, a three-dimensional image obtained by the three-dimensional image capturing apparatus (three-dimensional image processing apparatus) according to the present variation is a three-dimensional image in which areas of shadow have been selectively enhanced. As a result, the three-dimensional image obtained by the three-dimensional image capturing apparatus (three-dimensional image processing apparatus) according to the present embodiment is a three-dimensional image that reproduces a more natural sense of three-dimensionality and sense of depth.

Note that the present variation and the second embodiment may be combined. Through this, a three-dimensional image process that achieves the effects of the present variation can be implemented even in the three-dimensional image processing technique according to the second embodiment.

Fourth Embodiment

Next, a fourth embodiment will be described.

In the present embodiment as well, a technique for implementing three-dimensional image processing that darkens shadows will be described.

Like the aforementioned embodiments, the fourth embodiment will describe a dual-lens three-dimensional image capturing apparatus (digital camera, video camera, or the like) as an example of the three-dimensional image processing apparatus. Note, however, that the three-dimensional image processing apparatus is not limited to a dual-lens three-dimensional image capturing apparatus, and the three-dimensional image processing apparatus may, for example, be a multi-viewpoint three-dimensional image capturing apparatus.

The configuration of the three-dimensional image capturing apparatus according to the fourth embodiment is similar to the configuration of the three-dimensional image capturing apparatus 1000 according to the first embodiment.

Figure 22:
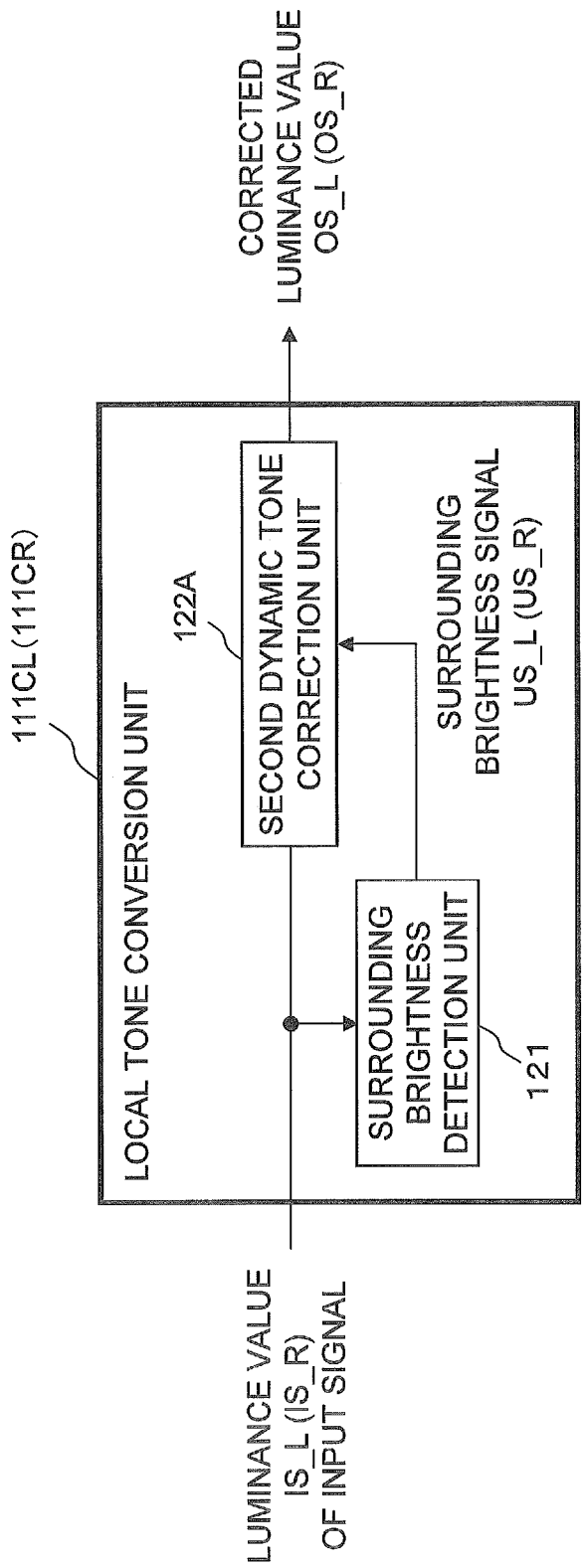
FIG. 22 is a block diagram illustrating a local tone conversion unit 111CL (111CR) according to a fourth embodiment.

The three-dimensional image capturing apparatus according to the fourth embodiment replaces the local tone conversion units 111L and 111R of the image correction unit 104 in the three-dimensional image capturing apparatus 1000 of the first embodiment with local tone conversion units 111CL and 111CR, shown in FIG. 22. The three-dimensional image capturing apparatus according to the fourth embodiment differs from the three-dimensional image capturing apparatus 1000 according to the first embodiment in this respect. The three-dimensional image capturing apparatus according to the fourth embodiment is the same as the three-dimensional image capturing apparatus according to the first embodiment in other respects.

Accordingly, the following will describe the configurations and processing details of the local tone conversion units 111CL and 111CR in the three-dimensional image capturing apparatus according to the present embodiment.

Note that as in the first embodiment, the processing performed on the R image is the same as the processing performed on the L image, and thus the processing performed on the L image will primarily be described.

Note also that elements that are the same as those in the previous embodiments will be assigned the same reference numerals, and detailed descriptions thereof will be omitted.

4.1: Local Tone Conversion Unit 111CL

As shown in FIG. 22, the local tone conversion unit 111CL includes the surrounding brightness detection unit 121 and a second dynamic tone correction unit 122A.

The surrounding brightness detection unit 121 is the same as the surrounding brightness detection unit 121 in the aforementioned embodiments. The surrounding brightness detection unit 121 is inputted with the L image signal (the luminance value IS_L of the L image signal) that is outputted from the image input unit 102 and that can form the L image, and calculates, for a region surrounding a pixel of interest (a pixel to be processed in the L image) that corresponds to the luminance value IS_L of the L image signal (the region being an image region in the periphery of the pixel of interest in the L image), a representative brightness value (for example, the average luminance value of all pixels included in the stated surrounding region). The surrounding brightness detection unit 121 then outputs the calculated representative brightness value of the image region in the periphery of the pixel of interest to the second dynamic tone correction unit 122A as the surrounding brightness signal US_L.

The second dynamic tone correction unit 122A is inputted with the L image signal (the luminance value IS_L of the L image signal) that is outputted from the image input unit 102 and that can form the L image, and the surrounding brightness signal US_L outputted from the surrounding brightness detection unit 121. The second dynamic tone correction unit 122A performs a tone conversion process on the luminance value IS_L of the L image signal based on tone conversion properties determined based on the value of the surrounding brightness signal US_L. The tone conversion properties performed by second dynamic tone correction unit 122A are as shown in, for example, FIG. 23.

Figure 23:
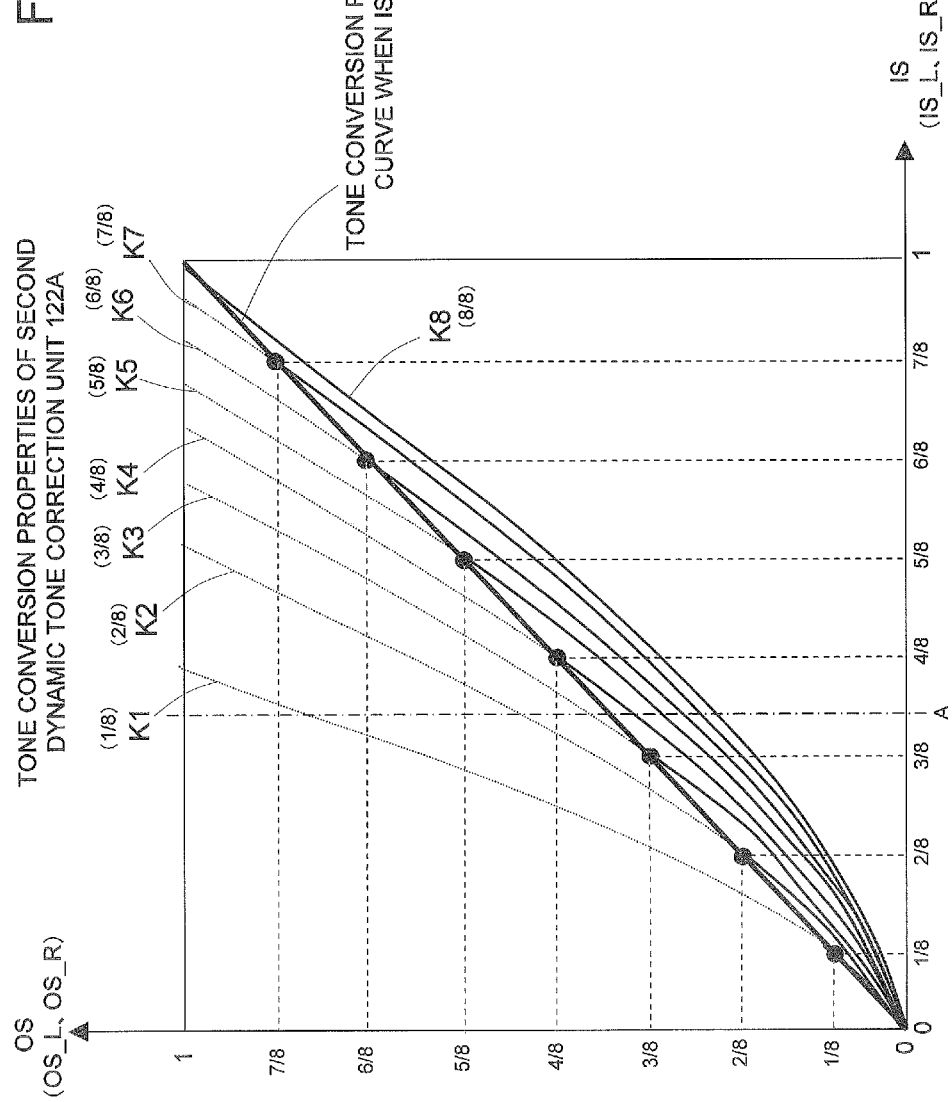
FIG. 23 is a graph illustrating tone conversion properties of a second dynamic tone correction unit according to the fourth embodiment.

The tone conversion properties shown in FIG. 23 are similar to the tone conversion properties shown in FIG. 4, but differ from the tone conversion properties shown in FIG. 4 in that in the case where an input value IS is greater than a value US of the surrounding brightness signal, the input value IS is taken as-is as an output value OS.

As in FIG. 4, in FIG. 23, the horizontal axis represents the value of the IS signal (the luminance value IS_L of the L image signal or a luminance value ISR of the R image signal) serving as an input signal, and the vertical axis represents the value of the OS signal (the tone-converted luminance value OS_L of the L image signal or the tone-converted luminance value OS_R of the R image signal) serving as an output signal; and tone conversion property curves K1 through K8, determined based on the value of the surrounding brightness signal US_L (or US_R), are graphed.

However, unlike the tone conversion properties shown in FIG. 4, the tone conversion properties shown in FIG. 23 are determined based on curves indicated by the solid line portions. In other words, the tone conversion properties are determined based on a tone conversion property curve Kn (where n is an integer from 1 to 8) only in the case where the value of the IS signal is less than or equal to the value US of the surrounding brightness signal. In the case where the value of the IS signal is greater than the value US of the surrounding brightness signal, no tone conversion is carried out, and the value of the IS signal, which is the input value, is used as-is as the output value OS.

By the second dynamic tone correction unit 122A carrying out tone conversion based on the tone conversion properties shown in FIG. 23, the local contrast is enhanced only in the case where the value of the IS signal is less than or equal to the value US of the surrounding brightness signal, or in other words, only in the case where the pixel to be processed is darker than the peripheral pixels. Through this, tone conversion that darkens shadows can be implemented.

As described above, the second dynamic tone correction unit 122A performs a dynamic tone correction process on the IS signal (the luminance value IS_L of the L image signal or the luminance value IS_R of the R image signal) according to tone conversion properties such as those illustrated in FIG.

23, thus obtaining the OS signal (the tone-converted luminance value OS_L of the L image signal or the tone-converted luminance value OS_R of the R image signal). The second dynamic tone correction unit 122A then outputs the OS signal (the tone-converted luminance value OS_L of the L image signal or the tone-converted luminance value OS_R of the R image signal) to the synthesizing unit 113L (the synthesizing unit 113R, in the case of the R image signal).

Note that the tone conversion properties used in the tone conversion process performed by the second dynamic tone correction unit 122A are not limited to the tone conversion properties illustrated in FIG. 23, and may be other tone conversion properties as long as the tone conversion properties are capable of darkening shadows. For example, in the case where the input value IS has become greater than the value US of the surrounding brightness signal, the second dynamic tone correction unit 122A may carry out the tone conversion process based on tone conversion properties that reduce the degree of enhancement of the local contrast. For example, the second dynamic tone correction unit 122A may carry out the tone conversion process based on tone conversion properties determined in accordance with a curve obtained by reducing the slope of the dotted line portions of the tone conversion property curves K1 through K8 shown in FIG. 23. By performing a tone conversion process based on such tone conversion properties, tone conversion that darkens shadows while suppressing the degree of enhancement of the local contrast for pixels that are brighter than their peripheral pixels can be implemented.

As described thus far, with the three-dimensional image capturing apparatus (three-dimensional image processing apparatus) according to the present embodiment, the second dynamic tone correction unit 122A executes the tone conversion process based on, for example, the tone conversion properties illustrated in FIG. 23, and thus the local contrast is enhanced only in the case where the value of the IS signal is less than or equal to the value US of the surrounding brightness signal, or in other words, only in the case where the pixel to be processed is darker than pixels in the periphery thereof. Accordingly, the three-dimensional image capturing apparatus (three-dimensional image processing apparatus) according to the present embodiment can implement tone conversion that darkens shadows. Through this, the three-dimensional image obtained by the three-dimensional image processing apparatus according to the present embodiment is a three-dimensional image in which areas of shadow have been selectively enhanced. As a result, a three-dimensional image obtained by the three-dimensional image processing apparatus according to the present embodiment is a three-dimensional image that reproduces a more natural sense of three-dimensionality and sense of depth.

Note that the present embodiment and the aforementioned embodiments may be combined. Through this, a three-dimensional image process that darkens shadows can be implemented even in the three-dimensional image processing techniques according to the aforementioned embodiments.

First Variation

Next, a first variation on the present embodiment will be described.

Figure 24:
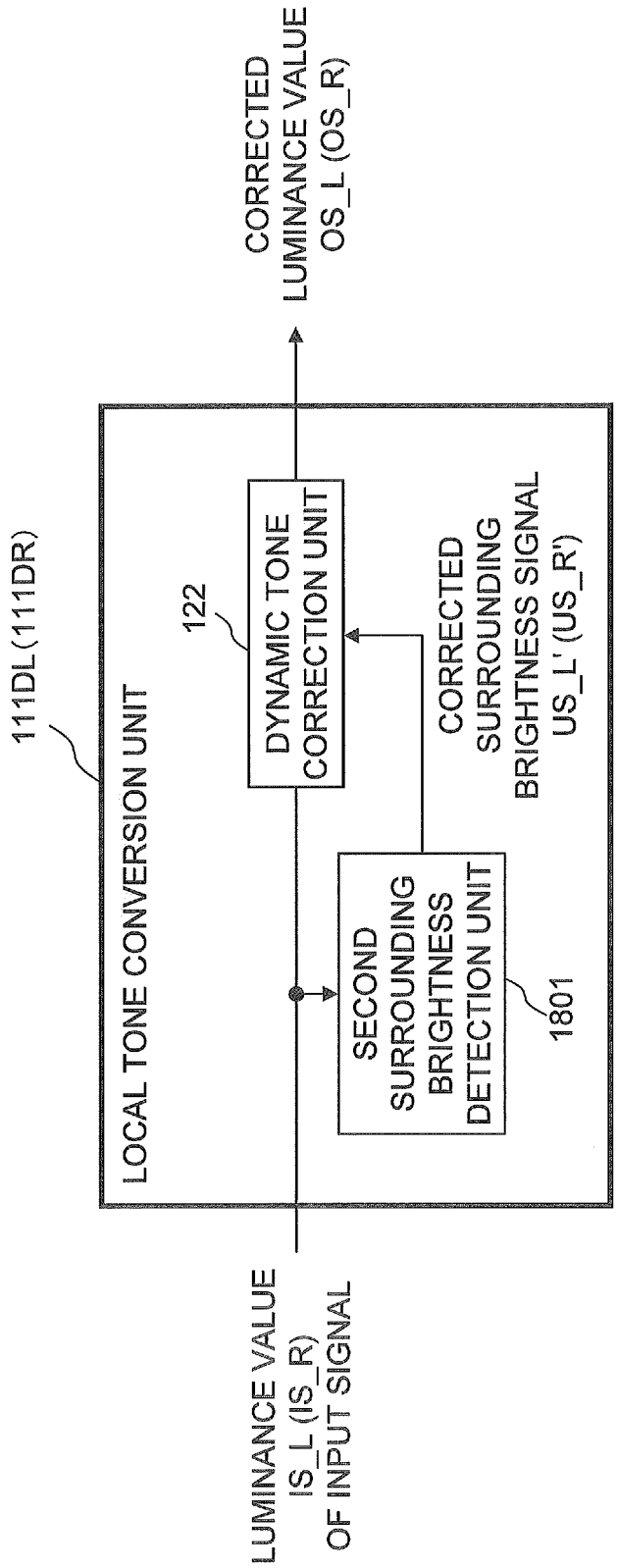
FIG. 24 is a block diagram illustrating a local tone conversion unit 111DL (111DR) according to a first variation on the fourth embodiment.

The three-dimensional image capturing apparatus according to the present variation has a configuration in which the local tone conversion units 111CL and 111CR of the three-dimensional image capturing apparatus according to the fourth embodiment have been replaced with local tone conversion units 111DL and 111DR illustrated in FIG. 24.

As shown in FIG. 24, the local tone conversion units 111DL and 111DR include the second surrounding brightness detection unit 1801 and the dynamic tone correction unit 122.

The second surrounding brightness detection unit 1801 is the same as that described in the aforementioned embodiments (the same as that shown in FIG. 18).

The dynamic tone correction unit 122 is the same as that described in the aforementioned embodiments, and executes tone conversion based on the tone conversion properties illustrated in FIG. 4.

With the three-dimensional image capturing apparatus according to the present variation, the tone conversion process is executed by the dynamic tone correction unit 122 using the corrected surrounding brightness signal US_L' outputted from the second surrounding brightness detection unit 1801. As a result, tone conversion that darkens shadows can be implemented.

In other words, the corrected surrounding brightness signal US_L' has a higher signal value in areas where there is a large amount of change in the luminance value IS_L of the L image signal. Therefore, a tone conversion process that darkens shadows more than in the case where the tone conversion process is executed using the surrounding brightness signal US_L can be executed by the dynamic tone correction unit 122 of the three-dimensional image capturing apparatus according to the present variation executing the tone conversion process using the corrected surrounding brightness signal US_L'.

An example of this will be given using FIG. 4.

For example, in the case where the luminance value IS_L of the L image signal is "4/8", the value of the surrounding brightness signal US_L is "5/8", and the value of the corrected surrounding brightness signal US_L' is "7/8" (this corresponds to a portion where there is a large amount of change in the luminance value IS_L of the L image signal), with the three-dimensional image capturing apparatus according to the present variation, the pixel value (luminance value) of the pixel to be processed, which is the luminance value IS_L "4/8" of the L image signal, undergoes tone conversion to an output value OS_L determined based on a B point in FIG. 4. On the other hand, with the three-dimensional image capturing apparatus according to the first embodiment, the pixel value (luminance value) of the pixel to be processed, which is the luminance value IS_L "4/8" of the L image signal, undergoes tone conversion to an output value OS_L determined based on an A point in FIG. 4.

In other words, in the above case, the tone conversion process performed by the three-dimensional image capturing apparatus according to the present variation carries out tone conversion so that the output value is lower (darker) than in the tone conversion process performed by the three-dimensional image capturing apparatus according to the first embodiment. Therefore, with the tone conversion process performed by the three-dimensional image capturing apparatus according to the present variation, shadows can be enhanced (that is, shadows can be darkened) more than in the tone conversion process performed by the three-dimensional image capturing apparatus according to the first embodiment.

As described thus far, with the three-dimensional image capturing apparatus according to the present variation, the tone conversion process is executed by the dynamic tone correction unit 122 using the corrected surrounding brightness signal US_L', and thus a process that darkens pixels (that is, a process that lowers the tone values) is executed in areas where there is a large amount of change in the luminance value IS_L of the L image signal. Through this, with the three-dimensional image processing apparatus according to the present variation, areas of shadow in, for example, detailed areas of an object can be effectively enhanced (that is, shadows in the detailed areas can be effectively darkened).

Through this, a three-dimensional image obtained by the three-dimensional image capturing apparatus (three-dimensional image processing apparatus) according to the present variation is a three-dimensional image in which areas of shadow have been selectively enhanced. As a result, the three-dimensional image obtained by the three-dimensional image capturing apparatus (three-dimensional image processing apparatus) according to the present embodiment is a three-dimensional image that reproduces a more natural sense of three-dimensionality and sense of depth.

Note that the present variation and the aforementioned embodiments may be combined. Through this, a three-dimensional image process that achieves the effects of the present variation can be implemented even in the three-dimensional image processing technique according to the aforementioned embodiments.

In addition, in the three-dimensional image processing apparatus according to the present variation, the third surrounding brightness detection unit 2101 shown in FIG. 21 may be used instead of the second surrounding brightness detection unit 1801 and the corrected surrounding brightness signal US_L' may be generated.

Fifth Embodiment

Next, a fifth embodiment will be described.

Normally, in many scenes, there are many cases where the light source is not a perfectly parallel light source. For example, in the case of a spot light source, shadows will spread and lose definition as the distance of the shadow increases. Shadows also lose definition in scenes with multiple light sources. In this manner, it is normal for shadows to lose definition depending on the protrusions and recesses of an actual object, and a person's sense of vision is thought to detect such changes in brightness as shadows.

Accordingly, blurring shadow components can be considered as effective in enhancing shadows in a more shadow-like manner. The inventors of the present invention actually confirmed this effect through evaluational experimentation.

The fifth embodiment will describe a three-dimensional image processing technique capable of obtaining a three-dimensional image that realizes a more natural sense of three-dimensionality and sense of depth through a more visually natural shadow enhancement, which is carried out by reducing high-frequency components from added shadow components.

Note that like the aforementioned embodiments, the fifth embodiment will describe a dual-lens three-dimensional image capturing apparatus (digital camera, video camera, or the like) as an example of the three-dimensional image processing apparatus. Note, however, that the three-dimensional image processing apparatus is not limited to a dual-lens three-dimensional image capturing apparatus, and the three-dimensional image processing apparatus may, for example, be a multi-viewpoint three-dimensional image capturing apparatus.

The configuration of the three-dimensional image capturing apparatus according to the fifth embodiment is similar to the configuration of the three-dimensional image capturing apparatus according to the third embodiment.

Figure 25:
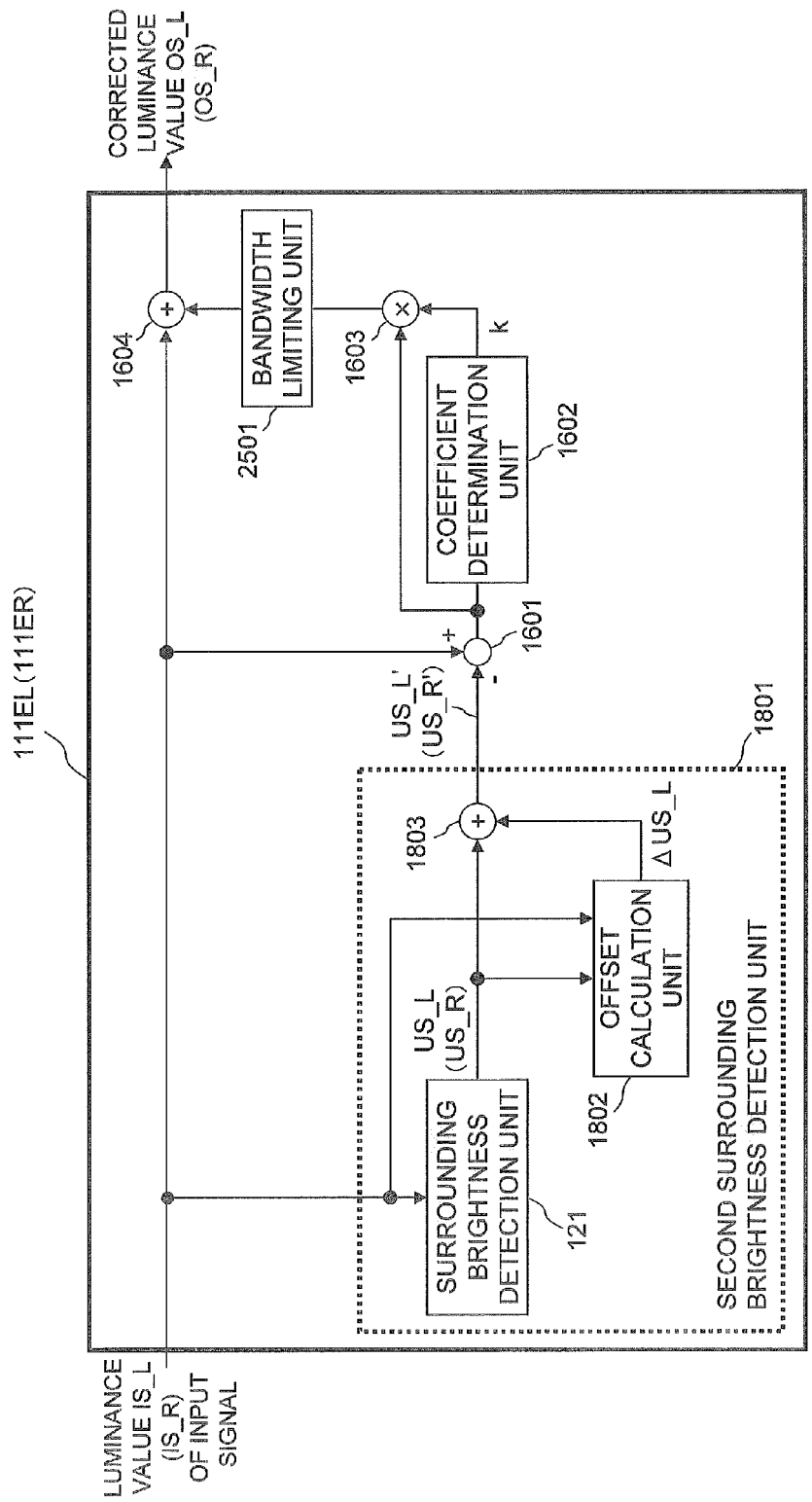
FIG. 25 is a block diagram illustrating a local tone conversion unit 111EL (111ER) according to a fifth embodiment.

The three-dimensional image capturing apparatus according to the fifth embodiment has a configuration in which the local tone conversion units 111AL and 111AR of the three-dimensional image capturing apparatus according to the third embodiment have been replaced with local tone conversion units 111EL and 111ER illustrated in FIG. 25. The three-dimensional image capturing apparatus according to the fifth embodiment differs from the three-dimensional image capturing apparatus according to the third embodiment in this respect. The three-dimensional image capturing apparatus according to the fifth embodiment is the same as the three-dimensional image capturing apparatus according to the third embodiment in other respects.

Accordingly, the following will describe the configurations and processing details of the local tone conversion units 111EL and 111ER in the three-dimensional image capturing apparatus according to the present embodiment.

Note that as in the aforementioned embodiments, the processing performed on the R image is the same as the processing performed on the L image, and thus the processing performed on the L image will primarily be described.

5.1: Local Tone Conversion Unit 111EL

As shown in FIG. 25, the local tone conversion unit 111EL has a configuration in which a bandwidth limiting unit 2501 has further been added between the multiplier 1603 and the adder 1604 in the local tone conversion unit 111BL shown in FIG. 18. The local tone conversion unit 111EL is the same as the local tone conversion unit 111BL illustrated in FIG. 18 in other respects.

The bandwidth limiting unit 2501 is inputted with the output from the multiplier 1603, performs a bandwidth limiting process on the inputted signal (a multiplication signal (k×((IS_L)−(US_L')))), and outputs a bandwidth-limited signal (LPF (k×((IS_L)−(US_L')))) to the adder 1604.

Note that LPF( ) is a function indicating the bandwidth limiting process, and is, for example, a function that outputs a signal value obtained through a low-pass filtering process or the like.

The bandwidth limiting process performed by the bandwidth limiting unit 2501 may be any process that reduces high-frequency components of the signal inputted into the bandwidth limiting unit 2501, which is the multiplication signal (k×((IS_L)−(US_L'))). For example, an LPF process may be used as the bandwidth limiting process performed by the bandwidth limiting unit 2501.

Note that it is preferable for the bandwidth limiting process performed by the bandwidth limiting unit 2501 to set a cutoff frequency for bandwidth limiting to a frequency one digit or more higher than the signal bandwidth of the surrounding brightness signal US_L. For example, if the size of the target image is 1024 pixels on the vertical and 768 pixels on the horizontal, it is preferable to generate the surrounding brightness signal US_L from a region of 80 or more pixels in the vertical and horizontal; in this case, it is preferable to set the cutoff frequency of the bandwidth limiting in the bandwidth limiting process performed by the bandwidth limiting unit 2501 to a frequency one digit or more higher than the cutoff frequency of the bandwidth limiting in the process for obtaining the surrounding brightness signal US_L (for example, an LPF process).

The adder 1604 adds the bandwidth-limited signal (LPF (k×((IS_L)−(US_L')))) outputted from the bandwidth limiting unit 2501 to the luminance value IS_L of the L image signal.

In other words, the local tone conversion unit 111EL according to the present embodiment executes a process corresponding to:

$$OS\_L = IS\_L + LPF(k \times ((IS\_L) - (US\_L')))$$

In the above equation, ((IS_L)−(US_L')) corresponds to a shadow component, and (k×((IS_L)−(US_L'))) can be thought to correspond to an additional component of the shadow, and thus LPF(k×((IS_L)−(US_L'))) corresponds to the added shadow component being blurred (bandwidth-limited).

Accordingly, the corrected L image signal (corrected luminance value) OS_L outputted from the local tone conversion unit 111EL according to the present embodiment is a signal in which shadows are enhanced while also blurring the shadows.

As described thus far, the three-dimensional image processing apparatus according to the present embodiment can implement an image process that darkens shadows (enhances shadows) while blurring the shadows. Through this, the three-dimensional image obtained by the three-dimensional image processing apparatus according to the present embodiment is a three-dimensional image in which areas of shadow have been selectively enhanced while blurring those areas of shadow. As a result, a three-dimensional image obtained by the three-dimensional image processing apparatus according to the present embodiment is a three-dimensional image that reproduces a more natural sense of three-dimensionality and sense of depth.

Note that the present embodiment and the aforementioned other embodiments may be combined. Through this, a three-dimensional image process that darkens shadows (enhances shadows) while blurring the shadows can be implemented even in the three-dimensional image processing techniques according to the aforementioned other embodiments.

Furthermore, in the local tone conversion unit 111EL according to the present embodiment, the second surrounding brightness detection unit 1801 may be replaced with the third surrounding brightness detection unit 2101 illustrated in FIG. 21. The same effects as the three-dimensional image processing apparatus according to the present embodiment can be achieved in such a case as well.

First Variation

Next, a first variation on the present embodiment will be described.

Figure 26:
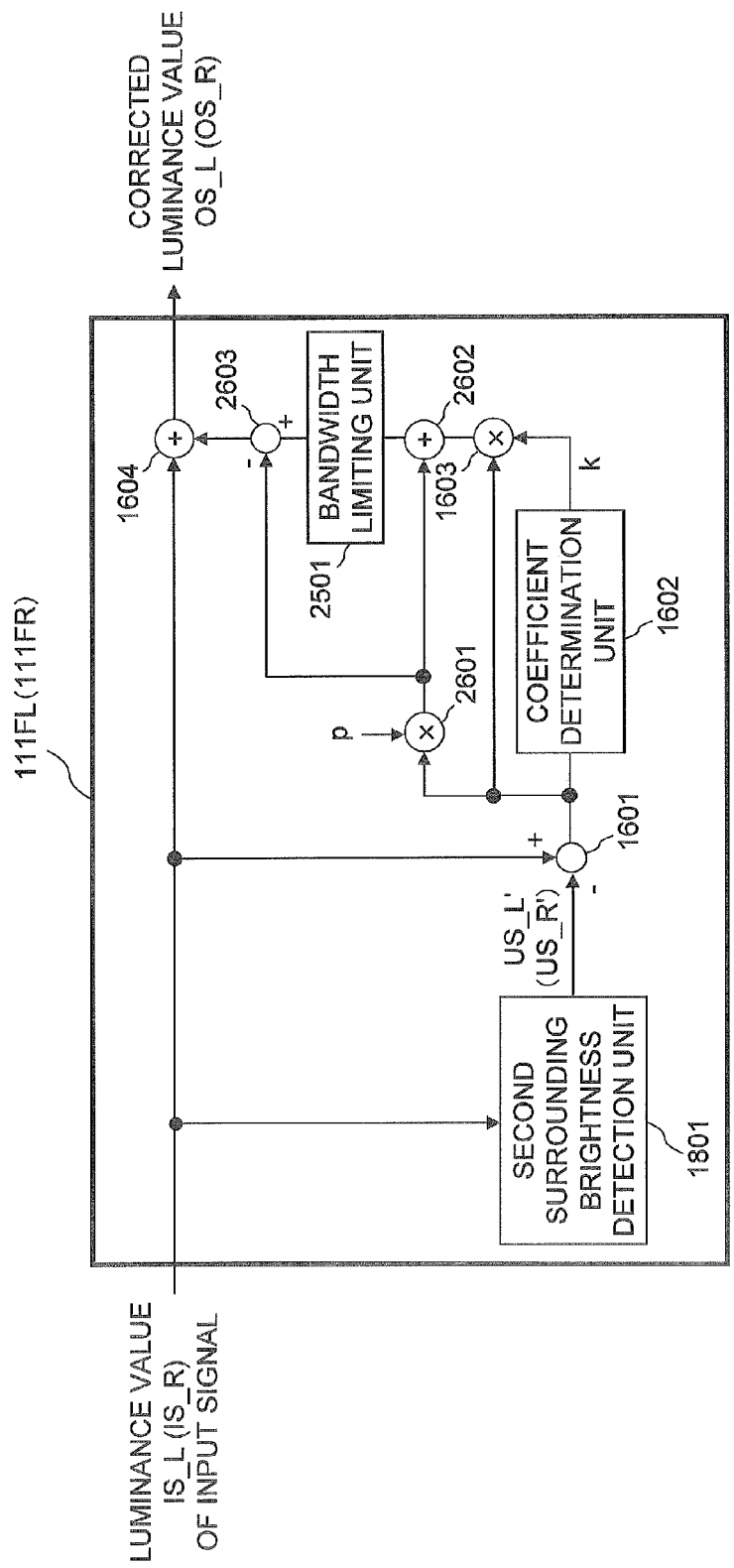
FIG. 26 is a block diagram illustrating a local tone conversion unit 111FL (111FR) according to a first variation on the fifth embodiment.

The three-dimensional image capturing apparatus according to the present variation has a configuration in which the local tone conversion units 111EL and 111ER of the three-dimensional image capturing apparatus according to the fifth embodiment have been replaced with local tone conversion units 111FL and 111FR illustrated in FIG. 26.

The three-dimensional image capturing apparatus according to the present variation is the same as the three-dimensional image capturing apparatus according to the fifth embodiment in other respects.

Accordingly, the following will describe the configurations and processing details of the local tone conversion units 111FL and 111FR in the three-dimensional image capturing apparatus according to the present variation.

Note that as in the first embodiment, the processing performed on the R image is the same as the processing performed on the L image, and thus the processing performed on the L image will primarily be described.

Furthermore, portions that are the same as those of the previous embodiments will be assigned the same reference numerals, and descriptions thereof will be omitted.

As shown in FIG. 26, the local tone conversion unit 111FL includes the second surrounding brightness detection unit 1801, the subtractor 1601, the coefficient determination unit 1602, the multiplier 1603, and the adder 1604.

The subtractor 1601, the coefficient determination unit 1602, and the multiplier 1603 are provided. Furthermore, as shown in FIG. 26, the local tone conversion unit 111FL includes a multiplier 2601, an adder 2602, the bandwidth limiting unit 2501, a subtractor 2603, and the adder 1604.

The local tone conversion unit 111FL executes a process corresponding to:

$$OS\_L = IS\_L - p \times (IS\_L - US\_L') + LPF((k+p) \times (IS\_L - US\_L')) \quad (A0)$$

(where p: 0≤p≤1)

Here, a reason why the local tone conversion unit 111FL executes the process corresponding to the above equation will be described.

First, consider a process corresponding to the following equation (A1).

$$OS\_L = US\_L' + (k+1) \times (IS\_L - US\_L') \quad (A1)$$

The second item on the right side of the equation (A1) can be thought of as expressing (a shadow component present in the original image)+(an added shadow component).

If a bandwidth limiting process (corresponding to a process based on the function LPF( )) is then carried out on the second item on the right side of the equation (A1), the added shadow component and the shadow component present in the original image can be blurred.

In other words, by executing a process corresponding to the following:

$$OS\_L = US\_L' + LPF((k+1) \times (IS\_L - US\_L')) \quad (A2)$$

the added shadow component and the shadow component present in the original image can be blurred.

On the other hand, the processing described in the fifth embodiment (processing that blurs only the added shadow component) corresponds to:

$$OS\_L = IS\_L + LPF(k \times ((IS\_L) - (US\_L'))) \quad (A3)$$

In the process corresponding to the above equation (A2), whereas a sense of shadow can be strongly expressed, a side effect that blurs portions other than the actual shadows occurs.

Accordingly, a process that enables the method of blurring between the equation (A2) and the equation (A3) (corresponding to the fifth embodiment) is preferable.

A process corresponding to the aforementioned equation (A0) realizes this.

Assuming, in the aforementioned equation (A0), that p=0, the equation (A0) becomes the same as the equation (A3) (corresponding to the fifth embodiment), and a process that blurs only the added shadow component is executed.

On the other hand, assuming that p=1, the equation (A0) becomes the same as the equation (A2), and a process that blurs both the added shadow component and the already-present shadow component is executed.

In other words, a process corresponding to the equation (A0) is executed by the local tone conversion unit 111FL, which makes it possible to realize a process in which a method of blurring that is between the equation (A2) and the equation (A3) (corresponding to the fifth embodiment) is executed.

Note that p, which determines the extent of the blurring, is set by a control unit or the like, and not shown.

In addition, a favorable shadow enhancement is realized by setting p to 0≤p<0.5, and thus such a setting it preferable.

As described thus far, the three-dimensional image processing apparatus according to the present embodiment can implement an image process that darkens shadows (enhances shadows) while blurring the shadows. Furthermore, the three-dimensional image processing apparatus according to the present embodiment can adjust the extent of shadow blurring. Through this, the three-dimensional image obtained by the three-dimensional image processing apparatus according to the present embodiment is a three-dimensional image in which areas of shadow have been selectively enhanced while properly blurring those areas of shadow. As a result, a three-dimensional image obtained by the three-dimensional image processing apparatus according to the present embodiment is a three-dimensional image that reproduces a more natural sense of three-dimensionality and sense of depth.

Note that the present embodiment and the aforementioned other embodiments may be combined. Through this, a three-dimensional image process that darkens shadows (enhances shadows) while properly blurring the shadows can be implemented even in the three-dimensional image processing techniques according to the aforementioned other embodiments.

Furthermore, in the local tone conversion unit 111FL according to the present embodiment, the second surrounding brightness detection unit 1801 may be replaced with the third surrounding brightness detection unit 2101 illustrated in FIG. 21. The same effects as the three-dimensional image processing apparatus according to the present embodiment can be achieved in such a case as well. Furthermore, in the local tone conversion unit 111FL according to the present embodiment, the second surrounding brightness detection unit 1801 may be replaced with the surrounding brightness detection unit 121.

Other Embodiments

Although the aforementioned embodiments described cases in which the image correction unit 104 carries out a local contrast enhancement process as shadow enhancement processing, it should be noted that the invention is not limited thereto, and for example, the image correction unit 104 may carry out the shadow enhancement processing by performing a process disclosed in JP 2008-4085A. Furthermore, the image correction unit 104 may perform the shadow enhancement processing using a conventional contrast enhancement process (for example, a detail enhancing process or a high-range enhancement process), rather than a local contrast enhancement process (that is, a local contrast enhancement process based on a spatial vision process).

In addition, although the aforementioned embodiments described a configuration in which an R image and an L image are inputted into the image input unit 102, the invention is not limited thereto, and for example, an R image and an L image may be selected from N (where N is a natural number greater than or equal to 2) images obtained through a multiple-viewpoint system, and the selected R image (signal) and L image (signal) may then be inputted into the image input unit 102.

The various blocks of the three-dimensional image capturing apparatus and three-dimensional image processing apparatus described in the aforementioned embodiments may be implemented as single individual chips by employing semiconductor devices such as LSIs, or some or all of the blocks may be implemented as a single chip.

Note that although the term "LSI" is used here, other names, such as IC, system LSI, super LSI, ultra LSI, and so on are used depending on the degree of integration.

Further, the manner in which the circuit integration is achieved is not limited to LSIs, and it is also possible to use a dedicated circuit or a general purpose processor. FPGAs (Field Programmable Gate Arrays) that can be programmed after the LSI manufacture, configurable processors in which the connections, settings, and so on of circuit cells within the LSIs can be reconfigured, or the like may be used as well.

Furthermore, if other technologies that improve upon or are derived from semiconductor technology enable integration technology to replace LSIs, then naturally it is also possible to integrate the functional blocks using that technology. Biotechnology applications are one such foreseeable example.

In addition, the various processes in the aforementioned embodiments may be realized as hardware, or as software (this includes implementations through an OS (operating system), middleware, or a predetermined library). These processes may also be implemented through processes in which the software and hardware run integrated with one another. It goes without saying that it is necessary to adjust the timing at which to execute each process in the case where the three-dimensional image capturing apparatus and three-dimensional image processing apparatus according to the above embodiments is implemented through hardware. For simplicity's sake, the descriptions in the above embodiments have omitted the details regarding the adjustment of the timing of the various signals that arises in the actual hardware architecture.

In addition, the order of execution in the processing methods of the aforementioned embodiment are not necessarily limited to the descriptions in the aforementioned embodiments, and the order of execution can be interchanged without departing from the spirit of the invention.

A computer program that causes a computer to execute the aforementioned methods and a computer-readable recording medium on which that program has been recorded also fall within the scope of the present invention. Here, a flexible disk, hard disk, CD-ROM, MO, DVD, DVD-ROM, DVD-RAM, BD (Blue-ray Disc), semiconductor memory, and so on can be given as examples of such a computer-readable recording medium.

The stated computer program is not limited to a program stored on the stated recording medium, and may be transmitted via a network or the like such as an electric communication line, a wireless or hard-wired communication line, the Internet, and so on.

In addition, the aforementioned embodiments describe cases in which a stereoscopic image (a left eye image and a right eye image) are obtained (captured) by two image capturing units. However, the invention is not limited thereto, and for example, the left eye image and the right eye image may be obtained in an alternating manner, through time division, by a single image sensor, or the left eye image and right eye image may be obtained by dividing a single image sensor into two image sensor surfaces.

In addition, a three-dimensional display apparatus including the depth generation unit 103 and the image correction unit 104 described in the aforementioned embodiments may be implemented in a television, a mobile information terminal, a personal computer, a digital still camera, a movie camera, an information recording/playback apparatus, a video recording/playback apparatus, or the like.

In addition, the three-dimensional image processing apparatus may have (1) a configuration including the image correction unit 104, or (2) a configuration including the depth generation unit 103 and the image correction unit 104. Accordingly, the three-dimensional image processing apparatus may be configured without the first image capturing unit 101R, the second image capturing unit 101L, and so on of the three-dimensional image capturing apparatus (an example of a three-dimensional image processing apparatus) according to the aforementioned embodiments.

Note that in this case, the R image and the L image may be inputted to the stated apparatus from the exterior.

It should be noted that the specific configuration of the present invention is not intended to be limited to the above embodiments in any way, and various modifications and variations can be made without deviating from the essential spirit of the invention.

INDUSTRIAL APPLICABILITY

Regardless of the reason for the occurrence of a cardboard cutout effect, the three-dimensional image processing apparatus, three-dimensional image capturing apparatus, three-dimensional image capturing method, and program according to the present invention can restore a sense of three-dimensionality and a sense of depth to a subject, and can obtain a high-quality three-dimensional image with a low sense of the cardboard cutout effect; the invention is therefore useful in imaging-related industries, and can be carried out in such fields.

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the three-dimensional image processing apparatus, three-dimensional image-pickup apparatus, three-dimensional image-pickup method, and program. Accordingly, these terms, as utilized to describe the present invention should be interpreted relative to the three-dimensional image processing apparatus, three-dimensional image-pickup apparatus, three-dimensional image-pickup method, and program.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed:

1. A three-dimensional image processing apparatus that performs an image correction process on a left eye image and a right eye image contained in a three-dimensional image obtained through a dual-lens technique or a multiple-viewpoint technique, the apparatus comprising:
an image corrector configured to:
obtain a subject object from the left eye image and right eye image;
perform an enhancement process configured to emphasize a shadow or shade produced by protrusions and recesses in a surface of the subject object using a first strength on an inward region of the obtained subject object; and
perform an enhancement process configured to emphasize a shadow or shade produced by the protrusions and recesses in the surface of the subject object using a second strength that is weaker than the first strength on an outward region of the obtained subject object; wherein
the image corrector includes an R image corrector and an L image corrector, and
the R image corrector includes:
an R image local tone converter configured to perform the enhancement process on a right eye image signal IS_R and output the right eye image signal on which the enhancement process has been performed as a corrected right eye image signal OS_R;
an R image strength generator configured to determine a strength of an image correction process based on the right eye image distance image; and
an R image synthesizer configured to synthesize the right eye image signal IS_R and the corrected right eye image signal OS_R based on the strength determined by the R image strength generator; and
the L image corrector includes:
an L image local tone converter configured to perform the enhancement process on a left eye image signal IS_L and output the left eye image signal on which the enhancement process has been performed as a corrected left eye image signal OS_L;
an L image strength generator configured to determine a strength of an image correction process based on the left eye image distance image; and
an L image synthesizer configured to synthesize the left eye image signal IS_L and the corrected left eye image signal OS_L based on the strength determined by the L image strength generator.

2. The three-dimensional image processing apparatus according to claim 1, wherein the second strength is zero.

3. The three-dimensional image processing apparatus according to claim 1, wherein:
the R image local tone converter includes:
an R image surrounding brightness detector configured to:
detect a first representative brightness value of a first pixel of interest corresponding to the right eye image signal IS_R and a first periphery pixel in the periphery of the first pixel of interest; and
output an R image surrounding brightness signal US_R that takes the first detected representative brightness value as a signal value; and an R image second dynamic tone corrector configured to obtain the corrected right eye image signal OS_R by performing a first dynamic tone correction process based on the right eye image signal IS_R and the R image surrounding brightness signal US_R, the first dynamic tone correction process including:

obtaining the corrected right eye image signal OS_R by performing a first tone conversion process based on a first tone conversion property in which when the value of the right eye image signal IS_R is fixed at a first predetermined value within a predetermined input range of the right eye image signal IS_R, and the value of the corrected right eye image signal OS_R decreases as the value of the R image surrounding brightness signal US_R increases when the value of the right eye image signal IS_R is less than or equal to the value of the R image surrounding brightness signal US_R; and obtaining the corrected right eye image signal OS_R by taking the right eye image signal IS_R as the corrected right eye image signal OS_R when the value of the right eye image signal IS_R is less than the value of the R image surrounding brightness signal US_R; and wherein the L image local tone converter includes:
an L image surrounding brightness detector configured to:
detect a second brightness value of a second pixel of interest corresponding to the left eye image signal IS_L and a second periphery pixel in the periphery of the second pixel of interest; and output an L image surrounding brightness signal US_L that takes the detected second brightness value as a signal value; and an L image second dynamic tone corrector configured to:
obtain the corrected left eye image signal OS_L by performing a second dynamic tone correction process based on the left eye image signal IS_L and the L image surrounding brightness signal US_L, the second dynamic tone correction process including:
obtaining the corrected left eye image signal OS_L by performing a second tone conversion process based on a second tone conversion property in which, when the value of the left eye image signal IS_L is fixed at a second predetermined value within a predetermined input range of the left eye image signal IS_L, and the value of the corrected left eye image signal OS_L decreases as the value of the L image surrounding brightness signal US_L increases when the value of the left eye image signal IS_L is less than or equal to the value of the L image surrounding brightness signal US_L; and obtaining the corrected left eye image signal OS_L by taking the left eye image signal IS_L as the corrected left eye image signal OS_L when the value of the left eye image signal IS_L is greater than the value of the L image surrounding brightness signal US_L.

4. The three-dimensional image processing apparatus according to claim 1,
wherein the R image local tone converter includes:
an R image second surrounding brightness detector configured to:
detect a first representative brightness value of a first pixel of interest corresponding to the right eye image signal IS_R, and a first periphery pixel in the periphery of the first pixel of interest;

obtain an R image surrounding brightness signal US_R that takes the first detected representative brightness value as a signal value;

obtain a right eye offset value ΔUS_R that takes on a higher value the greater an amount of change in the right eye image signal IS_R is in a predetermined image region; and obtain an R image corrected surrounding brightness signal US_R' by adding the right eye offset value ΔUS_R to the R image surrounding brightness signal US_R; and an R image dynamic tone corrector configured to obtain the corrected right eye image signal OS_R by performing a dynamic tone correction process based on the right eye image signal IS_R and the R image corrected surrounding brightness signal US_R', the dynamic tone correction process obtaining the corrected right eye image signal OS_R by performing a tone conversion process based on a tone conversion property in which the value of the corrected right eye image signal OS_R decreases as the value of the R image corrected surrounding brightness signal US_R' increases when the value of the right eye image signal IS_R is fixed at a predetermined value in a predetermined input range of the right eye image signal IS_R; and wherein the L image local tone converter includes:
an L image second surrounding brightness detector configured to:
detect a second brightness value of a second pixel of interest corresponding to the left eye image signal IS_L, and a second periphery pixel in the periphery of the second pixel of interest;

obtain an L image surrounding brightness signal US_L that takes the second detected brightness value as a signal value;

obtain a left eye offset value ΔUS_L that takes on a higher value the greater an amount of change in the left eye image signal IS_L is in a predetermined image region; and obtain an L image corrected surrounding brightness signal US_L' by adding the left eye offset value ΔUS_L to the L image surrounding brightness signal US_L; and an L image dynamic tone corrector configured to obtain the corrected left eye image signal OS_L by performing a dynamic tone correction process based on the left eye image signal IS_L and the L image corrected surrounding brightness signal US_L', the dynamic tone correction process obtaining the corrected left eye image signal OS_L by performing a tone conversion process based on a tone conversion property in which the value of the corrected left eye image signal OS_L decreases as the value of the L image corrected surrounding brightness signal US_L' increases when the value of the left eye image signal IS_L is fixed at a predetermined value in a predetermined input range of the left eye image signal IS_L.

5. The three-dimensional image processing apparatus according to claim 1, wherein:
the R image local tone converter includes:
an R image second surrounding brightness detector configured to:
detect a first representative brightness value of a first pixel of interest corresponding to the right eye image signal IS_R, and a first periphery pixel in the periphery of the first pixel of interest;

obtain an R image surrounding brightness signal US_R that takes the first detected brightness value as a signal value;

obtain a right eye offset value ΔUS_R that takes on a higher value the greater an amount of change in the right eye image signal IS_R is in a predetermined image region; and obtain an R image corrected surrounding brightness signal US_R' by adding the right eye offset value ΔUS_R to the R image surrounding brightness signal US_R; and an R image coefficient computation processor configured to:

determine a coefficient k that takes on a lower value the higher the value of a difference between the right eye image signal IS_R and the R image corrected surrounding brightness signal US_R' according to the formula ((IS_R)−(US_R')); and obtain the corrected right eye image signal OS_R according to the formula OS_R=IS_R+k×((IS_R)−(US_R')) using the determined coefficient k; and wherein the L image local tone converter includes:

an L image second surrounding brightness detector configured to:

detect a second representative brightness value of a second pixel of interest corresponding to the left eye image signal IS_L, and a second periphery pixel in the periphery of the first pixel of interest;

obtain an L image surrounding brightness signal US_L that takes the second detected representative brightness value as a signal value;

obtains a left eye offset value ΔUS_L that takes on a higher value the greater an amount of change in the left eye image signal IS_L is in a predetermined image region; and obtain an L image corrected surrounding brightness signal US_L' by adding the left eye offset value ΔUS_L to the L image surrounding brightness signal US_L; and an L image coefficient computation processor configured to:

determine a coefficient k' that takes on a lower value the higher the value of a difference between the left eye image signal IS_L and the L image corrected surrounding brightness signal US_L' according to the formula ((IS_L)−(US_L')); and obtain the corrected left eye image signal OS_L through OS_L=IS_L+k'×((IS_L)−(US_L')) using the determined coefficient k'.

6. The three-dimensional image processing apparatus according to claim 1, wherein:

the R image local tone converter includes:

an R image second surrounding brightness detector configured to:

detect a first representative brightness value of a first pixel of interest corresponding to the right eye image signal IS_R, and a first periphery pixel in the periphery of the pixel of interest;

obtain an R image surrounding brightness signal US_R that takes the detected first representative brightness value as a signal value;

obtain a right eye offset value ΔUS_R that takes on a higher value the greater an amount of change in the right eye image signal IS_R is in a predetermined image region;

and obtain an R image corrected surrounding brightness signal US_R' by adding the right eye offset value ΔUS_R to the R image surrounding brightness signal US_R; and an R image coefficient computation processor configured to:

determine a coefficient k that takes on a lower value the higher the value of a difference between the right eye image signal IS_R and the R image corrected surrounding brightness signal US_R' according to the formula ((IS_R)−(US_R'));

obtain a signal LPF ((k+p)×(IS_R−US_R')) by setting a coefficient p, such that 0 is less than or equal to p which is less than or equal to 1, and performing a bandwidth limiting process on a signal obtained according to the formula (k+p)×(IS_R−US_R'); and obtain the corrected right eye image signal OS_R according to the formula OS_R=IS_R−p×(IS_R−US_R')+LPF((k+p)×(IS_R−US_R')) using the obtained signal LPF((k+p)×(IS_R−US_R')), and wherein the L image local tone converter includes:

an L image second surrounding brightness detector configured to:

detect a second representative brightness value of a second pixel of interest corresponding to the left eye image signal IS_L, and second periphery a pixel in the periphery of the second pixel of interest;

obtain an L image surrounding brightness signal US_L that takes the second detected brightness value as a signal value;

obtain a left eye offset value ΔUS_L that takes on a higher value the greater an amount of change in the left eye image signal IS_L is in a predetermined image region; and obtain an L image corrected surrounding brightness signal US_L' by adding the left eye offset value ΔUS_L to the L image surrounding brightness signal US_L; and an L image coefficient computation processor configured to:

determine a coefficient k' that takes on a lower value the higher the value of a difference between the left eye image signal IS_L and the L image corrected surrounding brightness signal US_L' according to the formula ((IS_L)−(US_L'));

obtain a signal LPF ((k'+p)×(IS_L−US_L')) by setting a coefficient p, such that 0 is less than or equal to p which is less than or equal to 1, and performing a bandwidth limiting process on a signal obtained according to the formula (k+p)×(IS_L−US_L'); and obtain the corrected left eye image signal OS_L according to the formula OS_L=IS_L−p×(IS_L−US_L')+LPF((k'+p)×(IS_L−US_L')) using the obtained signal LPF((k'+p)×(IS_L−US_L')).

\* \* \* \* \*